(12) United States Patent
Droandi et al.

(10) Patent No.: US 12,545,401 B2
(45) Date of Patent: Feb. 10, 2026

(54) SYSTEMS AND METHODS FOR PROPELLER THRUST PROTECTION

(71) Applicant: Archer Aviation Inc., San Jose, CA (US)

(72) Inventors: Giovanni Droandi, San Jose, CA (US); Nathan Thomas Depenbusch, Mountain View, CA (US)

(73) Assignee: Archer Aviation Inc., San Jose, CA (US)

( * ) Notice: Subject to any disclaimer, the term of this patent is extended or adjusted under 35 U.S.C. 154(b) by 0 days.

(21) Appl. No.: 19/017,161

(22) Filed: Jan. 10, 2025

(65) Prior Publication Data

US 2025/0223032 A1    Jul. 10, 2025

Related U.S. Application Data

(63) Continuation of application No. PCT/US2024/037414, filed on Jul. 10, 2024.

(60) Provisional application No. 63/512,784, filed on Jul. 10, 2023.

(51) Int. Cl.
*B64C 29/00* (2006.01)
*B64D 31/10* (2006.01)

(52) U.S. Cl.
CPC .......... *B64C 29/0033* (2013.01); *B64D 31/10* (2013.01)

(58) Field of Classification Search
CPC ...... B64C 29/0033; B64C 29/00; B64D 31/10
USPC .......................................................... 701/9
See application file for complete search history.

(56) References Cited

U.S. PATENT DOCUMENTS

| | | | |
|---|---|---|---|
| 5,001,646 A | 3/1991 | Caldwell et al. | |
| 8,616,492 B2 | 12/2013 | Oliver | |
| 9,037,316 B2 | 5/2015 | Abildgaard et al. | |
| 9,511,880 B2 | 12/2016 | He et al. | |
| 9,898,033 B1 | 2/2018 | Long | |
| 11,454,990 B1 | 9/2022 | List et al. | |
| 11,554,855 B2 | 1/2023 | Brand et al. | |
| 12,164,311 B1 * | 12/2024 | Gandhi | B64D 45/00 |
| 2002/0153452 A1 | 10/2002 | King et al. | |

(Continued)

FOREIGN PATENT DOCUMENTS

CN    114613197 A    6/2022
EP    3263452 B1    9/2018

(Continued)

OTHER PUBLICATIONS

Walker, G., et al., "F-35B Integrated Flight-Propulsion Control Development", 2013 international powered lift conference, 2013, 15 pages.

(Continued)

*Primary Examiner* — Shardul D Patel
(74) *Attorney, Agent, or Firm* — Finnegan, Henderson, Farabow, Garrett & Dunner, LLP

(57) ABSTRACT

The present disclosure relates generally to flight control of electric aircraft and other powered aerial vehicles. In one embodiment, a method is disclosed, comprising: receiving a descent rate command from a pilot input device, determining a proximity of each propeller of at least two propellers to a vortex ring state; and controlling the aircraft's descent rate to be less than the commanded descent rate when at least one of the at least two propellers is within a first threshold proximity to the vortex ring state.

30 Claims, 35 Drawing Sheets

(56) References Cited

U.S. PATENT DOCUMENTS

| | | | |
|---|---|---|---|
| 2004/0093130 A1 | 5/2004 | Osder et al. | |
| 2006/0006279 A1* | 1/2006 | Kisor | B64C 29/0033 244/17.13 |
| 2006/0008279 A1 | 1/2006 | Kisor | |
| 2009/0089006 A1 | 4/2009 | Certain | |
| 2010/0076625 A1 | 3/2010 | Yoeli | |
| 2013/0138270 A1 | 5/2013 | Christensen et al. | |
| 2018/0339791 A1 | 11/2018 | Quaranta | |
| 2019/0332125 A1 | 10/2019 | Irwin, III et al. | |
| 2020/0333805 A1 | 10/2020 | English et al. | |
| 2020/0393851 A1 | 12/2020 | Kim et al. | |
| 2021/0097873 A1 | 4/2021 | Sassinsky | |
| 2021/0197962 A1* | 7/2021 | Brand | G05D 1/485 |
| 2022/0326704 A1 | 10/2022 | Moy et al. | |

FOREIGN PATENT DOCUMENTS

| | | |
|---|---|---|
| EP | 3994059 81 | 8/2023 |
| EP | 3891067 B1 | 1/2024 |
| WO | 2020180373 A2 | 9/2020 |
| WO | 2022136981 A1 | 6/2022 |

OTHER PUBLICATIONS

Vigano, L., et al., "Development of augmented control laws for a tilt rotor in low and high speed flight modes", European Rotorcraft Forum, 2017, 14 pages.

Denham, J., et al., "Converging on a precision Hover control strategy for the F-35B STOVL aircraft.", AIAA Guidance, Navigation and Control Conference and Exhibit, 2008, 13 pages.

Whittle, R., "Flying The Osprey Is Not Dangerous, Just Different: Veteran Pilots", Breaking Defense, Sep. 5, 2012, 11 pages.

Kang, Y., et al., "Development of flight control system and troubleshooting on flight test of a tilt-rotor unmanned aerial vehicle", International Journal of Aeronautical and Space Sciences 17.1, 2016, p. 120-131, 12 pages.

PCT Search Report and Written Opinion for application No. PCT/US2024/037414 mailed on Oct. 2, 2024, 9 pages.

Li et al., "A Vortex-ring-state-avoiding Descending Control Strategy for Multi-rotor UAVs", Proceedings of the 34th Chinese Conference, Jul. 28-30, 2015, 7 pages.

Talaeizadeh et al., "Quadcopter Fast Pure Descent Maneuver Avoiding Vortex Ring State Using Yaw-Rate Control Scheme", IEEE Robotics and Automation Letters, vol. 6, No. 2, Apr. 2021, 8 pages.

\* cited by examiner

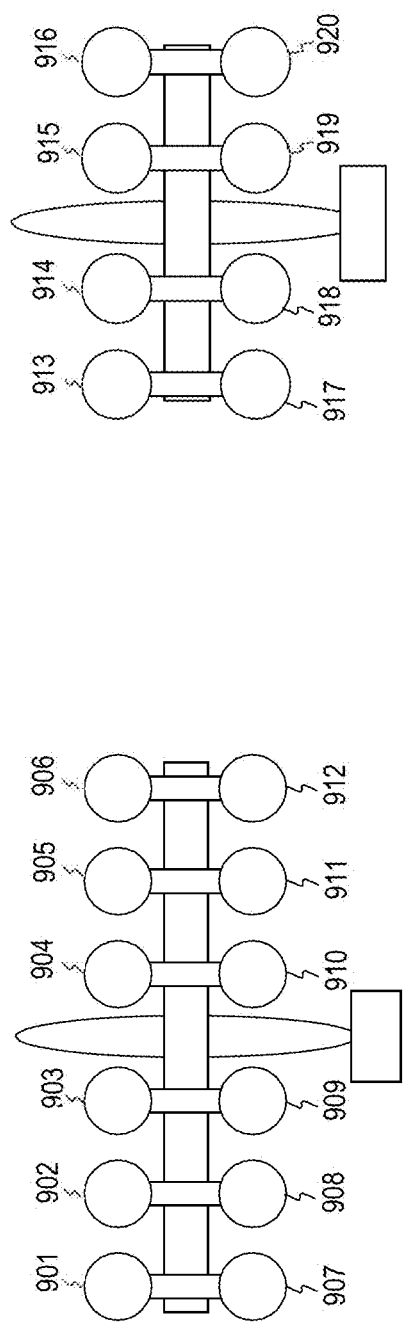
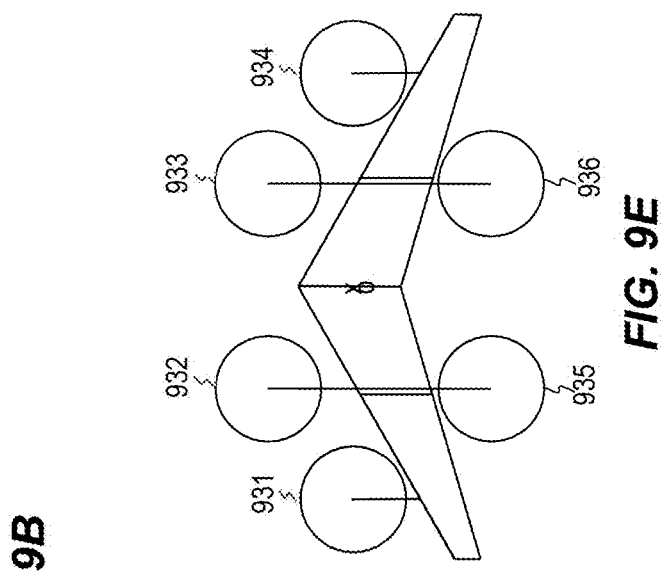
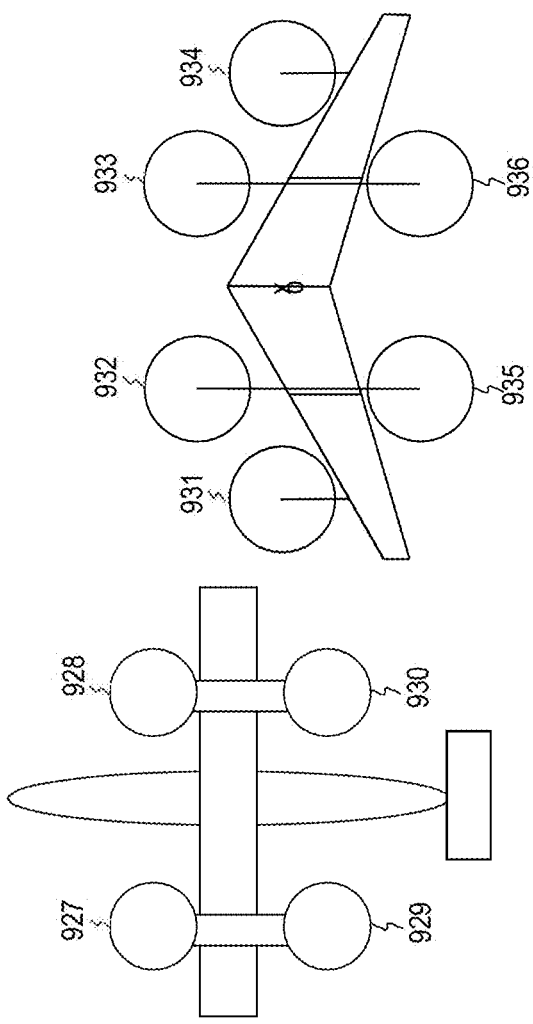
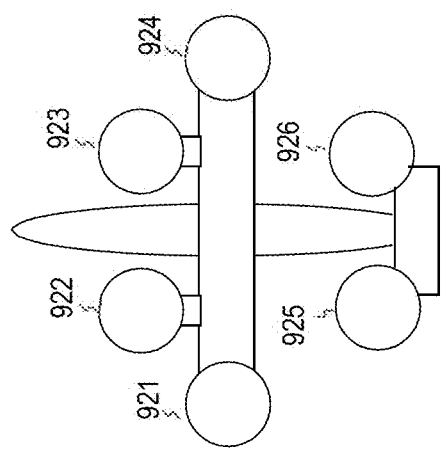
FIG. 9A
FIG. 9B
FIG. 9C
FIG. 9D
FIG. 9E

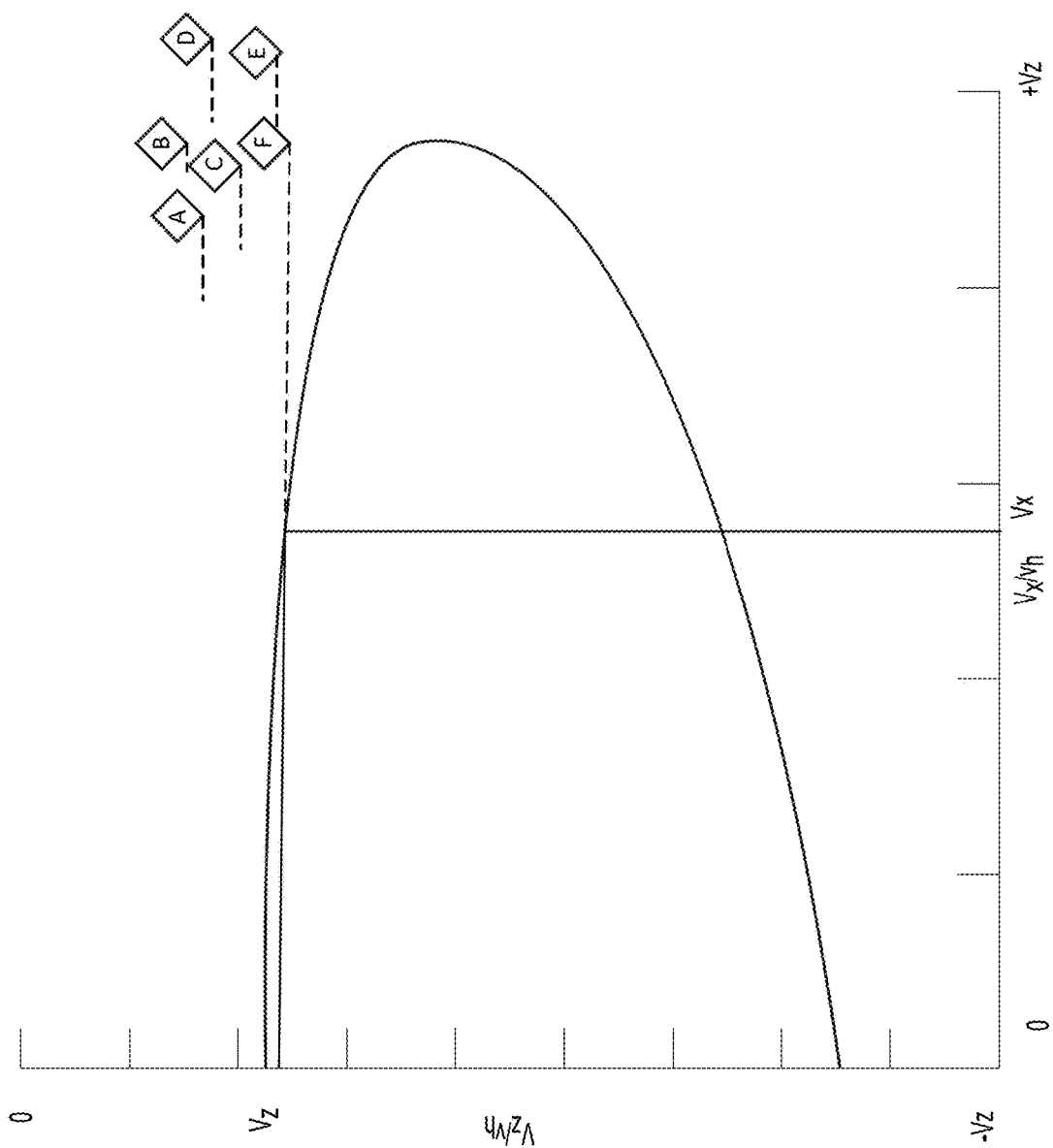

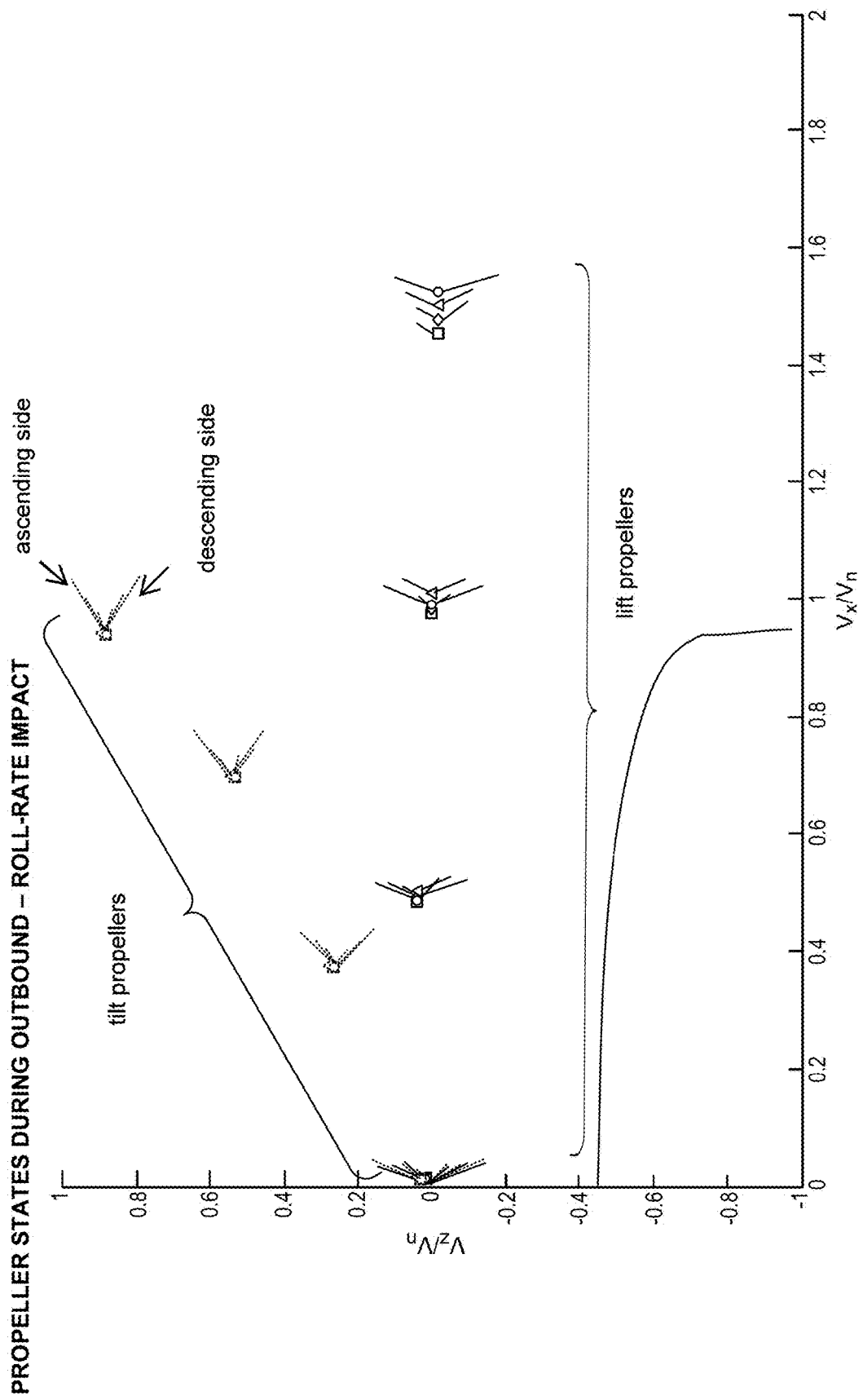

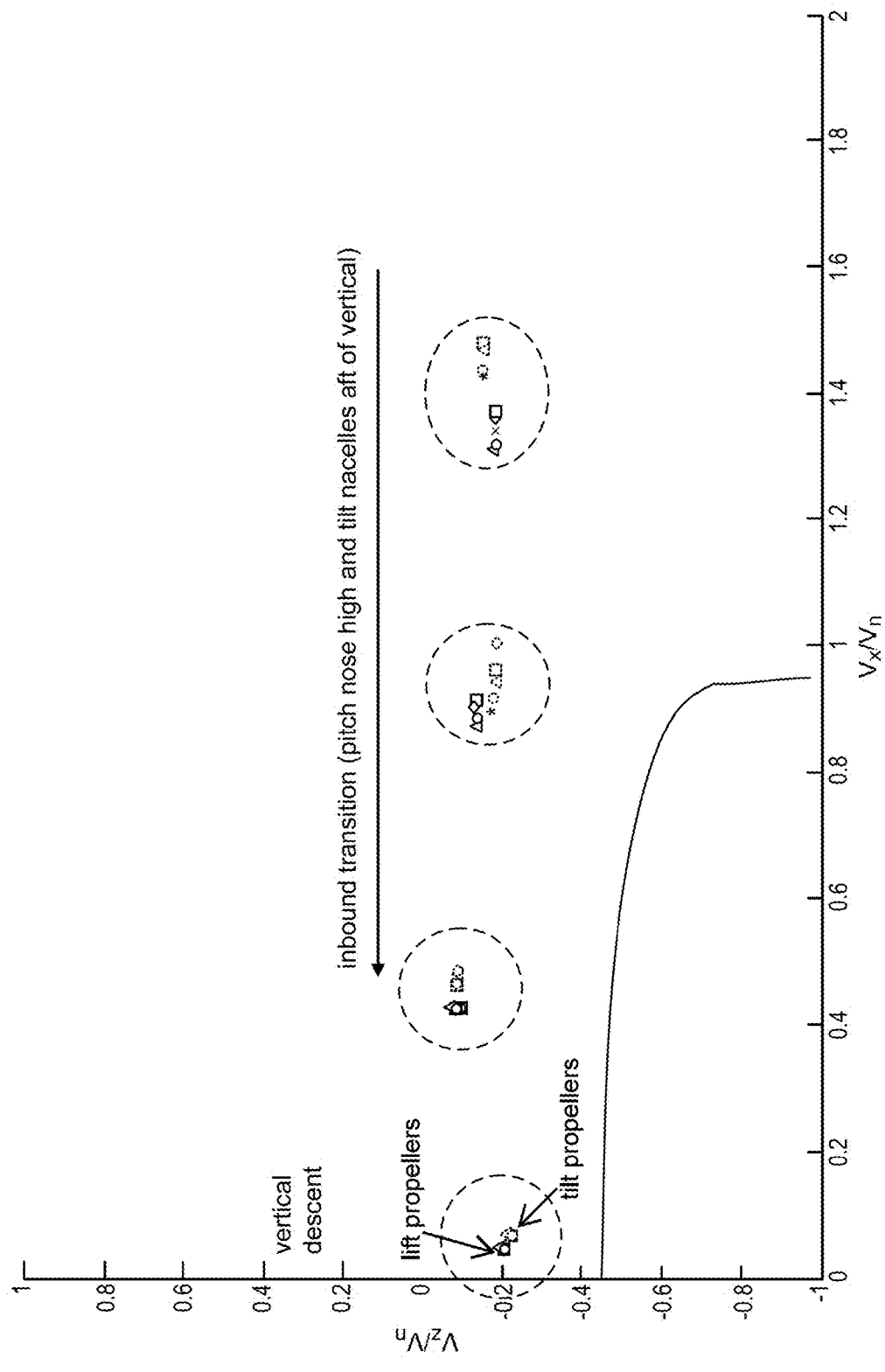

SYSTEMS AND METHODS FOR PROPELLER THRUST PROTECTION

CROSS-REFERENCE TO RELATED APPLICATIONS

This application is a continuation of International Application No. PCT/US2024/037414, filed on Jul. 10, 2024, which claims the benefit of priority under 35 U.S.C. § 119 to U.S. Provisional Application No. 63/512,784, filed Jul. 10, 2023, the contents of which are incorporated herein in their entirety for all purposes.

TECHNICAL FIELD

This disclosure relates generally to powered aerial vehicles. More particularly, and without limitation, the present disclosure relates to innovations in aircrafts driven by electric propulsion systems. Certain aspects of the present disclosure generally relate to systems and methods for flight control of aircrafts driven by electric propulsion systems and in other types of vehicles, as well as flight control of aircrafts in flight simulators and video games. Other aspects of the present disclosure generally relate to improvements in flight control systems and methods that provide particular advantages in aerial vehicles and may be used in other types of vehicles.

BACKGROUND

The inventors here have recognized several problems that may be associated with flight control of aircraft, including a tilt-rotor aircraft that uses electrical or hybrid-electric propulsion systems (hereinafter referred to as electric propulsion units or "EPUs"). For example, EPU propellers risk entering a vortex ring state (VRS) when an aircraft is descending while its rotors and/or propellers are operational. During the aircraft's descent, air may begin to flow up through the propellers, increasing with an increase in descent rate. If the forward airspeed at the propellers is insufficient to remove the wake created by the descent, one or more propellers may enter a vortex ring state where they suck in their own wake and are unable to generate sufficient thrust to support the aircraft. This problem may be particularly significant in aircrafts with multiple propellers (e.g., a multi-rotor aircraft), a common configuration in many electric aircraft. The airflow dynamics at each propeller in a multi-rotor aircraft may vary based on the aircraft's maneuvers and/or tilt angle of the propeller. Therefore, in a multi-rotor aircraft, some propellers may enter vortex ring state while others are unimpacted, resulting in aircraft instability.

In addition to VRS being more significant a problem on multi-rotor aircraft, it can be particularly challenging to detect and address. It may be difficult to detect which propeller(s) is closest to entering VRS because each propeller's proximity and risk of VRS dynamically changes with the aircraft's maneuvers and/or tilt angle of the propellers. Further, it may be difficult to determine what changes in aircraft maneuvers will help to avoid VRS. It is also understood that VRS may impact non-electric aircraft, and that the techniques discussed herein may be applied to electric, hybrid-electric, or non-electric aircraft, as well as other vehicles.

SUMMARY

The present disclosure relates generally to flight control of electric aircraft and other powered aerial vehicles. More particularly, and without limitation, the present disclosure relates to innovations in tilt-rotor aircraft that use electrical propulsion systems. Certain aspects of the present disclosure relate to detecting the proximity of each propeller on an aircraft to a vortex ring state. Other aspects of the present disclosure relate to automatically controlling an aircraft to avoid one or more propellers entering a vortex ring state. Further aspects of the present disclosure relate to automatically controlling an aircraft to escape vortex ring state upon detecting that one or more propellers have entered a vortex ring state. The term "propeller" is used to reference any aircraft component with rotating blades to support flight and includes a rotor, proprotor, and the like.

One aspect of the present disclosure is directed to method, comprising: receiving a descent rate command from a pilot input device, determining a proximity of each propeller of at least two propellers to a vortex ring state, and controlling the aircraft's descent rate to be less than the commanded descent rate when at least one of the at least two propellers is within a first threshold proximity to the vortex ring state.

Another aspect of the present disclosure is directed to a control system comprising at least one processor configured to execute instructions to: receive a descent rate command from a pilot input device, determine a proximity of each propeller of at least two propellers to a vortex ring state, and control the aircraft's descent rate to be less than the commanded descent rate when at least one of the at least two propellers is within a first threshold proximity to the vortex ring state.

Another aspect of the present disclosure is directed to an aircraft comprising at least one processor configured to execute instructions to: receive a descent rate command from a pilot input device, determine a proximity of each propeller of at least two propellers to a vortex ring state, and control the aircraft's descent rate to be less than the commanded descent rate when at least one of the at least two propellers is within a first threshold proximity to the vortex ring state.

Yet another aspect of the present disclosure is directed to a computer-readable storage medium storing instructions which, when executed by at least one processor, cause the at least one processor to: receive a descent rate command from a pilot input device, determine a proximity of each propeller of at least two propellers to a vortex ring state, and control the aircraft's descent rate to be less than the commanded descent rate when at least one of the at least two propellers is within a first threshold proximity to the vortex ring state.

BRIEF DESCRIPTION OF THE DRAWINGS

FIGS. 9A, 9B, 9C, 9D, and 9E illustrate exemplary top plan views of VTOL aircraft, consistent with disclosed embodiments.

FIGS. 14A, 14B, 14C, 14D, 14E, 14F, and 14G illustrate exemplary diagrams for determination of closest propeller(s) to vortex ring state and corresponding control limit(s), in accordance with embodiments of the present disclosure.

FIGS. 15A, 15B, 15C, 15D, 15E, 15F, 15G, 15H, 15I, 15J, 15K, and 15L illustrate simulation results for determination of closest propeller(s) to vortex ring state and corresponding control limit(s), in accordance with embodiments of the present disclosure.

DETAILED DESCRIPTION

Figure 1:
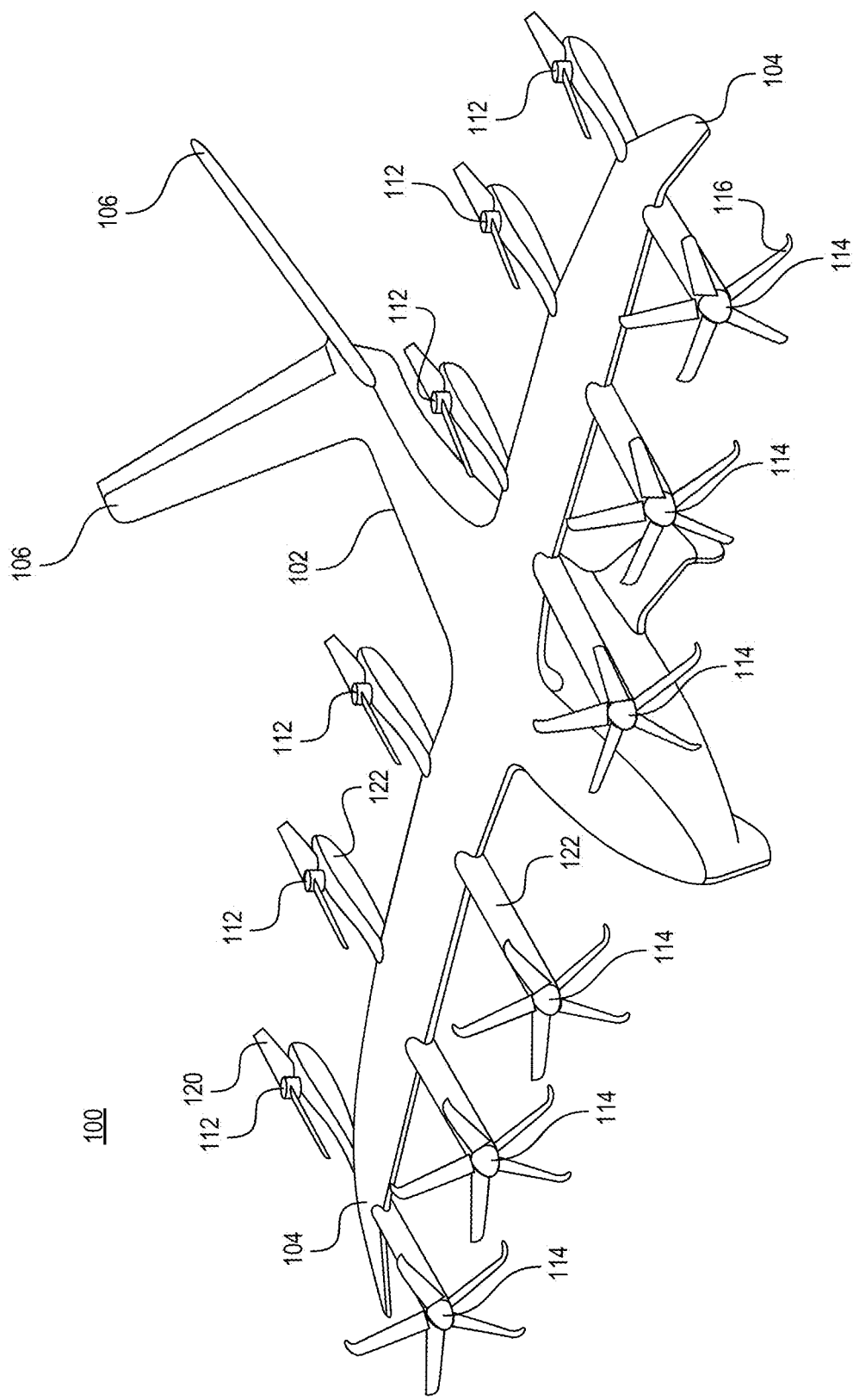
FIG. 1 shows an exemplary vertical takeoff and landing (VTOL) aircraft, consistent with disclosed embodiments.

The present disclosure addresses systems, components, and techniques primarily for use in an aircraft. The aircraft may be an aircraft with a pilot, an aircraft without a pilot (e.g., a UAV), a drone, a helicopter, and/or an airplane. An aircraft includes a physical body and one or more components (e.g., a wing, a tail, a propeller) configured to allow the aircraft to fly. The aircraft may include any configuration that includes at least one propeller. In some embodiments, the aircraft is driven (e.g., provided with thrust) by one or more electric propulsion systems, hereinafter referred to as electric propulsion units or "EPUs"), which may include at least one engine, at least one rotor, at least one propeller, or any combination thereof. The aircraft may be fully electric, hybrid, or gas powered. For example, in some embodiments, the aircraft is a tilt-rotor aircraft configured for frequent (e.g., over 50 flights per work day), short-duration flights (e.g., less than 100 miles per flight) over, into, and out of densely populated regions. The aircraft may be configured to carry 4-6 passengers or commuters who have an expectation of a comfortable experience with low noise and low vibration.

Disclosed embodiments provide new and improved configurations of aircraft components, some of which are not observed in conventional aircraft, and/or identified design criteria for components that differ from those of conventional aircraft. Such alternate configurations and design criteria, in combination addressing drawbacks and challenges with conventional components, yielded the embodiments disclosed herein for various configurations and designs of components for an aircraft (e.g., electric aircraft or hybrid-electric aircraft) driven by a propulsion system.

In some embodiments, the aircraft driven by a propulsion system of the present disclosure may be designed to be capable of both vertical and conventional takeoff and landing, with a distributed propulsion system enabling vertical flight, horizontal and lateral flight, and transition (e.g., transitioning between vertical flight and horizontal flight). The aircraft may generate thrust by supplying high voltage electrical power to a plurality of engines of the distributed propulsion system, which may include components to convert the high voltage electrical power into mechanical shaft power to rotate a propeller.

Embodiments may include an electric engine (e.g., motor) connected to an onboard electrical power source, which may include a device capable of storing energy such as a battery or capacitor, and may optionally include one or more systems for harnessing or generating electricity such as a fuel powered generator or solar panel array. In some embodiments, the aircraft may comprise a hybrid aircraft configured to use at least one of an electric-based energy source or a fuel-based energy source to power the distributed propulsion system. In some embodiments, the aircraft may be powered by one or more batteries, internal combustion engines (ICE), generators, turbine engines, or ducted fans.

The engines may be mounted directly to the wing, or mounted to one or more booms attached to the wing. The amount of thrust each engine generates may be governed by a torque command from a Flight Control System (FCS) over a digital communication interface to each engine. Embodiments may include forward engines (and associated propellers) that are capable of altering their orientation, or tilt.

The engines may rotate the propellers in a clockwise or counterclockwise direction. In some embodiments, the difference in propeller rotation direction may be achieved using the direction of engine rotation. In other embodiments, the engines may all rotate in the same direction, and gearing may be used to achieve different propeller rotation directions.

In some embodiments, an aircraft may possess quantities of engines in various combinations of forward and aft engine configurations. A forward engine may be considered an engine that is positioned predominantly towards the leading edge of a wing. An aft engine may be considered an engine that is positioned predominantly towards the trailing edge of a wing. For example, an aircraft may possess six forward and six aft engines, five forward and five aft engines, four forward and four aft engines, three forward and three aft engines, two forward and two aft engines, or any other combination of forward and aft engines, including embodiments where the number of forward engines and aft engines are not equivalent.

In some embodiments, for a vertical takeoff and landing (VTOL) mission, the forward and aft engines may provide vertical thrust during takeoff and landing. During flight phases where the aircraft is moving forward, the forward engines may provide horizontal thrust, while the propellers of the aft engines may be stowed at a fixed position in order to minimize drag. The aft engines may be actively stowed with position monitoring.

Transition from vertical flight to horizontal flight and vice-versa may be accomplished via the tilt propeller subsystem. The tilt propeller subsystem may redirect thrust between a primarily vertical direction during vertical flight phase (e.g., hover-phase or "hover") to a horizontal or near-horizontal direction during a forward-flight cruising phase, based on a tilt of one or more propellers (e.g., determining directionality of one or more propellers). A variable pitch mechanism may change the forward engine's propeller-hub assembly blade collective angles for operation during phases of flight, such as a hover-phase, transition phase, and cruise-phase. Vertical lift may be thrust in a primarily vertical direction (e.g., during a hover-phase).

Horizontal thrust may be thrust in a primarily horizontal direction (e.g., during a cruise-phase).

In some embodiments, a "phase of flight," or "flight mode," (e.g., hover, cruise, forward flight, takeoff, landing, transition) may be defined by a combination flight conditions (e.g., a combination of flight conditions within particular ranges), which may include one or more of an airspeed, altitude, pitch angle (e.g., of the aircraft), tilt angle (e.g., of one or more propellers), roll angle, rotation speed (e.g., of a propeller), torque value, pilot command, or any other value indicating a current or requested (e.g., commanded) state of at least part of the aircraft.

In some embodiments, in a conventional takeoff and landing (CTOL) mission, the forward engines may provide horizontal thrust for wing-borne take-off, cruise, and landing, and the wings may provide vertical lift. In some embodiments, the aft engines may not be used for generating thrust during a CTOL mission and the aft propellers may be stowed in place. In other embodiments, the aft engines may be used at reduced power to shorten the length of the CTOL takeoff or landing.

As detailed herein, embodiments of the aircraft may include many movable structural flight elements that allow pilots to safely control the aircraft. The rotation and orientation control of lift and tilt propellers provide the lift required for vertical take-off and landing, and hovering. Further, the rotation and orientation of the tilt propellers provide the forward thrust required to move the aircraft through the air. Therefore, the propellers are critical to the controllability, safety, and stability of the aircraft. One or more propellers entering a vortex ring state where they do not provide sufficient thrust could jeopardize the safety and stability of the aircraft.

The disclosed embodiments prevent aircraft propellers from entering a vortex ring state by detecting a proximity of one or more propeller states to a vortex ring state and controlling the aircraft to avoid vortex ring state. For example, the disclosed embodiments may provide warnings to a pilot based on a proximity to vortex ring state and/or set limits to aircraft maneuvers requested by pilot and/or autopilot commands. Further, the disclosed embodiments may detect that one or more propellers are in a vortex ring state and control the aircraft in a manner that removes the effected propellers from vortex ring state and/or avoids other propellers entering the vortex ring state. For example, the disclosed embodiments may provide warnings to a pilot based on determining one or more propellers have entered a vortex ring state and/or set limits to the aircraft maneuvers requested by pilot and/or autopilot commands.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims.

Figure 2:
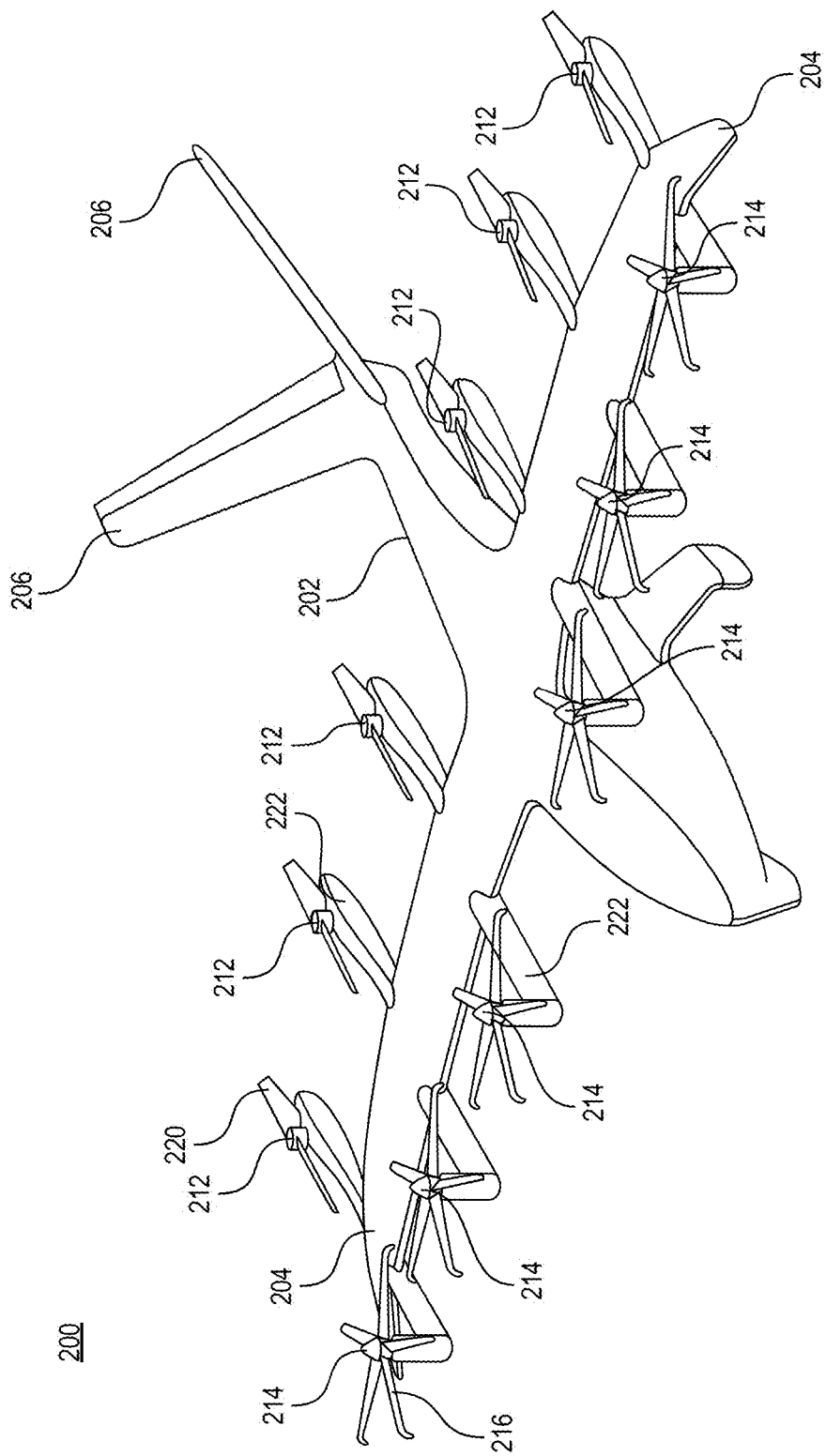
FIG. 2 shows an exemplary VTOL aircraft, consistent with disclosed embodiments.

FIG. 1 is an illustration of a perspective view of an exemplary VTOL aircraft, consistent with disclosed embodiments. FIG. 2 is another illustration of a perspective view of an exemplary VTOL aircraft in an alternative configuration, consistent with embodiments of the present disclosure. FIGS. 1 and 2 illustrate a VTOL aircraft 100, 200 in a cruise configuration and a vertical take-off, landing and hover configuration (also referred to herein as a "lift" configuration), respectively, consistent with embodiments of the present disclosure. Elements corresponding to FIGS. 1 and 2 may possess like numerals and refer to similar elements of the aircrafts 100, 200. The aircraft 100, 200 may include a fuselage 102, 202, wings 104, 204 mounted to the fuselage 102, 202 and one or more rear stabilizers 106, 206 mounted to the rear of the fuselage 102, 202. A plurality of lift propellers 112, 212 (also referred to as "lifters") may be mounted to wings 104, 204 and may be configured to provide lift for vertical take-off, landing and hover. A plurality of tilt propellers 114, 214 (also referred to as "tilters") may be mounted to wings 104, 204 and may be tiltable (e.g., configured to tilt or alter orientation) between the lift configuration in which they provide a portion of the lift required for vertical take-off, landing and hovering, as shown in FIG. 2, and the cruise configuration in which they provide forward thrust to aircraft 100 for horizontal flight, as shown in FIG. 1. As used herein, a tilt propeller lift configuration refers to any tilt propeller orientation in which the tilt propeller thrust is providing primarily lift to the aircraft and tilt propeller cruise configuration refers to any tilt propeller orientation in which the tilt propeller thrust is providing primarily forward thrust to the aircraft.

In some embodiments, lift propellers 112, 212 may be configured for providing lift only, with all horizontal propulsion being provided by the tilt propellers. For example, lift propellers 112, 212 may be configured with fixed positions and may only generate thrust during take-off, landing and hover phases of flight. Meanwhile, tilt propellers 114, 214 may be tilted upward into a lift configuration in which thrust from propellers 114, 214 is directed downward to provide additional lift.

For forward flight, tilt propellers 114, 214 may tilt from their lift configurations to their cruise configurations. In other words, the orientation of tilt propellers 114, 214 may be varied from an orientation in which the tilt propeller thrust is directed downward (to provide lift during vertical take-off, landing and hover) to an orientation in which the tilt propeller thrust is directed rearward (to provide forward thrust to aircraft 100, 200). The tilt propellers assembly for a particular electric engine may tilt about an axis of rotation defined by a mounting point connecting the boom and the electric engine. When the aircraft 100, 200 is in full forward flight, lift may be provided entirely by wings 104, 204. Meanwhile, in the cruise configuration, lift propellers 112, 212 may be shut off. The blades 120, 220 of lift propellers 112, 212 may be held in low-drag positions for aircraft cruising. In some embodiments, lift propellers 112, 212 may each have two blades 120, 220 that may be locked, for example while the aircraft is cruising, in minimum drag positions in which one blade is directly in front of the other blade as illustrated in FIG. 1. In some embodiments, lift propellers 112, 212 have more than two blades. In some embodiments, tilt propellers 114, 214 may include more blades 116, 216 than lift propellers 112, 212. For example, as illustrated in FIGS. 1 and 2, lift propellers 112, 212 may each include, e.g., two blades, whereas and tilt propellers 114, 214 may each include more blades, such as the five blades shown. In some embodiments, each of the tilt propellers 114, 214 may have 2 to 5 blades, and possibly more depending on the design considerations and requirements of the aircraft.

In some embodiments, the aircraft may include a single wing 104, 204 on each side of fuselage 102, 202 (or a single wing that extends across the entire aircraft). At least a portion of lift propellers 112, 212 may be located rearward of wings 104, 204 (e.g., rotation point of propeller is behind a wing from a bird's eye view) and at least a portion of tilt propellers 114, 214 may be located forward of wings 104, 204 (e.g., rotation point of propeller is in front of a wing from a bird's eye view). In some embodiments, all of lift propellers 112, 212 may be located rearward of wings 104, 204 and all of tilt propellers 114, 214 may be located forward of wings 104, 204. According to some embodiments, all lift propellers 112, 212 and tilt propellers 114, 214 may be mounted to the wings—e.g., no lift propellers or tilt propellers may be mounted to the fuselage. In some embodiments, lift propellers 112, 212 may be all located rearwardly of wings 104, 204 and tilt propellers 114, 214 may be all located forward of wings 104, 204. According to some embodiments, all lift propellers 112, 212 and tilt propellers 114, 214 may be positioned inwardly of the ends of the wing 104, 204.

In some embodiments, lift propellers 112, 212 and tilt propellers 114, 214 may be mounted to wings 104, 204 by booms 122, 222. Booms 122, 222 may be mounted beneath wings 104, 204, on top of the wings, and/or may be integrated into the wing profile. In some embodiments, lift propellers 112, 212 and tilt propellers 114, 214 may be mounted directly to wings 104, 204. In some embodiments, one lift propeller 112, 212 and one tilt propeller 114, 214 may be mounted to each boom 122, 222. Lift propeller 112, 212 may be mounted at a rear end of boom 122, 222 and tilt propeller 114, 214 may be mounted at a front end of boom 122, 222. In some embodiments, lift propeller 112, 212 may be mounted in a fixed position on boom 122, 222. In some embodiments, tilt propeller 114, 214 may mounted to a front end of boom 122, 222 via a hinge. Tilt propeller 114, 214 may be mounted to boom 122, 222 such that tilt propeller 114, 214 is aligned with the body of boom 122, 222 when in its cruise configuration, forming a continuous extension of the front end of boom 122, 222 that minimizes drag for forward flight.

In some embodiments, aircraft 100, 200 may include, e.g., one wing on each side of fuselage 102, 202 or a single wing that extends across the aircraft. According to some embodiments, the at least one wing 104, 204 is a high wing mounted to an upper side of fuselage 102, 202. According to some embodiments, the wings include control surfaces, such as flaps, ailerons, and/or flaperons (e.g., configured to perform functions of both flaps and ailerons). According to some embodiments, wings 104, 204 may have designed with a profile that reduces drag during forward flight. In some embodiments, the wing tip profile may be curved and/or tapered to minimize drag.

In some embodiments, rear stabilizers 106, 206 include control surfaces, such as one or more rudders, one or more elevators, and/or one or more combined rudder-elevators. The wing(s) may have any suitable design for providing lift, directionality, stability, and/or any other characteristic beneficial for aircraft. In some embodiments, the wings have a tapering leading edge.

In some embodiments, lift propellers 112, 212 or tilt propellers 114, 214 may be canted relative to at least one other lift propeller 112, 212 or tilt propeller 114, 214, where canting refers to a relative orientation of the rotational axis of the lift propeller/tilt propeller about a line that is parallel to the forward-rearward direction, analogous to the roll degree of freedom of the aircraft.

In some embodiments, one or more lift propellers 112, 212 and/or tilt propellers 114, 214 may canted relative to a cabin of the aircraft, such that the rotational axis of the propeller in a lift configuration is angled away from an axis perpendicular to the top surface of the aircraft. For example, in some embodiments, the aircraft is a flying wing aircraft as shown in FIG. 9E below, and some or all of the propellers are canted away from the cabin.

Figure 3:
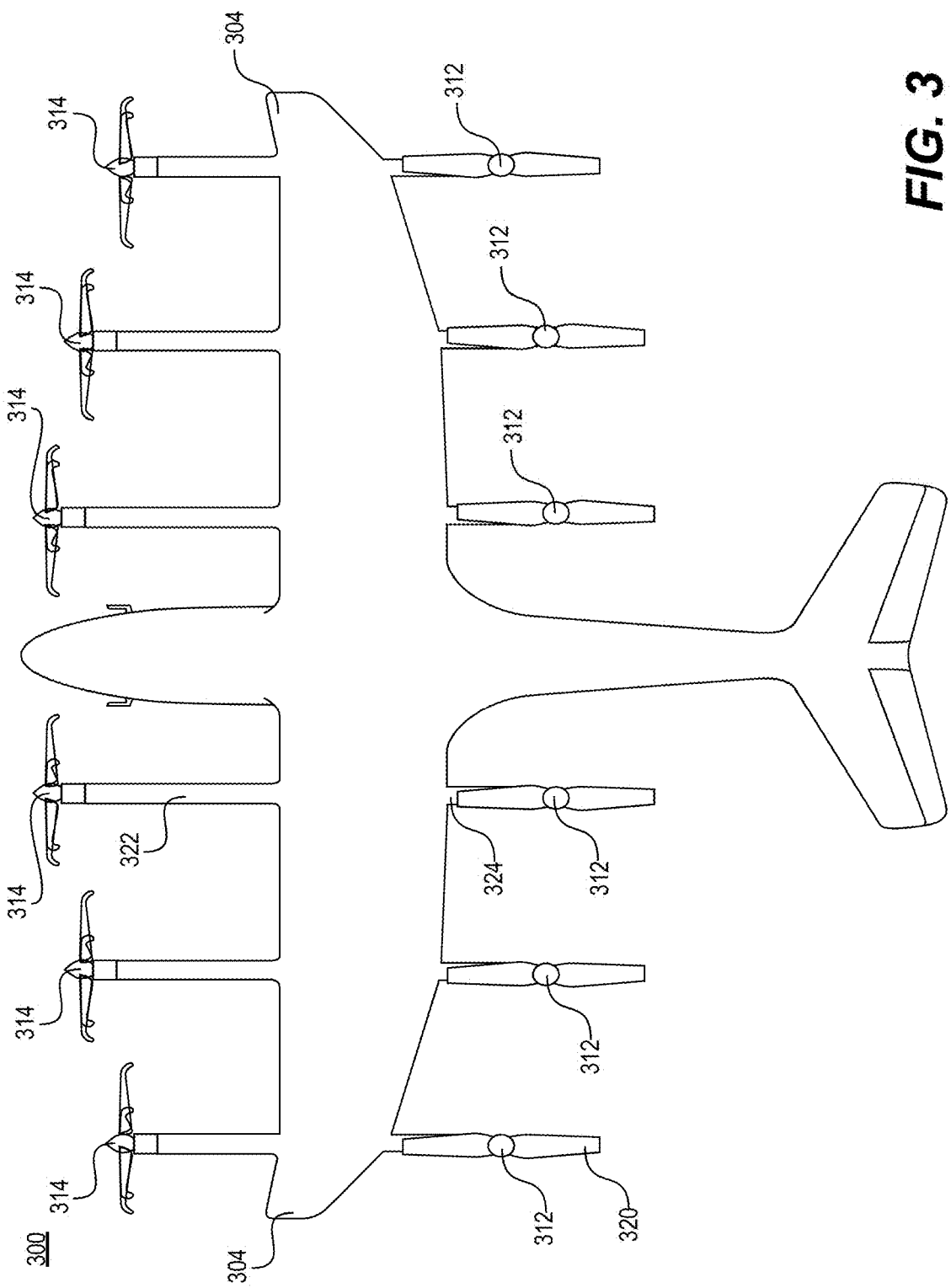
FIG. 3 shows an exemplary top plan view of a VTOL aircraft, consistent with disclosed embodiments.

FIG. 3 is an illustration of a top plan view of an exemplary VTOL aircraft, consistent with embodiments of the present disclosure. Aircraft 300 shown in the figure may be a top plan view of the aircraft 100, 200 shown in FIGS. 1 and 2, respectively. As discussed herein, an aircraft 300 may include twelve electric propulsion systems distributed across the aircraft 300. In some embodiments, a distribution of electric propulsion systems may include six forward electric propulsion systems 314 and six aft electric propulsion systems 312 mounted on booms forward and aft of the main wings 304 of the aircraft 300. In some embodiments, forward electric propulsion systems may be mounted to wings 304 by booms 322. In some embodiments, aft electric propulsion systems may be mounted to wings 304 by booms 324. In some embodiments, a length of the rear end of the boom 324 from the wing 304 to a lift propeller (part of electric propulsion system 312) may comprise a similar rear end of the boom 324 length across the numerous rear ends of the booms. In some embodiments, the length of the rear ends of the booms may vary, for example, across the six rear ends of the booms. Further, FIG. 3 depicts an exemplary embodiment of a VTOL aircraft 300 with forward propellers (part of electric propulsion system 314) in a horizontal orientation for horizontal flight and aft propeller blades 320 in a stowed position for a forward phase of flight.

Figure 4:
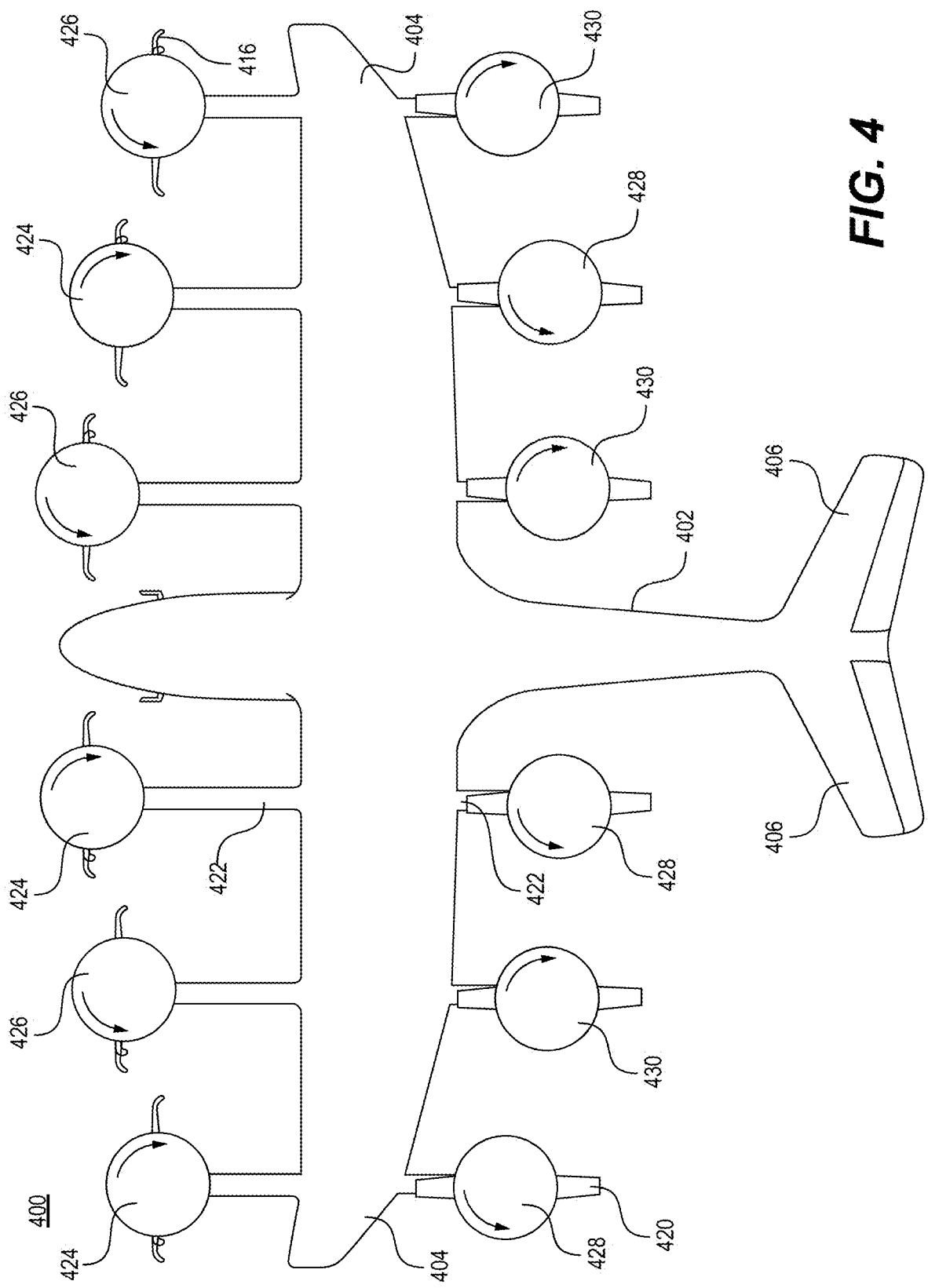
FIG. 4 illustrates exemplary propeller rotation of a VTOL aircraft, consistent with disclosed embodiments.

FIG. 4 is a schematic diagram illustrating exemplary propeller rotation of a VTOL aircraft, consistent with disclosed embodiments. Aircraft 400 shown in the figure may be a top plan view of the aircraft 100, 200, and 300 shown in FIGS. 1, 2, and 3, respectively. An aircraft 400 may include six forward electric propulsion systems with three of the forward electric propulsion systems being of CW type 424 and the remaining three forward electric propulsion systems being of CCW type 426. In some embodiments, three aft electric propulsion systems may be of CCW type 428 with the remaining three aft electric propulsion systems being of CW type 430. Some embodiments may include an aircraft 400 possessing four forward electric propulsion systems and four aft electric propulsion systems, each with two CW types and two CCW types. In some embodiments, aircraft 400 may include a fuselage 402, wing(s) 404 mounted to the fuselage 402, and one or more rear stabilizers 406 mounted to the rear of the fuselage 402. In some embodiments, each forward electric propulsion system may include propeller blades 416. In some embodiments, each aft electric propulsion system may include propeller blades 420. In some embodiments, electric propulsion systems may be mounted to wing(s) 404 by booms 422. In some embodiments, propellers may counter-rotate with respect to adjacent propellers to cancel torque steer, generated by the rotation of the propellers, experienced by the fuselage or wings of the aircraft. In some embodiments, the difference in rotation direction may be achieved using the direction of engine rotation. In other embodiments, the engines may all rotate in the same direction, and gearing may be used to achieve different propeller rotation directions.

Some embodiments may include an aircraft 400 possessing forward and aft electric propulsion systems where the amount of CW types 424 and CCW types 426 is not equal among the forward electric propulsion systems, among the aft electric propulsion systems, or among the forward and aft electric propulsion systems.

Figure 5:
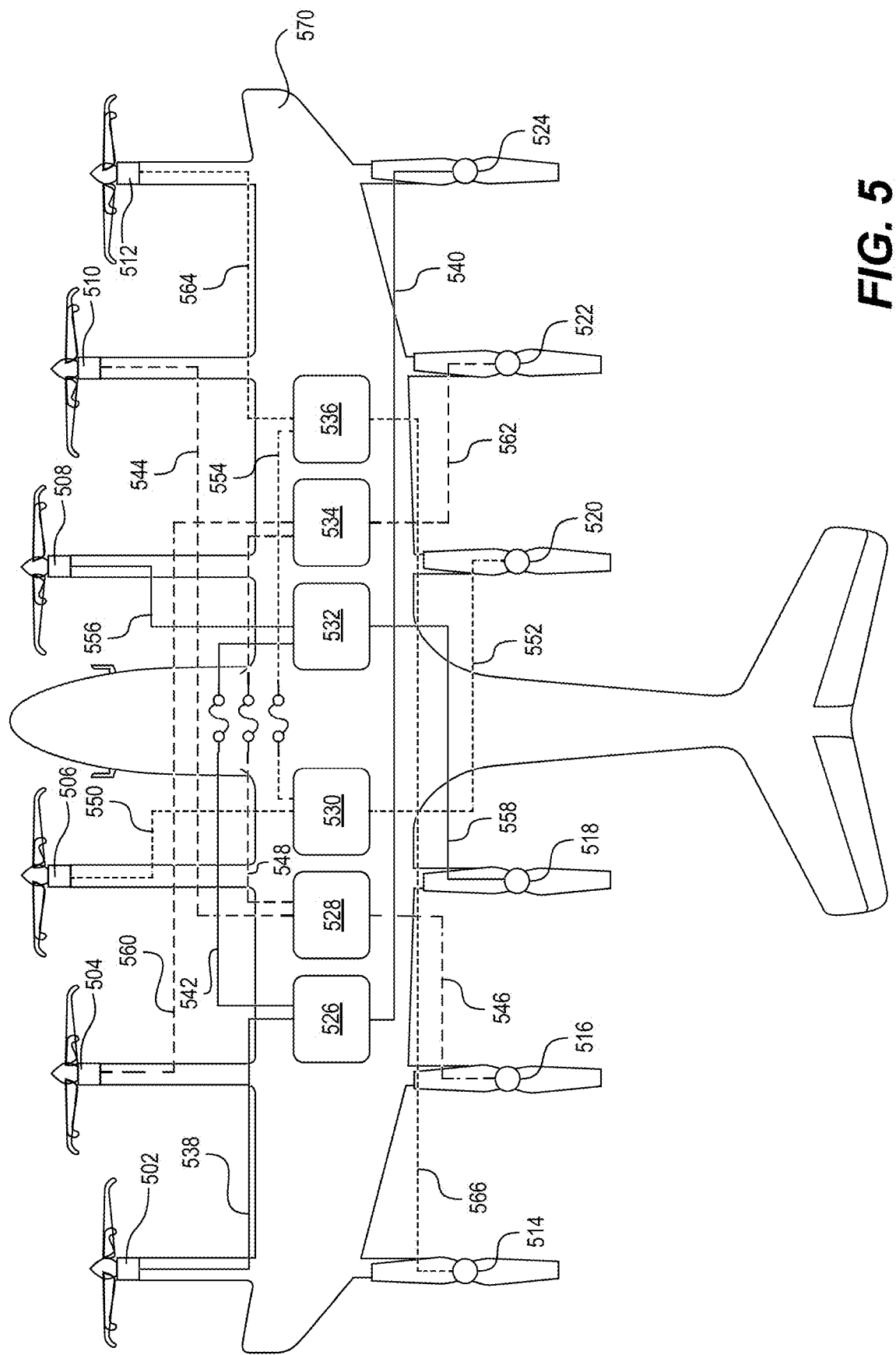
FIG. 5 shows exemplary power connections in a VTOL aircraft, consistent with disclosed embodiments.

FIG. 5 is a schematic diagram illustrating exemplary power connections in a VTOL aircraft, consistent with disclosed embodiments. A VTOL aircraft may have multiple power systems connected to diagonally opposing electric propulsion systems. In some embodiments, the power systems may include high voltage power systems. Some embodiments may include high voltage power systems connected to electric engines via high voltage channels. In some embodiments, an aircraft 500 may include six power systems (e.g., battery packs), including power systems 526, 528, 530, 532, 534, and 536 stored within the wing 570 of the aircraft 500. The power systems may power electric propulsion systems and/or other electric components of the aircraft 500. In some embodiments, the aircraft 500 may include six forward electric propulsion systems having six electric engines 502, 504, 506, 508, 510, and 512 and six aft electric propulsion systems having six electric engines 514, 516, 518, 520, 522, and 524. In some embodiments, one or more power systems (e.g., battery packs) may include a battery management system ("BMS") (e.g., one BMS for each battery pack). While six power systems are shown in FIG. 5, the aircraft 500 may include any number and/or configuration of power systems.

Figure 6:
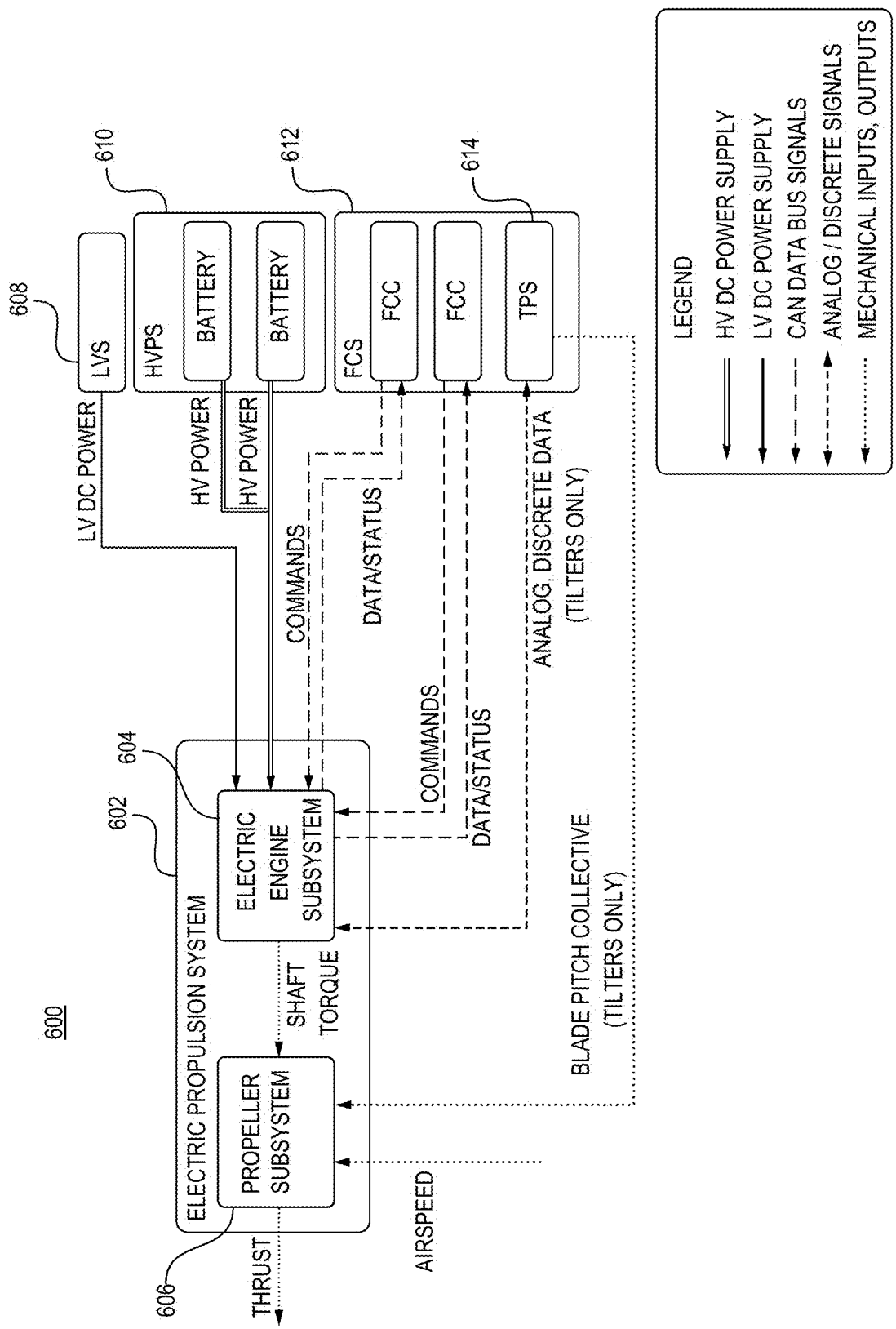
FIG. 6 shows an exemplary architecture of an electric propulsion unit, consistent with disclosed embodiments.

In some embodiments, the one or more battery management systems may communicate with a Flight Control System ("FCS") of the aircraft (e.g., FCS 612 shown in FIG. 6). For example, the FCS may monitor the status of one or more battery packs and/or provide commands to the one or more battery management systems which make corresponding adjustments to the high voltage power supply.

FIG. 6 illustrates block diagram of an exemplary architecture and design of an electric propulsion unit 600 consistent with disclosed embodiments. Exemplary electric propulsion unit 600 includes an electric propulsion system 602, which may be configured to control aircraft propellers. Electric propulsion system 602 may include an electric engine subsystem 604 that may supply torque, via a shaft, to a propeller subsystem 606 to produce the thrust of the electric propulsion system 602. Some embodiments may include the electric engine subsystem 604 receiving low voltage direct current (LV DC) power from a Low Voltage System (LVS) 608. In some embodiments, the electric engine subsystem 604 may be configured to receive high voltage (HV) power from a High Voltage Power System (HVPS) 610 comprising at least one battery or other device capable of storing energy. HV power may refer to power that is lower in voltage than voltage provided by Low Voltage System (LVS) 608.

Some embodiments may include an electric propulsion system 602 including an electric engine subsystem 604 receiving signals from and sending signals to a flight control system 612. In some embodiments, a flight control system (FCS) 612 may comprise a flight control computer (FCC) capable of using Controller Area Network ("CAN") data bus signals to send commands to the electric engine subsystem 604 and receive status and data from the electric engine subsystem 604. An FCC may include a device configured to perform one or more operations (e.g., computational operations) for an aircraft, such as at least one processor and a memory component, which may store instructions executable by the at least one processor to perform the operations, consistent with disclosed embodiments. It should be understood that while CAN data bus signals are used between the flight control computer and the electric engine(s), some embodiments may include any form of communication with the ability to send and receive data from a flight control computer to an electric engine. Some embodiments may include electric engine subsystems 604 capable of receiving operating parameters from and communicating operating parameters to an FCC in FCS 612, including speed, voltage, current, torque, temperature, vibration, propeller position, and/or any other value of operating parameters.

In some embodiments, a flight control system 612 may also include a Tilt Propeller System ("TPS") 614 capable of sending and receiving analog, discrete data to and from the electric engine subsystem 604 of the tilt propellers. A tilt propeller system (TPS) 614 may include an apparatus capable of communicating operating parameters to an electric engine subsystem 604 and articulating an orientation of the propeller subsystem 606 to redirect the thrust of the tilt propellers during various phases of flight using mechanical means such as a gearbox assembly, linear actuators, and any other configuration of components to alter an orientation of the propeller subsystem 606. In some embodiments, electric engine subsystem may communicate an orientation of the propeller system (e.g., an angle between lift and forward thrust) to TPS 614 and/or FCS 612 (e.g., during flight).

Figure 7:
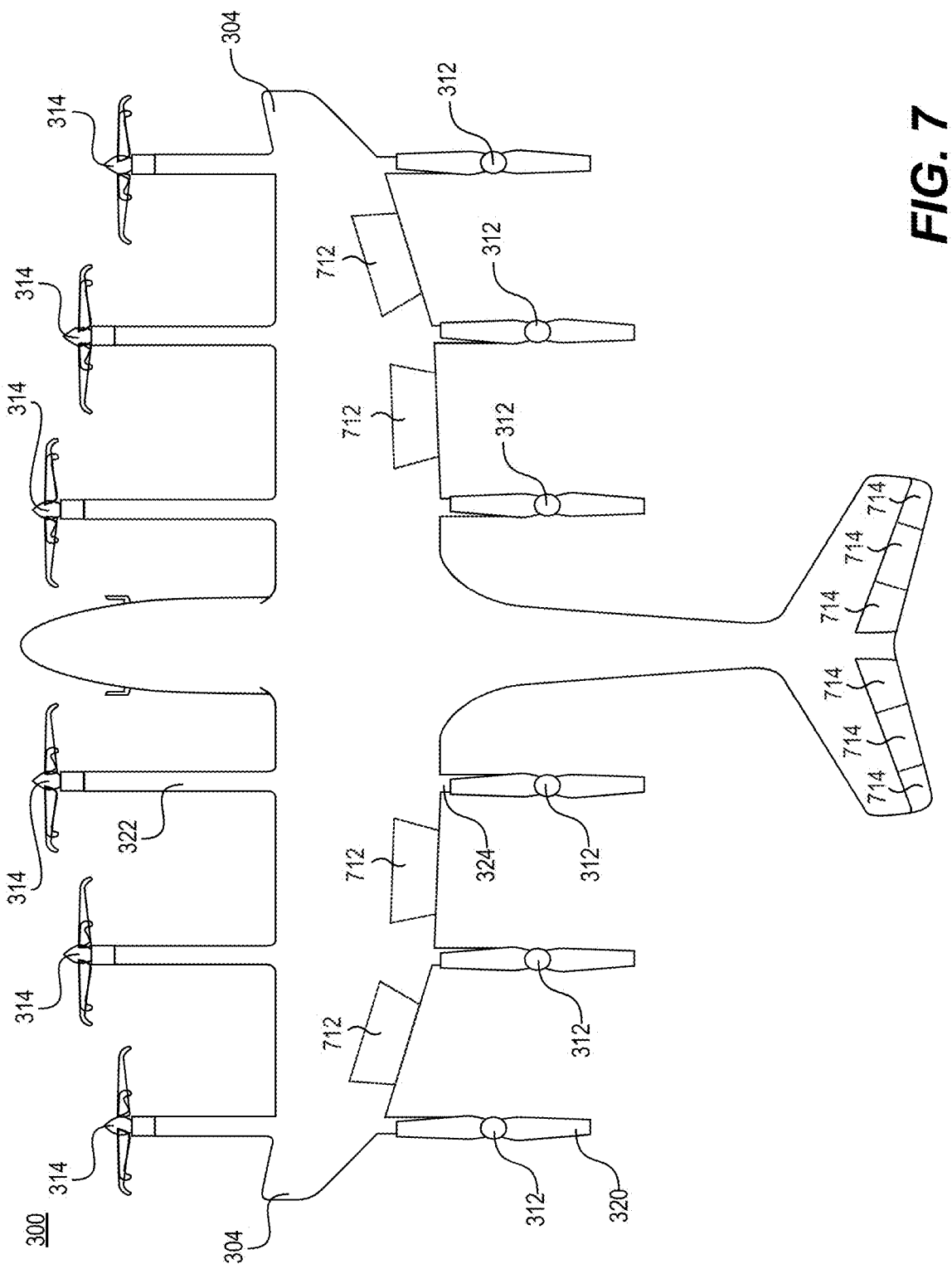
FIG. 7 shows an exemplary top plan view of a VTOL aircraft, consistent with disclosed embodiments.

In some embodiments, a flight control system may include a system capable of controlling control surfaces and their associated actuators in an exemplary VTOL aircraft. FIG. 7 is an illustration of a top plan view of an exemplary VTOL aircraft, consistent with embodiments of the present disclosure. Aircraft 700 shown in the figure may be a top plan view of the aircraft 100, 200 shown in FIGS. 1 and 2, respectively, in addition to the aircraft components described above with reference to FIG. 3. In aircraft 700, the control surfaces may include, in addition to the propeller blades discussed earlier, flaperons 712 and ruddervators 714. Flaperons 712 may combine functions of one or more flaps, one or more ailerons, and/or one or more spoilers. Ruddervators 714 may combine functions or one or more rudders and/or one or more elevators. Additionally or alternatively, control surfaces may include separate rudders and elevators. In aircraft 700, the actuators may include, in addition to the electric propulsion systems discussed earlier, control surface actuators (CSAs) associated with flaperons 712 and ruddervators 714, as discussed further below with reference to FIG. 8.

Figure 8:
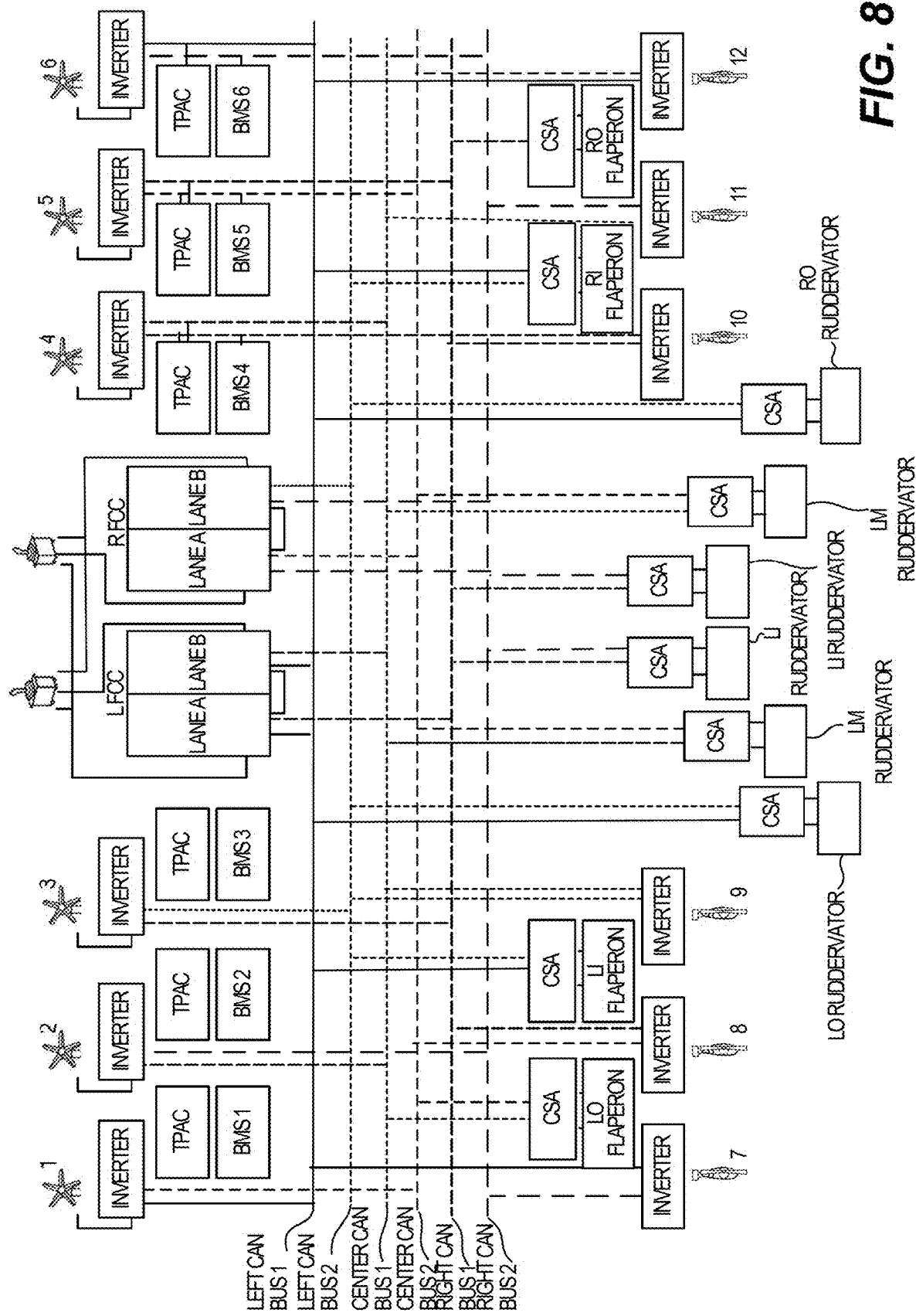
FIG. 8 shows an exemplary flight control signaling architecture, consistent with disclosed embodiments.

FIG. 8 illustrates a flight control signaling architecture for controlling the control surfaces and associated actuators, according to various embodiments. Although FIG. 7 illustrates twelve EPU inverters and associated propeller blades, six tilt propeller actuators (TPACs), six battery management systems (BMSs), four flaperons and associated control surface actuators (CSAs), and six ruddervators and associated CSAs, aircraft according to various embodiments can have any suitable number of these various elements. As shown in FIG. 8, control surfaces and actuators may be controlled by a combination of four flight control computers (FCCs)— Left FCC, Lane A (L FCC-A), Left FCC, Lane B (L FCC-B), Right FCC, Lane A (R FCC-A), and Right FCC, Lane A (R FCC-B), although any other suitable number of FCCs may be utilized. The FCCs may each individually control all control surfaces and actuators or may do so in any combination with each other. In some embodiments, each FCC may include one or more hardware computing processors. In some embodiments, each FCC may utilize a single-threaded computing process or a multi-threaded computing process to perform the computations required to control the control surfaces and actuators. In some embodiments, all computing process required to control the control surfaces and actuators may be performed on a single computing thread by a single flight control computer.

The FCCs may provide control signals to the control surface actuators, including the EPU inverters, TPACs, BMSs, flaperon CSAs, and ruddervator CSAs, via one or more bus systems. For different control surface actuators, the FCC may provide control signals, such as voltage or current control signals, and control information may be encoded in the control signals in binary, digital, or analog form. In some embodiments, the bus systems may each be a CAN bus system, e.g., Left CAN bus 1, Left CAN bus 2, Right CAN bus 1, Right CAN bus 2, Center CAN bus 1, Center CAN bus 2 (see FIG. 8). In some embodiments, multiple FCCs may be configured to provide control signals via each CAN bus system, and each FCC may be configured to provide control signals via multiple CAN bus systems. In the exemplary architecture illustrated in FIG. 8, for example, L FCC-A may provide control signals via Left CAN bus 1 and Right CAN bus 1, L FCC-B may provide control signals via Left CAN bus 1 and Center CAN bus 1, R FCC-A may provide control signals via Center CAN bus 2 and Right CAN bus 2, and R FCC-B may provide control signals via Left CAN bus 2 and Right CAN bus 2.

FIGS. 9A-9F are illustrations of a top plan view of exemplary VTOL aircrafts, consistent with embodiments of the present disclosure. There may be a number of design considerations (cost, weight, size, performance capability etc.) that may influence the number and/or combination of tilt and lift propellers in a VTOL aircraft. As further described below, the number and orientation of propellers (and other effectors or actuators) may affect how the flight control system controls the aircraft to avoid instability and uncontrollability caused by propeller(s) entering vortex ring state. For example, in some embodiments, in an aircraft configuration with more propellers, the flight control system may allow a propeller to get close (or enter) a vortex ring state boundary. In contrast, in an aircraft configuration with fewer propellers, the flight control system may control the aircraft more cautiously to avoid a propeller entering vortex ring state.

FIG. 9A illustrates an arrangement of electric propulsion units, consistent with embodiments of the present disclosure. Referring to FIG. 9A, the aircraft shown in the figure may be a top plan view of an exemplary aircraft (e.g., a VTOL aircraft). The aircraft may include twelve electric propulsion systems distributed across the aircraft. In some embodiments, a distribution of electric propulsion systems may include six forward electric propulsion systems (901, 902, 903, 904, 905, and 906) and six aft electric propulsion systems (907, 908, 909, 910, 911, and 912). In some embodiments, the six forward electric propulsion systems may be operatively connected to tilt propellers and the six aft electric propulsion systems may be operatively connected to lift propellers. In other embodiments, the six forward electric propulsion systems and a number of aft electric propulsion systems may be operatively connected to tilt propellers and the remaining aft electric propulsion systems may be operatively connected to lift propellers. In other embodiments, all forward and aft electric propulsion systems may be operatively coupled to tilt propellers.

FIG. 9B illustrates an alternate arrangement of electric propulsion units, consistent with embodiments of the present disclosure. Referring to FIG. 9B, the aircraft shown in the figure may be a top plan view of an exemplary aircraft (e.g., a VTOL aircraft). The aircraft may include eight electric propulsion systems distributed across the aircraft. In some embodiments, a distribution of electric propulsion systems may include four forward electric propulsion systems (913, 914, 915, and 916) and four aft electric propulsion systems (917, 918, 919, and 920). In some embodiments, the four forward electric propulsion systems may be operatively connected to tilt propellers and the four aft electric propulsion systems may be operatively connected to lift propellers. In other embodiments, the four forward electric propulsion systems and a number of aft electric propulsion systems may be operatively connected to tilt propellers and the remaining aft electric propulsion systems may be operatively connected to lift propellers. In other embodiments, all forward and aft electric propulsion systems may be operatively coupled to tilt propellers.

FIG. 9C illustrates an alternate arrangement of electric propulsion units, consistent with embodiments of the present disclosure. Referring to FIG. 9C, the aircraft shown in the figure may be a top plan view of an exemplary aircraft (e.g., a VTOL aircraft). The aircraft may include six electric propulsion systems distributed across the aircraft. In some embodiments, a distribution of electric propulsion systems may include a first set of four electric propulsion systems 921, 922, 923, and 924 coplanar in a first plane and a second set of two electric propulsion systems 925 and 926 coplanar in a second plane. In some embodiments, the first set of electric propulsion systems 921-924 may be operatively connected to tilt propellers and second set of electric propulsion systems 925 and 926 may be operatively connected to lift propellers. In other embodiments, the first set of electric propulsion systems 921-924 and the second set of aft electric propulsion systems 925 and 926 may all be operatively connected to tilt propellers.

FIG. 9D illustrates an alternate arrangement of electric propulsion units, consistent with embodiments of the present disclosure. Referring to FIG. 9D, the aircraft shown in the figure may be a top plan view of an exemplary aircraft (e.g., a VTOL aircraft). The aircraft may include four electric propulsion systems distributed across the aircraft. In some embodiments, a distribution of electric propulsion systems may include four coplanar electric propulsion systems 927, 928, 929, and 930. In some embodiments, all of the electric propulsion systems may be operatively connected to tilt propellers.

FIG. 9E illustrates an alternate arrangement of electric propulsion units, consistent with embodiments of the present disclosure. Referring to FIG. 9E, the aircraft shown in the figure may be a top plan view of an exemplary aircraft (e.g., a VTOL aircraft). The aircraft may include six electric propulsion systems distributed across the aircraft. For example, in some embodiments, the aircraft may include four forward electric propulsion systems 931, 932, 933, and 934 operatively connected to tilt propellers and the two aft ducted fans 935 and 936 operatively connected to lift propellers. In some embodiments, the aircraft may include ten electric propulsion systems distributed across the aircraft. For example, in some embodiments, the aircraft may include six forward electric propulsion systems operatively connected to tilt propellers and the four aft electric propulsion systems operatively connected to lift propellers. In some embodiments, some or all of the aft electric propulsion systems may operatively connected to tilt propellers.

As shown in FIG. 9E, in some embodiments, the aircraft may have a flying wing configuration, such as a tailless fixed-wing aircraft with no definite fuselage. In some embodiments, the aircraft may have a flying wing configuration with the fuselage integrated into the wing. In some embodiments, the tilt propellers may rotate in a plane above the body of the aircraft when the tilt propellers operate in a lift configuration.

FIG. 9F illustrates an alternate arrangement of electric propulsion units, consistent with the embodiments of the present disclosure. Referring to FIG. 9F, the aircraft may be a top plan view of an exemplary aircraft. In some embodiments, the aircraft may include ducted fans 936, 937, 938, and 939 operably connected to the electric propulsion systems. In some embodiments the aircraft may include a bank of ducted fans on each wing of the aircraft and the bank of ducted fans may be connected to tilt together (e.g., between lift and forward thrust configuration). In some embodiments the aircraft includes a left and right front wing and a left and right rear wing. In some embodiments, each wing of the aircraft includes a bank of connected ducted fans. In some embodiments, each bank of connected ducted fans are tiltable (e.g., between lift and forward thrust), while in other embodiments only the bank of fans on the front wing(s) are tiltable.

As disclosed herein, the forward electric propulsion systems and aft electric propulsion systems may be of a clockwise (CW) type or counterclockwise (CCW) type. Some embodiments may include various forward electric propulsion systems possessing a mixture of both CW and CCW types. In some embodiments, the aft electric propulsion systems may possess a mixture of CW and CCW type systems among the aft electric propulsion systems. In some embodiments, each electric propulsion systems may be fixed as clockwise (CW) type or counterclockwise (CCW) type, while in other embodiments, one or more electric propulsion systems may vary between clockwise (CW) and counterclockwise (CCW) rotation.

Figure 10:
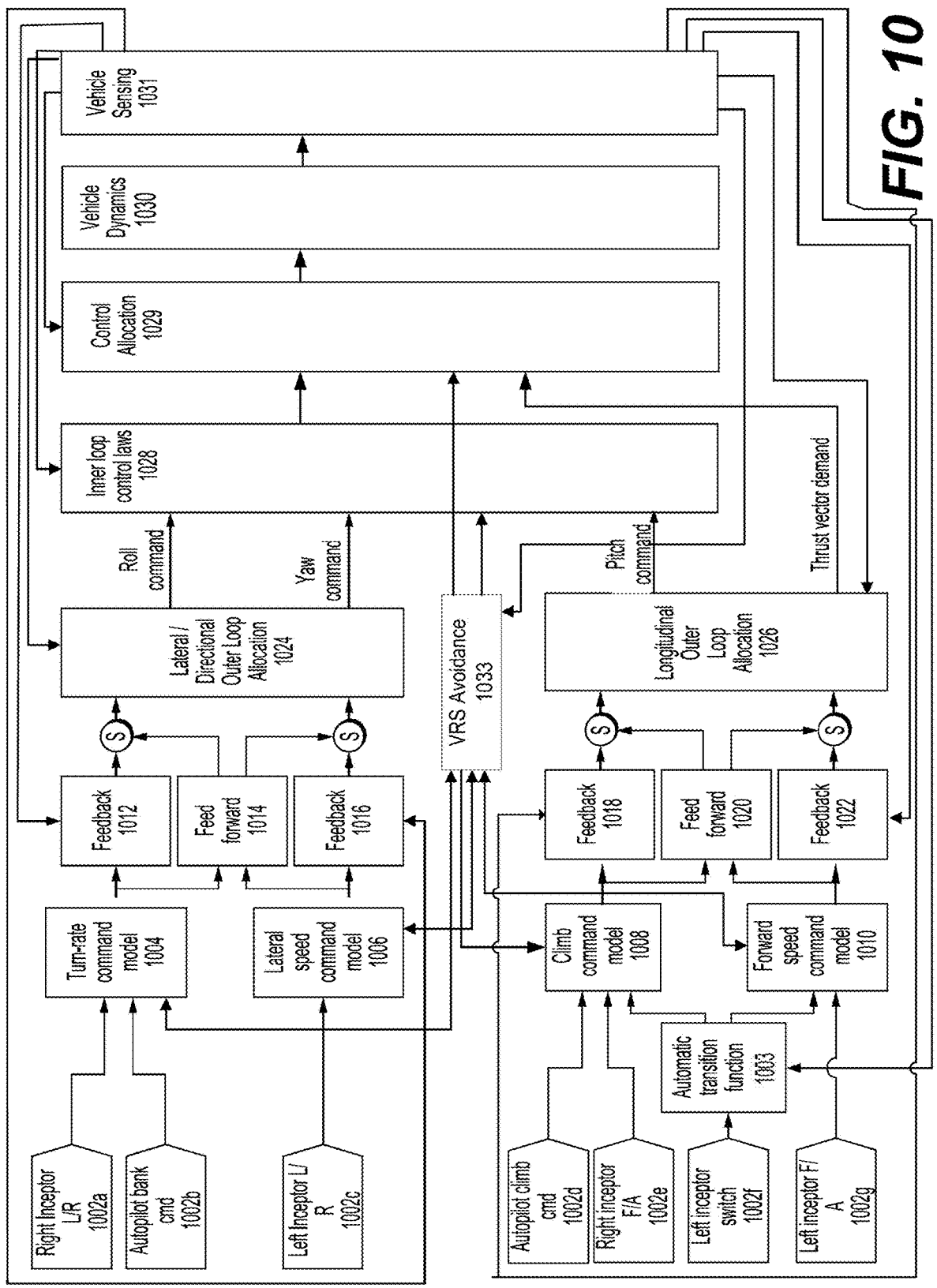
FIG. 10 illustrates a functional block diagram of an exemplary control system of an electric VTOL aircraft, consistent with disclosed embodiments.

FIG. 10 illustrates a functional block diagram of an exemplary control system 1000 of an aircraft, consistent with disclosed embodiments. System 1000 may be implemented by at least one processor (e.g., at least one a microprocessor-based controller) configured to execute software code stored in a storage medium (e.g., a computer-readable medium, a non-transitory computer-readable medium) to implement the functions described herein. System 1000 may also be implemented in hardware, or a combination of hardware and software. System 1000 may be implemented as part of a flight control system of the aircraft (e.g., part of FCS 612 in FIG. 6) and may be configured to perform a single step or sequence repeatedly until a desired or commanded outcome is achieved. It is to be understood that many conventional functions of the control system are not shown in FIG. 10 for ease of description. System 1000 further includes one or more storage mediums storing model(s), function(s), table(s), and/or any information for executing the disclosed processes. As further described below, any or each box indicating a command model (e.g., 1004, 1006, 1008, and 1010), feedback (1012, 1016, 1018, and 1022), feed forward (1014, 1020), Outer Loop Allocation (1024, 1026), inner loop control laws 1028, and control allocation 1029 may represent or include module(s), script(s), function(s), application(s), and/or program(s) that are executed by processor(s) and/or microprocessor(s) of system 1000. It is appreciated that the complexity and interconnectedness of the functional block diagram of FIG. 10 would be impossible, or at least impractical, to effectively implement by a human user, especially when considering that these functionalities are implemented while the aircraft is flying (including taking off or landing).

In some embodiments, control system 1000 may be configured based on one or more flight control laws. Flight control law may comprise a set of algorithms, models, and/or rules configured to govern a behavior of an aircraft (e.g., control or influence one or more effectors of the aircraft) in response to one or more pilot inputs and external factors. In some embodiments, flight control laws may be configured to achieve at least one of desired flight characteristics, stability, or performance. For example, flight control laws may be configured to ensure stability and controllability of an aircraft by controlling how the aircraft responds to at least one of one or more pilot inputs, vehicle dynamics (e.g., disturbances, such as turbulence, gusts, etc.), or changes in flight conditions (e.g., altitude, airspeed, angle of attack).

System 1000 may detect one or more inputs, such as from a pilot input device configured to receive at least one pilot input and generate or influence a signal. A pilot input may be generated by and/or received from an input device or mechanism of the aircraft, such as a button, a switch, a stick, a slider, an inceptor, or any other device configured to generate or influence a signal based on a physical action from a pilot. For example, a pilot input device may include one or more of right inceptor(s) (e.g., moving right inceptor left/right 1002a and/or right inceptor forward/aft 1002c), left inceptor(s) (e.g., moving left inceptor left/right 1002c and/or left inceptor forward/aft 1002g), and/or left inceptor switch 1002f. In some embodiments, a pilot input device may include an interface with an autopilot system (e.g., display screen(s), switch(es), button(s), lever(s), and/or other interface(s)). Optionally, system 1000 may further detect inputs from an autopilot system, such as autopilot roll command 1002b, autopilot climb command 1002d, and/or other command(s) to control the aircraft.

In some embodiments, the one or more inputs may include at least one of a position and/or rate of a right inceptor and/or a left inceptor, signals received (e.g., response type change commands, trim inputs, reference inputs, backup control inputs, etc.) from switches on the inceptors, measurements of aircraft state and environmental conditions (e.g., measured load factor, airspeed, roll angle, pitch angle, actuator states, battery states, aerodynamic parameters, temperature, gusts, etc.) based on data received from one or more sensors of the aircraft, obstacles (e.g., presence or absence of other aircraft and/or debris), and an aircraft mode (e.g., taxiing on the ground, takeoff, in-air). For example, right inceptor L/R 1002a may comprise a lateral position and/or rate of a right inceptor (e.g., an inceptor positioned to the right of another inceptor and/or an inceptor positioned on the right side of a pilot area), autopilot roll command 1002b may comprise a roll signal received in autopilot mode, left inceptor L/R 1002c may comprise a lateral position and/or rate of a left inceptor (e.g., an inceptor positioned to the left of another inceptor and/or an inceptor positioned on the left side of a pilot area), autopilot climb command 1002d may comprise a climb signal received in autopilot mode, right inceptor F/A 1002e may comprise a longitudinal position and/or rate of the right inceptor, left inceptor switch 1002f may comprise a signal from a switch for enabling or disabling automatic transition function 1003, and left inceptor F/A 1002g may comprise a longitudinal position and/or rate of the left inceptor.

Each input may include data as listed above (e.g., signals from switches, measurements of aircraft state, aircraft mode, etc.). Actuator states may include actuator hardware limits, such as travel limits, speed limits, response time limits, etc., and can include actuator health indicators that may indicate deteriorations in actuator performance that may limit a given actuator's ability to satisfy actuator commands. Actuator states may be used to determine the bounds (e.g., minimum/maximum values) for individual actuator commands. Battery states may correspond to remaining energy of the battery packs of the aircraft, which may be monitored when control allocation 1029 considers balancing battery pack energy states. Aerodynamic parameters may be parameters derived from aerodynamic and acoustic modeling and can be based on the actuator Jacobian matrices and actuator states. Each input received from an inceptor may indicate a corresponding adjustment to an aircraft's heading or power output.

Command models 1004, 1006, 1008 and 1010 may be configured to determine a shape (e.g., aggressiveness, slew rate, damping, overshoot, etc.) of an ideal aircraft response. For example, each command model of command models 1004, 1006, 1008 and 1010 may be configured to receive and interpret at least one of inputs 1002a, 1002b, 1002c, 1002d, 1002c, 1002f and 1002g and, in response, compute a corresponding change to an aircraft's orientation, heading, and propulsion, or a combination thereof using an integrator (not pictured). In some embodiments, right inceptor L/R 1002a and autopilot roll command 1002b may be fed into turn-rate command model 1004, left inceptor L/R 1002c may be fed into lateral speed command model 1006, autopilot climb command 1002d and right inceptor F/A 1002e may be fed into climb command model 1008, and left inceptor F/A 1002g may be fed into forward speed command model 1010. In some embodiments, an output from automatic transition function 1003 may be fed into at least one of climb command model 1008 or forward speed command model 1010. For example, based on receiving an enable signal from left inceptor switch 1002f, automatic transition function 1003 may automatically determine at least one of a climb signal or a forward speed signal for transmission to at least one of climb command model 1008 or forward speed command model 1010.

Turn-rate command model 1004 may be configured to output a desired position and/or turn-rate command and may also be configured to compute a desired heading of the aircraft to be assumed when the inceptor is brought back to a centered position (e.g., in detent). Lateral speed command model 1006 may be configured to output a desired position and/or lateral speed command. Climb command model 1008 may be configured to output at least one of a desired altitude, vertical speed, or vertical acceleration command. Forward speed command model 1010 may be configured to output at least one of a desired position, longitudinal speed, or longitudinal acceleration command. In some embodiments, one or more of the command models may be configured to output an acceleration generated in response to changes in speed command. For example, climb command model 1008 may be configured to output a vertical acceleration generated in response to a change in vertical speed command.

Feed forward 1014 and 1020 may each receive as input one or more desired changes (e.g., desired position, speed and/or acceleration) from corresponding command models 1004, 1006, 1008 or 1010 as well as data received from the one or more aircraft sensors (e.g., airspeed, vehicle orientation, vehicle load factor, measured acceleration, vehicle mass and inertia, air density, altitude, aircraft mode, etc.) and may be configured to output, for each desired change, a corresponding force to accomplish the desired change. In some embodiments, feed forward 1014 and 1020 may be configured to determine the corresponding force using simplified models of aircraft dynamics. For example, based on a known (e.g., a stored value of) or determined mass of the aircraft, feed forward 1014 and 1020 may be configured to determine a force to cause the aircraft to follow a desired acceleration command. In some embodiments, feed forward 1014 and 1020 may be configured to use a model predicting an amount of drag on the vehicle produced as a function of speed in order to determine a force required to follow a desired speed command signal.

Feedback 1012, 1016, 1018, and 1022 may each receive as input the one or more desired changes (e.g., desired position, speed and/or acceleration) from command models 1004, 1006, 1008 and 1010 as well as data received from Vehicle Sensing 1031 indicative of Vehicle Dynamics 1030. For example, sensed Vehicle Dynamics 1030 may comprise the physics and/or natural dynamics of the aircraft, and Vehicle Sensing 1031 sensor measurements may capture how the aircraft moves in response to pilot inputs, propulsion system outputs or ambient conditions. In some embodiments, Vehicle Dynamics 1030 may represent the control of different flight elements (e.g., electric propulsion system(s) and/or control surfaces) and the corresponding effect on the flight elements and aircraft dynamics. Additionally or alternatively, data received from Vehicle Sensing 1031 may include error signals generated, by one or more processors, based on exogenous disturbances (e.g., gust causing speed disturbance). In some embodiments, feedback 1012, 1016, 1018 and 1022 may be configured to generate feedback forces (e.g., at an actuator) based on the received error signals. For example, feedback 1012, 1016, 1018 and 1022 may generate feedback forces with the intent of counteracting the effect(s) of external disturbances. Additionally or alternatively, feedback 1012, 1016, 1018 and 1022 may be configured to generate feedback forces based on modeling errors. For example, if an incorrect aircraft mass is input into either feed forward 1014 or 1020, the aircraft may accelerate faster or slower than the desired change. Based on determining a difference between the desired acceleration and the measured acceleration, one or more processors may generate an error signal (e.g., included in Vehicle Sensing 1031) which may be looped into feedback 1012, 1016, 1018 or 1022 to determine an additional force needed to correct the error.

In some embodiments, feedback 1012, 1016, 1018 or 1022 may be disabled. For example, in response to losing position and/or ground speed feedback due to disruption of global position system (GPS) communication, system 1000 may be configured to operate without feedback 1012, 1016, 1018 or 1022 until GPS communication is reconnected.

In some embodiments, feedback 1012, 1016, 1018 or 1022 may receive as input a plurality of measurements as well as a trust value for each measurement indicating whether the measurement is valid. For example, one or more processors of system 1000 may assign a Boolean (true/false) value for each measurement used in system 1000 to indicate that the measurement is trustworthy (e.g., yes) or that the measurement may be invalid (e.g., no). Based on one or more processors identifying a measurement as invalid, feedback 1012, 1016, 1018 or 1022 may omit that measurement for further processing. For example, in response to one or more processors identifying a heading measurement as invalid, feedback 1012, 1016, 1018 or 1022 may omit subsequent heading measurements in determining feedback force(s).

In some embodiments, feedback 1012, 1016, 1018 or 1022 may determine one or more feedback forces based on actuator state information received from one or more sensors (e.g., included in Vehicle Sensing 1031). For example, in response to actuator state information indicating that there is a failure of an actuator, one or more processors of system 1000 may update one or more processes of System 1000 and determine an alternative command to achieve the desired change. For example, one or more processors of system

1000 may adjust one or more model(s), function(s), algorithm(s), table(s), input(s), parameter(s), threshold(s), and/or constraint(s) based on (e.g., in response to) a change in state (e.g., failure) of an actuator (or other aircraft component, such as an engine or battery, for other examples). Alternative command(s) (e.g., yaw, pitch, roll, thrust, or torque) may be determined based on the adjustment(s). Additionally or alternatively, in response to actuator state information indicating that one or more actuators are at a maximum value, one or more processors of system 1000 may update one or more processes of system 1000 (e.g., as described above) and determine an alternative command to achieve the desired change.

Total desired forces may be calculated based on outputs of feedback 1012, 1016, 1018 and 1022 and feed forward 1014 and 1020. For example, one or more processors of system 1000 may calculate a desired turn-rate force by summing the outputs of feedback 1012 and feed forward 1014. Additionally or alternatively, one or more processors of system 1000 may calculate a desired lateral force by summing the outputs of feedback 1016 and feed forward 1014. Additionally or alternatively, one or more processors of system 1000 may calculate a desired vertical force by summing the outputs of feedback 1018 and feed forward 1020. Additionally or alternatively, one or more processors of system 1000 may calculate a desired longitudinal force by summing the outputs of feedback 1022 and feed forward 1020.

Lateral/Directional Outer Loop Allocation 1024 and Longitudinal Outer Loop Allocation 1026 may each be configured to receive as input one or more desired forces and data received from Vehicle Sensing 1031 (e.g., airspeed, vehicle orientation, vehicle load factor, measured acceleration, vehicle mass and inertia, indications of working/failed actuators, air density, altitude, aircraft mode, whether the aircraft is in the air or on the ground, weight on wheels, etc.). Based on the inputs, Outer Loop Allocation 1024 and 1026 may be configured to command roll, command yaw, command pitch, demand thrust, or output a combination of different commands/demands in order to achieve the one or more desired forces.

Lateral/Directional Outer Loop Allocation 1024 may receive as input a desired turn-rate force and/or a desired lateral force and may command roll or command yaw. In some embodiments, Lateral/Directional Outer Loop Allocation 1024 may determine output based on a determined flight mode. A flight mode may be determined using pilot inputs (e.g., a selected mode on an inceptor) and/or sensed aircraft information (e.g., an airspeed). For example, Lateral/Directional Outer Loop Allocation 1024 may determine a flight mode of the aircraft using at least one of a determined (e.g., sensed or measured) airspeed or an input received at a pilot inceptor button (e.g., an input instructing the aircraft to fly according to a particular flight mode). In some embodiments, Lateral/Directional Outer Loop Allocation 1024 may be configured to prioritize a pilot inceptor button input over measured airspeed in determining the flight mode (e.g., the pilot inceptor button is associated with a stronger weight or higher priority than a measured airspeed). In some embodiments, Lateral/Directional Outer Loop Allocation 1024 may be configured to blend (e.g., using weighted summation) the determined airspeed and pilot inceptor button input to determine the flight mode of the aircraft. In a hover flight mode, Lateral/Directional Outer Loop Allocation 1024 may achieve the desired lateral force with a roll command (e.g., roll angle, roll rate) and may achieve the desired turn-rate force with a yaw command. In some embodiments, such as in hover flight mode, the aircraft may be configured to not be able to accelerate outside a predetermined hover envelope (e.g., hover speed range). In a forward-flight mode (e.g., horizontal flight), Lateral/Directional Outer Loop Allocation 1024 may achieve the desired lateral force with a yaw command and may achieve the desired turn-rate force with a roll command. In forward flight mode, Lateral/Directional Outer Loop Allocation 1024 may be configured to determine output based on sensed airspeed. In a transition between hover flight mode and forward flight mode, Lateral/Directional Outer Loop Allocation 1024 may achieve desired forces using a combination of a roll command and a yaw command.

Longitudinal Outer Loop Allocation 1026 may receive as input a desired vertical force and/or a desired longitudinal force and may output at least one of a pitch command (e.g., pitch angle) or a thrust vector demand. A thrust vector demand may include longitudinal thrust (e.g., mix of nacelle tilt and front propeller thrust) and vertical thrust (e.g., combined front and rear thrust). In some embodiments, Longitudinal Outer Loop Allocation 1026 may determine output based on a determined flight mode. For example, in a hover flight mode, Longitudinal Outer Loop Allocation 1026 may achieve a desired longitudinal force by lowering a pitch attitude and by using longitudinal thrust, and may achieve a desired vertical force with vertical thrust. In a forward-flight mode, Longitudinal Outer Loop Allocation 1026 may achieve a desired longitudinal force with longitudinal thrust (e.g., front propeller thrust). In a cruise flight mode, Longitudinal Outer Loop Allocation 1026 may achieve a desired vertical force by commanding pitch (e.g., raising pitch attitude) and demanding thrust (e.g., increasing longitudinal thrust).

Inner loop control laws 1028 may be configured to determine moment commands based on at least one of a roll command, yaw command, or pitch command from Lateral/Directional Outer Loop Allocation 1024 or Longitudinal Outer Loop Allocation 1026. In some embodiments, Inner loop control laws 1028 may be dependent on sensed Vehicle Dynamics (e.g., from Vehicle Sensing 1031). For example, Inner loop control laws 1028 may be configured to compensate for disturbances at the attitude and rate level in order to stabilize the aircraft. Additionally or alternatively, Inner loop control laws 1028 may consider periods of natural modes (e.g., phugoid modes) that affect the pitch axis, and may control the aircraft appropriately to compensate for such natural modes of the vehicle. In some embodiments, inner loop control laws 1028 may be dependent on vehicle inertia.

Inner loop control laws 1028 may determine moment commands using one or more stored dynamics models that reflect the motion characteristics of the aircraft (e.g., the aerodynamic damping and/or inertia of the aircraft). In some embodiments, the Inner loop control laws 1028 may use a dynamic model (e.g., a low order equivalent system model) to capture the motion characteristics of the aircraft and determine one or more moments that will cause the aircraft to achieve the commanded roll, yaw, and/or pitch. Some embodiments may include determining (e.g., by inner loop control laws 1028 or other component) a moment command based on at least one received command (e.g., a roll command, yaw command, and/or pitch command) and a determined (e.g., measured) aircraft state. For example, a moment command may be determined using a difference in the commanded aircraft state and the measured aircraft state. By way of further example, a moment command may be determined using the difference between a commanded roll angle and a measured roll angle. As described below, Control Allocation 1029 may control the aircraft (e.g., through flight elements) based on the determined moment command(s). For example, Control Allocation 1029 may control (e.g., transmit one or more commands to) one or more electric propulsion system(s) of the aircraft (e.g., electric propulsion system 602 shown in FIG. 6), including tilt actuator(s), electric engine(s), and/or propeller(s). Control Allocation 1029 may further control one or more control surface(s) of the aircraft (e.g., control surfaces, such as flaperons 712 and ruddervators 714 shown in FIG. 7), including flaperon(s), ruddervator(s), aileron(s), spoiler(s), rudder(s), and/or elevator(s).

While the embodiment shown in FIG. 10 includes both Inner Loop Control Laws 1028 and Outer Loop Allocations 1024 and 1026, in some embodiments the flight control system may not include Outer Loop Allocations 1024 and 1026. Therefore, a pilot inceptor input may create roll, yaw, pitch, and/or thrust commands. For example, a right inceptor may control roll and pitch and a left inceptor and/or pedal(s) may control yaw and thrust.

Control Allocation 1029 may accept as inputs one or more of force and moment commands, data received from the one or more aircraft sensors, envelope protection limits, scheduling parameter, and optimizer parameters. Control Allocation 1029 may be configured to determine, based on the inputs, actuator commands by minimizing an objective function that includes one or more primary objectives, such as meeting (e.g., responding to, satisfying, addressing, providing output based upon) commanded aircraft forces and moments, and one or more secondary, which can include minimizing acoustic noise and/or optimizing battery pack usage.

In some embodiments, control allocation 1029 may be configured to compute the limits of individual actuator commands based on the actuator states and envelope protection limits. Envelope protection limits may include one or more boundaries that the aircraft should operate within to ensure safe and stable flight. In some embodiments, envelope protection limits may be defined by one or more of speed, altitude, angle of attack, or load factor. For example, envelope protection limits may include one or more bending moments and/or one or more load constraints. In some embodiments, control allocation 1029 may use envelope protection limits to automatically adjust one or more control surfaces or control settings. Doing so may prevent the aircraft from undesirable scenarios such as stalling or structural strain or failure. In normal operation, the minimum command limit for a given actuator may include the maximum of: the minimum hardware based limit and the minimum flight envelope limit; and the maximum command limit for a given actuator may includes the minimum of: the maximum hardware based limit and the maximum flight envelope limit. In the case of an actuator failure, the command limits for the failed actuator correspond to the failure mode.

Control allocation 1029 sends commands to one or more flight elements to control the aircraft. The flight elements will move in accordance with the controlled command. Various sensing systems and associated sensors as part of Vehicle Sensing 1031 may detect the movement of the flight elements and/or the dynamics of the aircraft and provide the information to Feedback 1012, 1016, 1018, 1022, Outer Loop allocation 1024 and 1026, Inner Loop Control laws 1028, and Control Allocation 1029 to be incorporated into flight control.

As described above, Vehicle Sensing 1031 may include one or more sensors to detect vehicle dynamics. For example, Vehicle Sensing 1031 may capture how the aircraft moves in response to pilot inputs, propulsion system outputs or ambient conditions. Additionally or alternatively, Vehicle Sensing 1031 may detect an error in the aircraft's response based on exogenous disturbances (e.g., gust causing speed disturbance). Further, Vehicle Sensing 1031 may include one or more sensors to detect propeller speed, such as a magnetic sensor (e.g., Hall effect or inductive sensor) or an optical sensor (e.g., a tachometer) configured to detect the rotor speed of the aircraft engine (and thereby the speed of the propeller). Vehicle sensing 1031 may include one or more sensors to detect a nacelle tilt angle (e.g., a propeller rotation axis angle between a lift configuration (e.g., FIG. 2) and forward thrust configuration (e.g., FIG. 1)). For example, one or more magnetic sensors (e.g., Hall effect or inductive sensor), position displacement sensors, linear displacement sensors, and/or other sensor(s) associated with the tilt actuator may detect a tilt angle (e.g., relative to the aircraft and/or wing), which may be provided to system 1000. Further, one or more pitot tubes, accelerometers, and/or gyroscopes may detect a pitch angle of the aircraft, which may be provided to system 1000. In some embodiments, Vehicle Sensing 1031 may combine tilt angle sensor measurements and aircraft pitch measurements to determine an overall nacelle tilt angle for the propellers.

Vehicle sensing 1031 may include one or more sensors configured to detect an engine torque and/or thrust, such as one or more current sensors or voltage sensors, strain gauges, load cells, and/or propeller vibration sensors (e.g., accelerometers).

Vehicle Sensing 1031 may include one or more sensors to detect aircraft movement and/or aircraft orientation (e.g., accelerometer(s), 3-axis accelerometer(s), gyroscope(s), 3-axis gyroscope(s), and/or tilt-position sensors to determine angles of engines) and airspeed sensors (e.g., pitot tube sensors). Vehicle sensing 1031 may further include one or more inertial measurement units (IMUs) to determine an aircraft state based on these measurements. An aircraft state may refer to forces experienced by, an orientation of, a position of (e.g., altitude), and/or movement of, the aircraft. For example, an aircraft state may include at least one of: a position of the aircraft (e.g., a yaw angle, roll angle, pitch angle, and/or any other orientation across one or two axes), velocity of the aircraft, angular rate of the aircraft (e.g., roll, pitch, and/or yaw rate), and/or an acceleration of the aircraft (e.g., longitudinal, lateral and/or vertical acceleration), or any physical characteristic of the aircraft or one of its components.

In some embodiments, Vehicle Sensing 1031 may include an inertial navigation systems (INS) and/or an air data and/or an attitude heading reference systems (ADAHRS). The inertial navigation systems (INS) and/or an air data and attitude heading reference systems (ADAHRS) may include one or more inertial measurement units (IMUs) and corresponding sensors (e.g., accelerometers, gyroscopes, three-axis gyroscopes, and/or three-axis accelerometers). In some embodiments, the INS and/or ADAHRS may filter and/or otherwise process sensor measurements to determine an aircraft state (e.g., acceleration or angular rate). For example, in some embodiments, the INS and/or ADAHRS may determine angular rates based on gyroscope measurements and may determine acceleration based on measurements from an accelerometer.

In some embodiments, as further described below, VRS Avoidance 1033 may determine a proximity of the state of one or more propeller to a vortex ring state. Based on one or more determined proximities, VRS Avoidance 1033 may input control limits to ensure a set number or all of the aircraft propellers avoid entering a vortex ring state. In some embodiments, the control limit may include a descent rate limit, such as a maximum allowable descent rate at which the aircraft can be flown while avoiding a propeller entering vortex ring state. In some embodiments, VRS Avoidance 1033 may input this descent rate limit into Climb command model 1008. Therefore, climb command model 1008 may determine a desired altitude, vertical speed, and/or vertical acceleration that does not exceed the descent rate limit.

In some embodiments, a limit may include a forward speed limit, such as a minimum forward speed that the aircraft can be flown while avoiding a propeller entering a vortex ring state. In some embodiments, VRS Avoidance 1033 may be configured to input this forward speed limit into Forward speed command model 1010. Therefore, Forward speed command model 1010 may determine a desired position, longitudinal speed, and/or longitudinal acceleration that does not fall below a forward speed limit.

In some embodiments, a limit may include a turn-rate limit, such as a maximum turn rate at which the aircraft can be flown while avoiding a propeller entering a vortex ring state. In some embodiments, VRS Avoidance 1033 may be configured to input this this maximum turn rate limit into Turn-rate limit command model 1004. Therefore, Turn-rate limit command model 1004 may determine a desired position and/or turn-rate command that does not exceed the maximum turn rate limit.

In some embodiments, a limit may include a yaw rate limit, such as a limit that sets a maximum yaw rate in one or more directions. For example, a yaw rate in the direction of propeller(s) whose state is near a vortex ring state may be limited. In some embodiments, VRS Avoidance 1033 may be configured to input this yaw rate limit to Inner loop control laws 1028. Therefore, Inner loop control laws 1028 may determine aircraft movements (e.g., moments) that do not exceed the yaw rate limit.

In some embodiments, a limit may include a roll rate limit, such as a limit that sets a maximum roll rate in one or more directions. For example, a roll rate in the direction of propeller(s) whose state is near a vortex ring state may be limited. In some embodiments, VRS Avoidance 1033 may be configured to input this roll rate limit to Inner loop control laws 1028. Therefore, Inner loop control laws 1028 may determine aircraft movements that do not exceed the roll rate limit.

In some embodiments, a limit may include a pitch rate limit, such as a limit that sets a maximum pitch rate. For example, a pitch rate towards ground may be limited. In some embodiments, VRS Avoidance 1033 may be configured to input this pitch rate limit to Inner loop control laws 1028. Therefore, Inner loop control laws 1028 may determine aircraft movements that do not exceed the pitch rate limits.

Based on applying the above limits to the command models (1004, 1006, 1008, and/or 1010) and/or the Inner loop control laws 1028, the System 1000 sends moment commands to Control Allocation 1029 that correspond to these limits. Control Allocation 1029 may then control the aircraft in accordance with these limits (e.g., Vehicle Dynamics Control 1030). For example, Control Allocation 1029 may control aircraft propeller(s) speed and/or tilt orientation to implement the moment commands complying with the determined limits.

In some embodiments, a limit may include a propeller torque or propeller speed limit for one, some, or all aircraft propellers. In some embodiments, VRS Avoidance 1033 may be configured to input this torque or speed limit into Control Allocation 1029. Therefore, Control Allocation 1029 may determine propeller commands that do not exceed the torque or speed limit.

As further described below, in some embodiments, VRS Avoidance 1033 may determine any combination of limits, which System 1000 may use to control operation of the aircraft (e.g., override and limit a pilot command). For example, in some embodiments, VRS Avoidance 1033 may limit a descent rate. In some embodiments, VRS Avoidance 1033 may limit a propeller torque or speed. In some embodiments, VRS Avoidance 1033 may limit a yaw rate, roll rate, and/or a pitch rate. In some embodiments, VRS Avoidance 1033 may limit a descent rate, turn-rate, forward speed, yaw rate, roll rate, and/or pitch rate.

In some embodiments, as further described below, the aircraft maneuver(s) that is limited corresponds to maneuver changes requested by a pilot and/or autopilot (e.g., through a pilot inceptor or autopilot command). For example, if a pilot through an inceptor requests a change in descent, VRS Avoidance 1033 may limit the descent rate. For example, if a pilot through an inceptor requests a roll, VRS Avoidance 1033 may limit the roll rate. In some embodiments, VRS Avoidance 1033 may determine the requested aircraft maneuvers through one or more models, such as Turn-rate command model 1004, Lateral speed command model 1006, Climb command model 1008, and/or Forward speed command model 1010. System 1000 may apply limits dynamically and rapidly during flight (e.g., vertical descent), improving the safety of the aircraft while still permitting it to operate within tolerable control limits.

Figure 11:
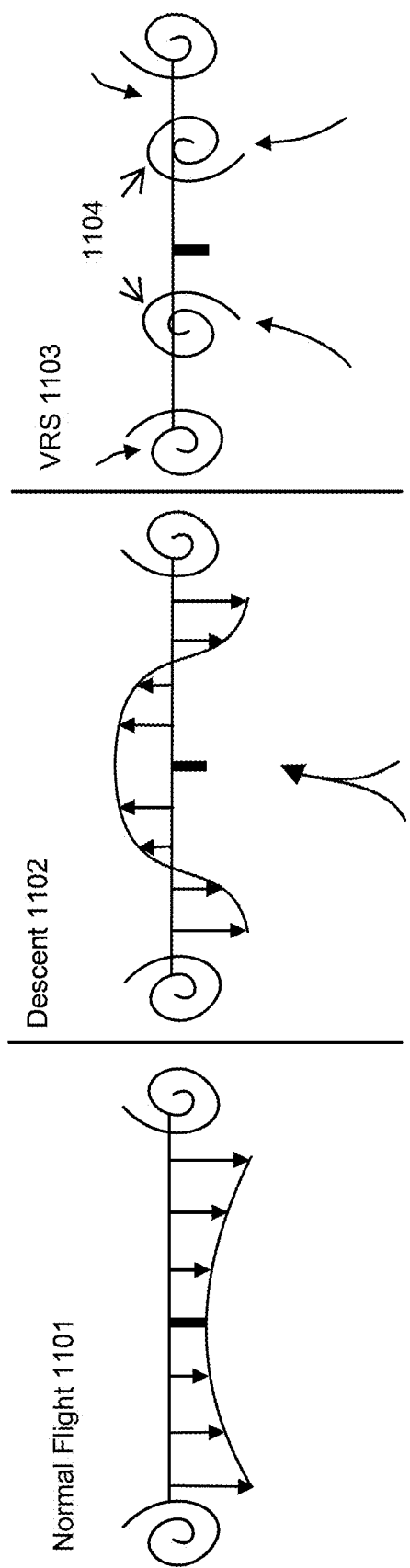
FIG. 11 illustrates an example of a propeller entering vortex ring state, in accordance with embodiments of the present disclosure.

FIG. 11 illustrates a propeller entering vortex ring state, in accordance with embodiments of the present disclosure. During normal flight 1101, the airflow moves downward through the propeller(s). As the aircraft descends 1102, some of the airflow may overcome the downwards push from the propeller rotation and move upwards through the propeller (s). As the aircraft propeller(s) enter a vortex ring state 1103, the wake from the upwards flowing air starts to be sucked back downwards, creating vortices 1104. In the vortex ring state 1103, the aircraft may experience vibrations and may not generate sufficient thrust to support the aircraft. Further, in a vortex ring state 1103, the condition may be exacerbated by an attempt to increase thrust because the increase in propeller rotation may cause more upwards airflow to be sucked back in by the propeller(s).

As described above, propellers may be more likely to enter a vortex ring state at a higher descent rate because there is a larger upwards airflow through the propellers. Further, propellers may be more likely to enter a vortex ring state at lower forward airspeed because the aircraft is less able to escape the wake caused by the upwards airflow, making it more likely the wake gets sucked back into the propellers in vortices 1104.

Figure 12:
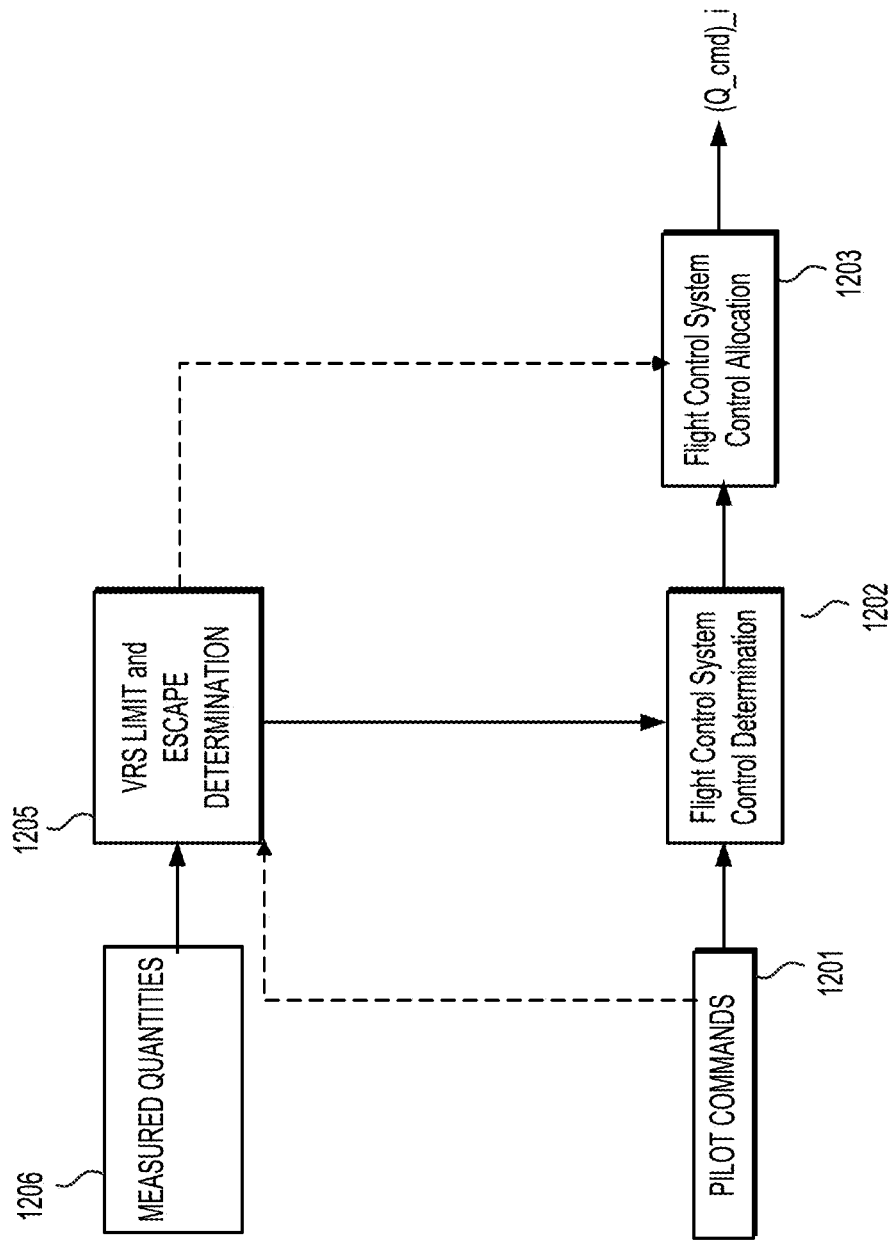
FIG. 12 illustrates an exemplary block diagram for incorporating a control limit, in accordance with embodiments of the present disclosure.

FIG. 12 illustrates a block diagram for incorporating a control limit, in accordance with embodiments of the present disclosure. It is appreciated that the steps of the exemplary methods depicted in FIG. 12 would be impossible, or at least impractical, to effectively implement by a human user, especially when considering that these functionalities are implemented frequently (e.g., constantly, continually), while the aircraft is flying (including taking off or landing), and/or dynamically based on (e.g., in response to) received signals (e.g., aircraft sensors, changing state measurements, pilot input devices). In general, it may be understood that any/all steps of the exemplary method of FIG. 12 may be performed or executed by at least one processor (e.g., FCS, FCC), such as according to one or more instructions stored on a computer-readable medium (e.g., non-transitory computer-readable medium).

At Step 1201, Pilot commands may be transmitted to the flight control system (e.g., through left and/or right inceptor). For example, pilot commands may be indicative of a flight path angle, turn rate, a lateral speed, a climb rate (e.g., ascent or descent rate), a forward speed, a roll rate, and/or a yaw rate. In some embodiments, an autopilot system may transmit one or more of these commands to the flight control system (e.g., System 1000). At Step 1206, VRS Avoidance 1033 may receive and/or measure states of (e.g., quantities related to) the aircraft. In some embodiments, measured quantities may include an airspeed, $V_{airspeed}$ measured by an airspeed sensor (e.g., pitot tube pressure sensor). In some embodiments, measured quantities may further include other measurement(s) indicative of airflow pulled through a propeller, such as rotations per minute (rpm) $\Omega$ measured by engine sensor (e.g., Hall effect sensor, inductive sensor, or optical sensor), torque Q measured by an electrical circuitry sensing device (e.g., phase current sensor), thrust measured by a strain gauge and/or load cell, and/or vibrations measured by an accelerometer. In some embodiments, measured quantities may further include an air density p (e.g., as measured through pressure and temperature sensors). In some embodiments, measured quantities may further include a current state of the aircraft, such as a current pitch angle, roll angle, sideslip angle, turn rate, lateral speed, climb rate (e.g., ascent or descent rate), forward speed, roll rate, yaw rate, and/or acceleration (e.g., longitudinal and/or lateral acceleration). In some embodiments, measured quantities may further include a nacelle tilt angle and/or blade tilt angle (e.g. a blade pitch angle) for one or more propellers. For example, measured quantities may include a nacelle tilt angle for electric propulsion units 114 shown in FIG. 1.

At Step 1205, VRS Avoidance 1033 may calculate one or more limits to the commanded aircraft state (e.g., a commanded descent rate indicated by a descent rate command) based on the proximity of one or more propellers to a multi-dimensional vortex ring state boundary, as further described below with respect to FIGS. 14A-14G. For example, VRS Avoidance 1033 may store one or more properties for the propeller(s), such as a propeller torque constant and constants associated with the propeller and/or aircraft geometry. Further, VRS Avoidance 1033 may store one or more models and/or lookup tables (e.g., multi-dimensional lookup table) to determine an airspeed local to one or more propellers, $V_x$, $V_y$, (e.g., horizontal airspeed parallel to the propeller disk and vertical airspeed perpendicular to the propeller disk), and an induced airspeed at hover $V_h$ based on the measured quantities received at step 1206. VRS Avoidance 1033 may determine the proximity of one or more propellers to a vortex ring state by comparing the local airspeed(s) divided by an induced airspeed at hover (e.g., $V_x/V_h$, $V_y/V_h$) to an established Vortex Ring State boundary, Boundary=$F(V_x, V_y, V_h)$ (e.g., stored as a model and/or lookup table of values). For example, as further described below, ins some embodiments, VRS Avoidance 1033 may determine the closest propeller to a vortex ring state. Based on the propeller state of the closest propeller and its determined proximity, control limit(s) may be established. In some embodiments, VRS 1033 may determine the propeller that is second, third, and/or fourth closest to the vortex ring state and control limits may be established based on that propeller.

The control limit(s) may dynamically change based on measured quantities (e.g., propeller speed, airspeed) to avoid vortex ring state. "Propeller speed" may refer to the rotational speed (e.g., RPM or blade tip speed (e.g., tip mach number)) of the propeller. For example, a more restrictive limit (e.g., lower maximum descent rate) may be set at higher propeller speeds where wake is more likely to get sucked back into the propeller. Similarly, a more restrictive limit (e.g., lower maximum descent rate) may be set at lower forward airspeed where wake is less likely to be shed by forward movement of the aircraft. In some embodiments, the control limit(s) may be correlated with a measured quantity (e.g., airspeed), such that an increase in the measured quantity causes the system to implement an increase in restriction.

In some embodiments, at Step 1205, VRS Avoidance 1033 may detect an airspeed (e.g., a longitudinal airspeed) of the aircraft. If the airspeed is above a stored threshold, VRS Avoidance 1033 may not determine any control limits or escape commands. The airspeed threshold may be set based on models and/or experimental data that determine an airspeed above which a likelihood of vortex ring state for the propellers is low (e.g., less than 5% or 10%). In some embodiments, VRS Avoidance 1033 may detect propeller speed(s) for the propellers of the aircraft. If the propeller speed (e.g., a maximum value or average of propeller speeds) is below a set threshold, VRS Avoidance 1033 may not determine any control limits or escape commands. The propeller speed threshold may be set based on models and/or experimental data that determine a propeller speed below which a likelihood of vortex ring state for the propellers is low (e.g., less than 5% or 10%).

In some embodiments, at Step 1205, VRS Avoidance 1033 may detect whether the aircraft is in a powered lift state. For example, VRS Avoidance 1033 may determine whether the tilt propellers (e.g. tilt propellers 114) are in a lift configuration and/or within a threshold proximity of a lift configuration (e.g., 45 deg, 30 deg, 15 deg.) and/or whether the lift propellers (e.g., lift propellers 112) are rotating. If the aircraft is not in a powered lift state, VRS Avoidance 1033 may not determine any control limits or escape commands.

In some embodiments, VRS Avoidance 1033 may detect that one or more propeller(s) has entered vortex ring state. In some embodiments, VRS Avoidance 1033 may determine one or more propellers has entered vortex ring state based on detected vibrations (e.g., through Vehicle Sensing 1031 and associated accelerometers). VRS Avoidance 1033 may store one or more vibration models and/or vibration lookup tables indicative of vortex ring state. For example, VRS Avoidance 1033 may store accelerometer magnitude(s) and/or frequency measurement(s) values and/or ranges using lookup tables and/or models that indicate expected measurements of a propeller in a vortex ring state. These values indicative of vortex ring state may be based on historical data and/or models of propeller behavior in a vortex ring state at one or more propeller speed(s) and/or airspeed(s). In some embodiments, VRS Avoidance 1033 may determine one or more propellers has entered vortex ring state based on the propeller state crossing a boundary for vortex ring state, as further described below with reference to FIG. 14A-14G.

In some embodiments, based on the VRS Avoidance 1033 detecting that one or more propellers has entered vortex ring state, VRS Avoidance 1033 may adjust a limit set by the determined proximity of the propeller(s) to vortex ring state, described above. For example, VRS Avoidance 1033 may make a limit more restrictive based on the duration and/or significance (e.g., strength) of the vibrations indicative of vortex ring state (e.g., further limit a descent rate by 5%, 10%, 15% etc.).

In some embodiments, VRS Avoidance 1033 may additionally or alternatively, take other actions upon determining one or more propellers have entered a vortex ring state. In some embodiments, VRS Avoidance 1033 may send commands to perturb nacelle tilt of one or more propellers to get out of vortex ring state. For example, VRS Avoidance 1033 may adjust the angle of a rotation axis of the propeller (nacelle tilt angle) that has entered vortex ring state to shed the wake. Further, in some embodiments, VRS Avoidance 1033 may send multiple commands to continually change the nacelle tilt angle between an upper and lower angle. Further, in some embodiments, VRS Avoidance 1033 may send commands for other rotor(s) to adjust their nacelle tilt angle(s) and/or thrust to counterbalance the adjustments made to the propeller who has entered vortex ring state.

In some embodiments, VRS Avoidance 1033 may send a command to increase a forward airspeed of the aircraft upon detecting one or more propeller(s) has entered vortex ring state. For example, VRS Avoidance 1033 may increase a forward airspeed of the aircraft based on the duration and/or significance of the vibrations indicative of vortex ring state (e.g., further increase a forward airspeed by 5%, 10%, 15% etc.).

At Step 1202, VRS Avoidance 1033 may input the limit(s) (or escape commands) into one or more sections of the flight control system, thereby limiting the effect of commands received at Step 1201. For example, the limit(s) (or escape commands) may be input into one or more of the control laws, functions, models, and/or algorithms described above with respect to FIG. 10. As described above, based on the limits, System 1000 may calculate commands that are input into Control Allocation (e.g., Control Allocation 1029 in FIG. 10). At Step 1203, Control Allocation 1029 may determine flight element commands based on the inputted commands. For example, Control Allocation 1029 may send commands to aircraft flight elements, such as control surfaces, tilt actuators, and/or propellers (e.g., a torque or thrust command). Therefore, the flight elements are controlled in accordance with the determinations made by VRS Avoidance 1033.

Further, in some embodiments, one or more limits (or escape commands) established by VRS Avoidance 1033 at Step 1205 may be input directly into Control Allocation at Step 1203. VRS Avoidance 1033 may determine a force, moment, actuator signal, thrust, nacelle tilt angle(s), propeller speeds (e.g., rpm(s)), and/or propeller torque(s), required to avoid vortex ring state, and input those limits directly into Control Allocation 1029. Again, the flight elements are controlled within the limit(s) (or commands) established by VRS Avoidance 1033. For example, the flight elements may be controlled at a lower yaw rate, pitch rate, descent rate, and/or roll rate than that requested by the pilot command(s) 1201 to ensure the aircraft is controlled with the established limits and avoids one or more propellers entering a vortex ring state.

Figure 13A:
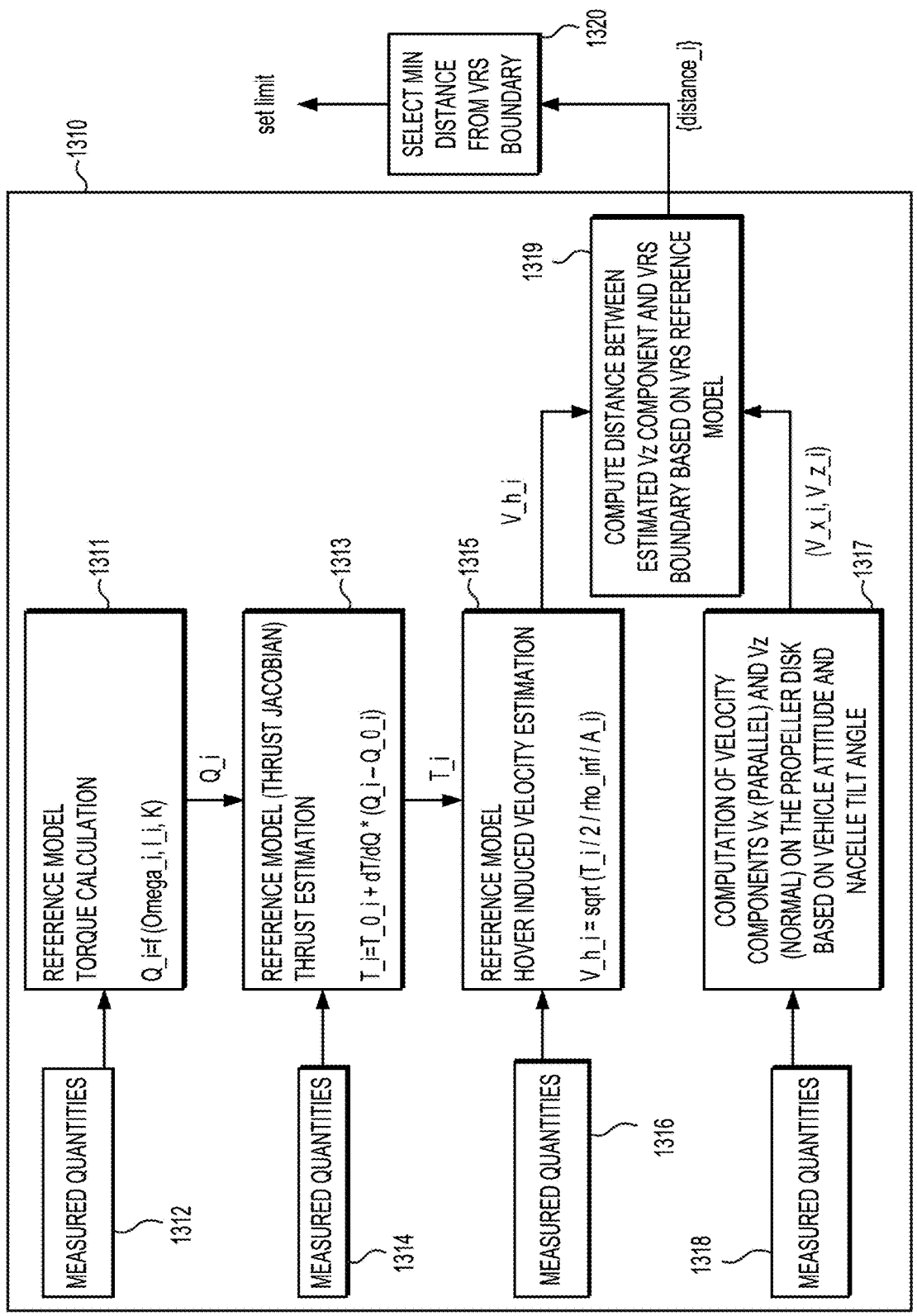
FIGS. 13A, 13B, and 13C illustrate exemplary block diagrams for determining control limit(s), in accordance with embodiments of the present disclosure.
Figure 13B:
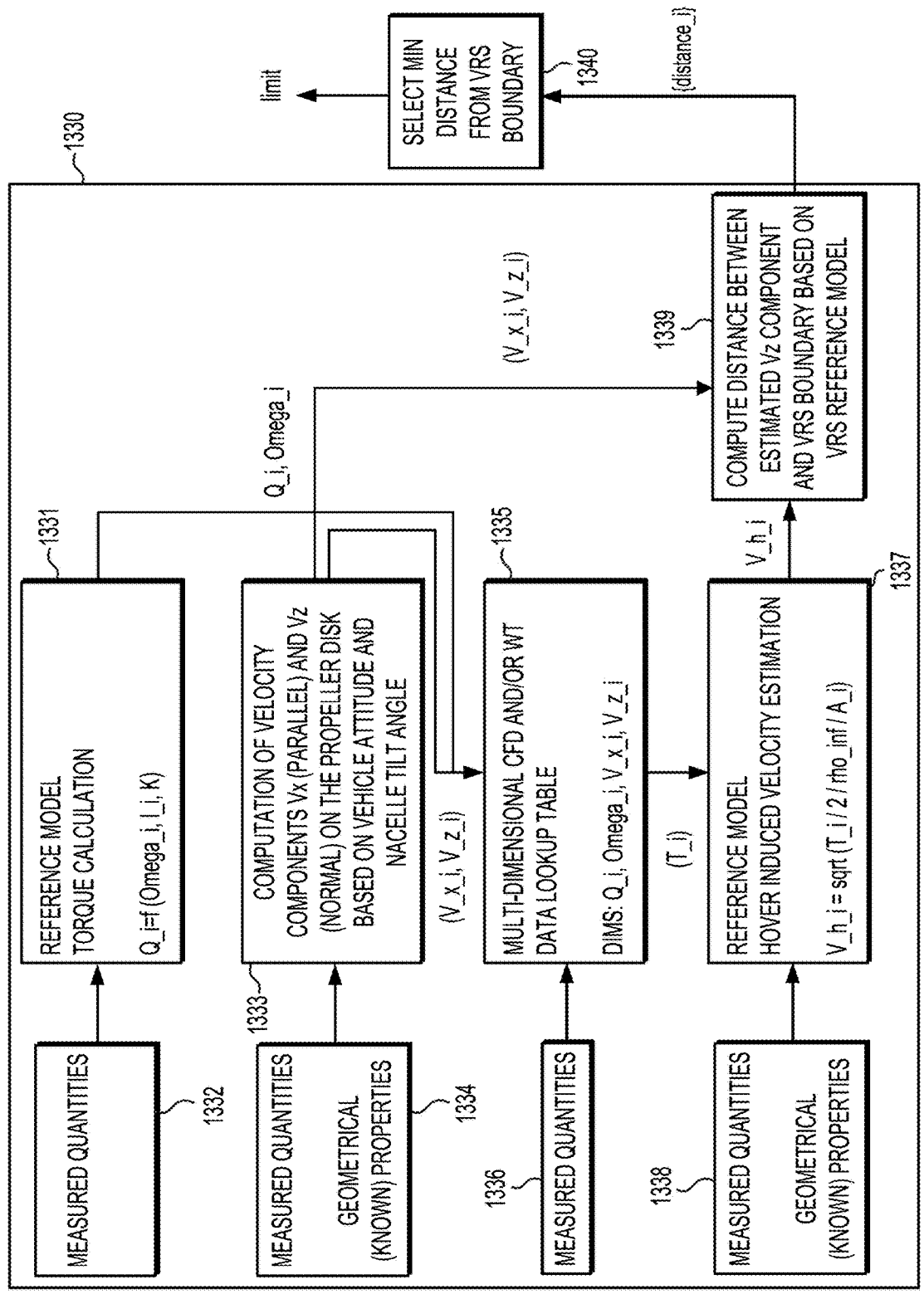

FIG. 13A-13B illustrate block diagrams for determining a control limits, in accordance with embodiments of the present disclosure. These diagrams may further detail a limit determination performed by VRS Avoidance 1033. For example, these block diagrams may further detail Steps 1206 and 1205 shown above with respect to FIG. 12.

FIG. 13A illustrates a first block diagram for determining a control limit, in accordance with embodiments of the present disclosure. In some embodiments, steps in block 1310 may be performed for each propeller. At Step 1311, VRS Avoidance 1033 may calculate a torque of the propeller by using a first reference model. The first reference model may be configured to receive measured quantities 1312 as input. For example, measured quantities 1312 may include propeller speed (e.g., RPM $\Omega i$ as measured through a Hall effect sensor and/or inductive sensor) and electric engine phase current Ii (e.g., as measured through a current sensor). Based on the measured quantities 1312 and stored properties (e.g., a torque constant K), VRS Avoidance 1033 may calculate a torque of the propeller using a model, function (e.g., Qi=f($\Omega$i, Ii, K)), and/or one or more lookup tables that provide torque based on $\Omega$i, Ii, and/or K At Step 1313, VRS Avoidance 1033 may calculate a thrust value $T_i$ (e.g., associated with a propeller) based on the inputted torque $Q_i$ and measured quantities 1314 by using a second reference model. For example, measured quantities 1314 may include vehicle airspeed (e.g., as determined by pitot tube measurements and/or GPS) and vehicle longitudinal acceleration (e.g., as determined by an accelerometer). Based on measured quantities 1314, properties of a thrust function may be determined. For example, properties $T_{0\_i}$, dT/dQ, and/or $Q_{0i}$ may be stored in one or more lookup tables that are a function of vehicle airspeed and/or vehicle longitudinal acceleration. Based on the relevant properties (e.g., $T_{0\_i}$, dT/dQ, $Q_{0i}$), VRS Avoidance 1033 may calculate a thrust value $T_i$ using a model, function (e.g., $T_i=T_{0\_i}$+dT/dQ*($Q_i-Q_{0i}$)), and/or one or more lookup tables that provide thrust value $T_i$ based on $T_{0\_i}$, dT/dQ, and/or $Q_{0i}$. In some embodiments, calculating $T_i$ may involve referencing model (s) (linear or non-linear), function(s), and/or lookup table(s) that vary based on a phase of flight (e.g., hover, transition, forward flight, aircraft orientation (pitch, roll etc.)), airspeed, propeller tilt angle, propeller tilt with respect to airflow local to one or more propellers, and/or variable collective blade pitch angle.

At Step 1315, VRS Avoidance 1033 may calculate an induced velocity produced by a propeller speed in hover, $V_h$, based on inputted torque $T_i$ and measured quantities 1316 by using a third reference model. For example, measured quantities 1316 may include an air density $\rho_{air}$. Based on the measured quantities 1316 and stored geometric parameters representative of a propeller disc area $A_{prop}$, VRS Avoidance 1033 may calculate an induced velocity at hover using a model, function (e.g., $$V_h = \sqrt{\frac{Ti}{2*\rho_{air}*A_{prop}}},$$

and/or one or more lookup tables that provide $V_n$ based on $\rho_{air}$ and/or $A_{prop}$.

At Step 1317, VRS Avoidance 1033 may calculate components of velocity (e.g., a velocity associated with specific propeller(s)) based on measured quantities 1318. For example, measured quantities 1318 may include a nacelle tilt angle $\tau_i$ (e.g., as measured by a Hall effect sensor), vehicle pitch angle $\alpha$, and/or vehicle sideslip angle $\beta$. Based on measured quantities 1318 and stored geometric parameters, the local airspeed components, $V_{x\_i}$ and $V_{y\_i}$ (e.g., horizontal airspeed parallel to the propeller disk and vertical airspeed perpendicular to the propeller disk) may be determined.

At Step 1319, VRS Avoidance 1033 may calculate a proximity from the propeller state (e.g., based on one or more measured quantities) to the VRS boundary. For example, VRS Avoidance 1033 may calculate a distance from the propeller state to the VRS boundary and/or another constant that represents a proximity to the VRS boundary (e.g., a time until entering VRS boundary). The VRS boundary may be a function, expression, lookup table, or model. In some embodiments, once the propeller state passes the VRS boundary it enters a vortex ring state and is not able to provide sufficient thrust. The VRS boundary may be based on historical data and/or models which show the propeller states (e.g., $V_h$, $V_x$, $V_z$) at which the propeller enters a vortex ring state. In some embodiments, VRS Avoidance 1033 may store multiple VRS boundaries based on the positioning and/or geometry of the aircraft propellers. In some embodiments, a different VRS boundary may be stored and referenced for each set of one or more propeller(s) with a similar positioning and/or geometry. In some embodiments, a first VRS boundary is used for all fore propellers and a second VRS boundary is used for all aft propellers. In some embodiments, a single VRS boundary is used for all aircraft propellers, regardless of their positioning/orientation. In some embodiments, the distance measured to the boundary may be a function of the aircraft trajectory, as further detailed below with respect to FIGS. 14A-14F. In some embodiments, Steps 1311-1317 may be repeated for each propeller.

At Step 1320, VRS Avoidance 1033 may determine which propeller's state is closest to a vortex ring state boundary. In some embodiments, a control limit may be set based on the state of the propeller that is closest to the vortex ring state boundary. In some embodiments, the control limit may be set based on the propeller state of the propeller that is the second, third, and/or fourth closest to the vortex ring state boundary. As further described below, in some embodiments, the control limit may be based on an intersection point of the propeller state with the vortex ring boundary based on a current trajectory of the propeller.

FIG. 13B illustrates a second block diagram for determining a control limit, in accordance with embodiments of the present disclosure. In some embodiments, steps in block 1330 may be performed for each propeller. At Step 1331, VRS Avoidance 1033 may calculate a torque of the propeller by using a first reference model. The first reference model may be configured to receive measured quantities 1332 as input. For example, measured quantities 1332 may include propeller speed (e.g., RPM $\Omega i$ as measured through a Hall effect sensor and/or inductive sensor) and electric engine phase current Ii (e.g., as measured through a current sensor). Based on the measured quantities 1332 and stored properties (e.g., a torque constant K), VRS Avoidance 1033 may calculate a torque of the propeller using a model, function (e.g., $Qi=f(\Omega i, Ii, K)$), and/or one or more lookup tables that provide torque $Q_i$ based on $\Omega i$, Ii, and/or K.

At Step 1333, VRS Avoidance 1033 may calculate components of velocity based on measured quantities 1334 by using a second reference model. For example, measured quantities 1334 may include a nacelle tilt angle $\tau_i$ (e.g., as measured by a Hall effect sensor), vehicle pitch angle $\alpha$, and/or vehicle sideslip angle $\beta$. Based on measured quantities 1318 and stored geometric parameters, the local airspeed components, $V_{x\_i}$ and $V_{y\_i}$ may be determined.

At Step 1335, VRS Avoidance 1033 may calculate propeller thrust value $T_i$ based on the inputted torque $Q_i$, components of velocity ($V_x$, $V_z$), and measured quantities 1336 by using a third reference model. For example, measured quantities 1336 may include a vehicle speed $V_{inf}$. In some embodiments, VRS Avoidance 1033 may calculate thrust value $T_i$ using a function $T_i=F(\Omega_i, V_{x\_i}, V_{z\_i})$, a model that determines $T_i$ based on $\Omega_i$, $V_{x\_i}$, and/or $V_{z\_i}$, or lookup tables that determines $T_i$ as a function of on $\Omega_i$, $V_{x\_i}$, and/or $V_{z\_i}$. In some embodiments, the functions, models, and/or lookup tables are specific to a determined measured vehicle speed $V_{inf}$. In some embodiments, the lookup tables may be one or more multi-dimensional lookup table(s) generated based on computational fluid dynamics (CFD) data and/or wind tunnel (WT) data. In some embodiments, the multi-dimensional lookup table may comprise a machine-learning model, such as a neural network configured to predict thrust. In some embodiments, calculating $T_i$ may involve referencing model(s), function(s), and/or lookup table(s) that vary based on a phase of flight (e.g., hover, transition, or forward flight).

At Step 1337, VRS Avoidance 1033 may calculate an induced velocity produced by a propeller speed in hover, $V_h$, based on inputted torque $T_i$ and measured quantities 1338 by using a fourth reference model. For example, measured quantities 1338 may include an air density $\rho_{air}$. Based on the measured quantities 1338 and stored geometric parameters representative of a propeller disc area $A_{prop}$, VRS Avoidance 1033 may calculate an induced velocity at hover using a model, function (e.g., $V\_h=\sqrt{(Ti/(2*\rho\_air*A\_prop))}$), and/or one or more lookup tables that provide $V_h$ based on $\rho_{air}$ and/or $A_{prop}$.

At Step 1339, VRS Avoidance 1033 may calculate a proximity from the propeller state (e.g., based on one or more measured quantities) to the VRS boundary. The VRS boundary may be a function, lookup table, or model. In some embodiments, once the propeller state passes the VRS boundary it enters a vortex ring state and is not able to provide sufficient thrust. The VRS boundary may be based on historical data and/or models which show the propeller states (e.g., $V_h$, $V_x$, $V_z$) at which the propeller enters a vortex ring state. In some embodiments, VRS Avoidance 1033 may store multiple VRS boundaries, which may be based on positioning of the aircraft propellers, geometry of the aircraft propellers, and/or design of the aircraft (e.g., weight, dimensions, wing shape). A different VRS boundary may be stored and referenced for each set of one or more propeller(s) with a similar positioning and/or geometry. In some embodiments, a first VRS boundary is used for all fore propellers and a second VRS boundary is used for all aft propellers. In some embodiments, the distance measured to the boundary may be a function of the aircraft trajectory, as further detailed below. In some embodiments, Steps 1331-1339 may be repeated for each propeller.

At Step 1340, VRS Avoidance 1033 may determine which propeller's state is closest to the vortex ring state boundary. In some embodiments, a control limit may be set based on the state of the propeller that is closest to the vortex ring state boundary. In some embodiments, the control limit may be set based on the propeller state of the propeller that is the second, third, and/or fourth closest to the vortex ring state boundary.

Figure 13C:
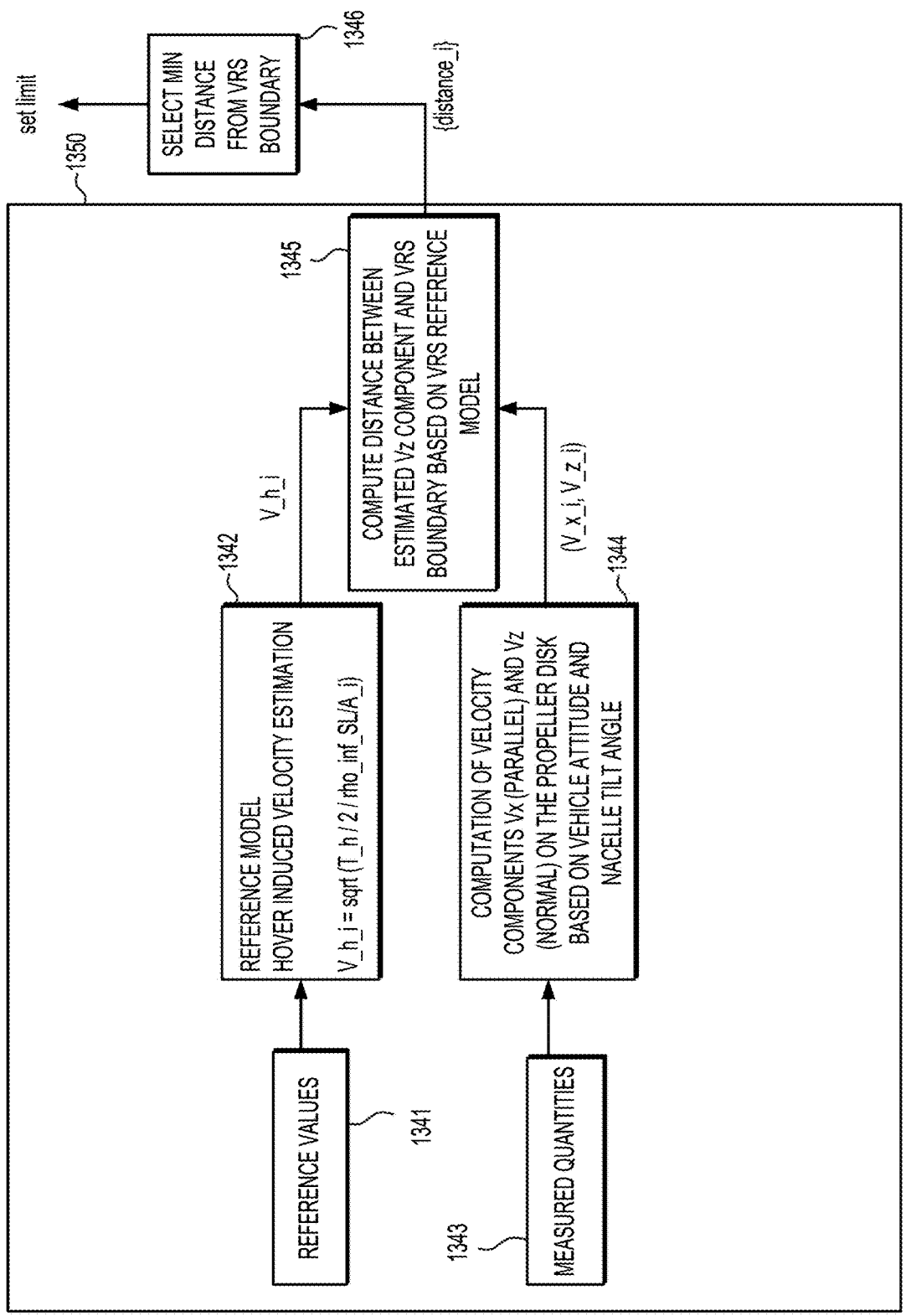

FIG. 13C illustrates a third block diagram for determining a control limit, in accordance with embodiments of the present disclosure. In some embodiments, the control limit determination and associated control may be triggered by a threshold propeller speed (e.g., a threshold propeller RPM or threshold blade tip speed (e.g., mach number for the blade tip)). For example, at lower propeller speeds, vortex ring state may not be a concern. However, at higher propeller speeds, control limiting may be initiated at a point when the propeller risks sucking in its own wake. The threshold propeller speed may be set according to experimental data or modeling the impacts of propeller speed on vortex ring state. For example, the threshold may be set to a value corresponding to a tip speed in one or more of the ranges [13.5-27.2] m/s, [30.2-60.8] mph, or mach [0.04-0.08].

In some embodiments, steps in block 1310 may be performed for each propeller. At step 1342, VRS Avoidance 1033 may calculate an induced velocity produced by a propeller in hover, $V_h$, based on inputted reference values 1341. For example, reference values 1341 may include a reference air density $\rho_{air}$ (e.g., a sea level air density), a reference torque at hover $T_h$, and a reference area $A_{prop}$. In some embodiments, the reference torque at hover, $T_h$, may be the same for each propeller having the same physical properties (e.g., size, geometry, angling, blade spacing, and/or any trait of a propeller affecting its performance). For example, all lift propellers may have a first reference torque at hover (e.g., while the aircraft is in a hover phase of flight) and all tilt propellers may have a second reference torque at hover. For example, propellers with a different number of blades, different blade sizes, different blade shapes, and/or different spinners may have a different reference torque at hover $T_h$. Based on the reference values 1341, VRS Avoidance 1033 may calculate an induced velocity at hover using a model, function (e.g., $$V_h = \sqrt{\left(\frac{Th}{2*\rho_{air}*A_{prop}}\right)},$$

and/or one or more lookup tables.

As described above, at Step 1344, VRS Avoidance 1033 may calculate components of velocity (e.g., a velocity associated with specific propeller(s)) based on measured quantities 1318. For example, measured quantities 1318 may include a nacelle tilt angle $\tau_i$ (e.g., as measured by a Hall effect sensor), vehicle pitch angle $\alpha$, and/or vehicle sideslip angle $\beta$. Based on measured quantities 1318 and stored geometric parameters, the local airspeed components, $V_{x\_i}$ and $V_{z\_i}$ (e.g., horizontal airspeed parallel to the propeller disk and vertical airspeed perpendicular to the propeller disk) may be determined.

At Step 1345, VRS Avoidance 1033 may calculate a proximity from the propeller state to the VRS boundary. For example, VRS Avoidance 1033 may calculate a distance from the propeller state to the VRS boundary and/or another constant that represents a proximity to the VRS boundary (e.g., a time until entering VRS boundary). The VRS boundary may be a function, expression, lookup table, or model. In some embodiments, once the propeller state passes the VRS boundary it enters a vortex ring state and is not able to provide sufficient thrust. The VRS boundary may be based on historical data and/or models which show the propeller states (e.g., $V_{x\_i}$, $V_{z\_i}$) at which the propeller enters a vortex ring state.

In some embodiments, VRS Avoidance 1033 may store multiple VRS boundaries based on physical properties of the aircraft propellers. In some embodiments, a different VRS boundary may be stored and referenced for each set of one or more propeller(s) with a similar positioning and/or geometry. In some embodiments, a first VRS boundary is used for all lift propellers and a second VRS boundary is used for all tilt propellers. In some embodiments, a single VRS boundary is used for all aircraft propellers, regardless of their physical properties. In some embodiments, the proximity to the boundary may be a function of the aircraft trajectory, as further detailed below with respect to FIGS. 14A-14F. In some embodiments, Steps 1341-1345 may be repeated for each propeller.

At Step 1346, VRS Avoidance 1033 may determine which propeller's state is closest to a vortex ring state boundary. In some embodiments, a control limit may be set based on the state of the propeller that is closest to the vortex ring state boundary. In some embodiments, the control limit may be set based on the propeller state of the propeller that is the second, third, and/or fourth closest to the vortex ring state boundary. As further described below, in some embodiments, the control limit may be based on an intersection point of the propeller state with the vortex ring boundary based on a current trajectory of the propeller.

Consistent with disclosed embodiments (e.g., as described above with respect to exemplary FIGS. 12-13C), the proximity of each propeller of the at least two propellers to the vortex ring state is determined based on at least one of: a thrust of the propeller, a torque of the propeller, a propeller speed, or a vibration of the propeller. Additionally or alternatively, the proximity of each propeller of the at least two propellers to the vortex ring state is determined based on an airspeed of the aircraft, a pitch angle of the aircraft, and a blade pitch of the propeller.

FIG. 14A-14G illustrate diagrams for determination of closest propeller(s) to vortex ring state and corresponding control limit(s), in accordance with embodiments of the present disclosure. In some embodiments, the diagrams shown in FIG. 14A-14F further illustrate the determination of a proximity of a propeller state to a VRS boundary and the determination of one or more limits, as in Steps 1319-1320 in FIG. 13A and Steps 1339-1340 in FIG. 13B. FIG. 14A-14F each illustrate a dashed trajectory for projected propeller states. In some embodiments, the trajectory of the propeller states may be interpolated based on past determined values (e.g., $V_x$, $V_z$, and/or $V_h$) over a set time window. In some embodiments, the trajectory of the propeller states may be determined by inputting pilot and/or autopilot commands into one or more reference models. As shown in FIG. 14A-14G, the VRS boundary is a multi-dimensional boundary that varies based on changes to Vx, Vz, and/or Vh.

While a determination of a distance between propeller state(s) and the vortex ring state boundary is described, in some embodiments other values may represent a proximity to a vortex ring state boundary. For example, in some embodiments, a time to enter the VRS boundary may be used to determine the propeller(s) closest to the VRS boundary and associated control limits. The time to enter VRS may be calculated by considering the propeller trajectory and propeller state (e.g., horizontal and/or vertical acceleration of the propeller).

Figure 14A:
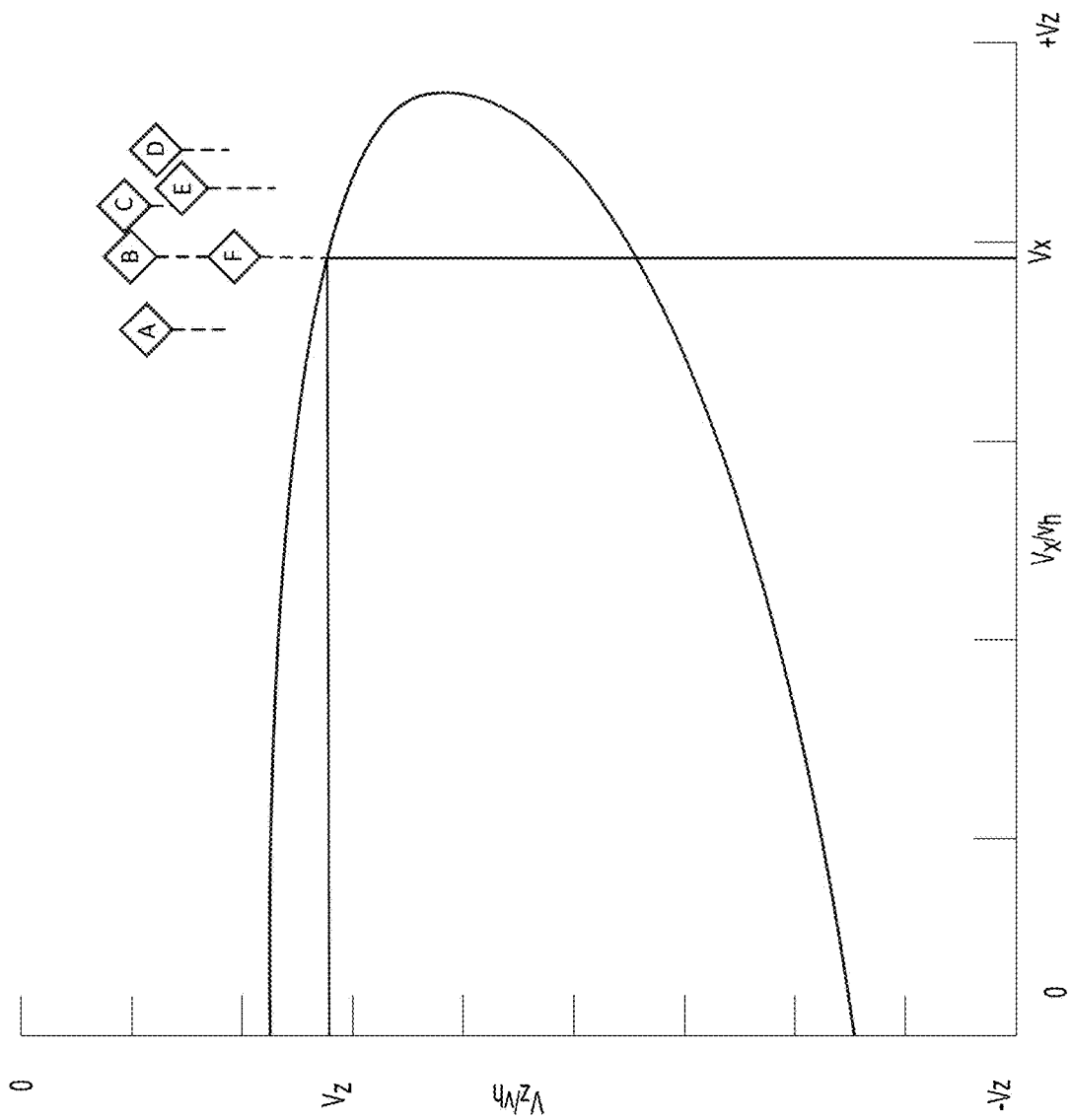

FIG. 14A illustrates the states of aircraft propellers relative to the VRS boundary when the horizontal airspeed at each propeller is roughly constant and the descent rate at each propeller is increasing. Because the propeller state trajectories are at constant $V_x/V_h$ value, the vertical distance between the propeller states (A-F) and the boundary will be the relevant distance. Propeller F is the closest to the VRS boundary and therefore the limit(s) of the aircraft movements may be based on intersection values $(V_z/V_h)$ and $(V_x/V_h)$.

FIG. 14B illustrates the states of aircraft propellers relative to the VRS boundary when the horizontal airspeed at each propeller is decreasing and the descent rate at each propeller is roughly constant. Because the propeller state trajectories are at constant $V_z/V_h$ value, the horizontal distance between the propeller states (A-F) and the boundary will be the relevant distance. Propeller F is the closest to the VRS boundary and therefore the limit(s) of the aircraft movements may be based on intersection values $(V_z/V_h)$ and $(V_x/V_h)$.

Figure 14C:
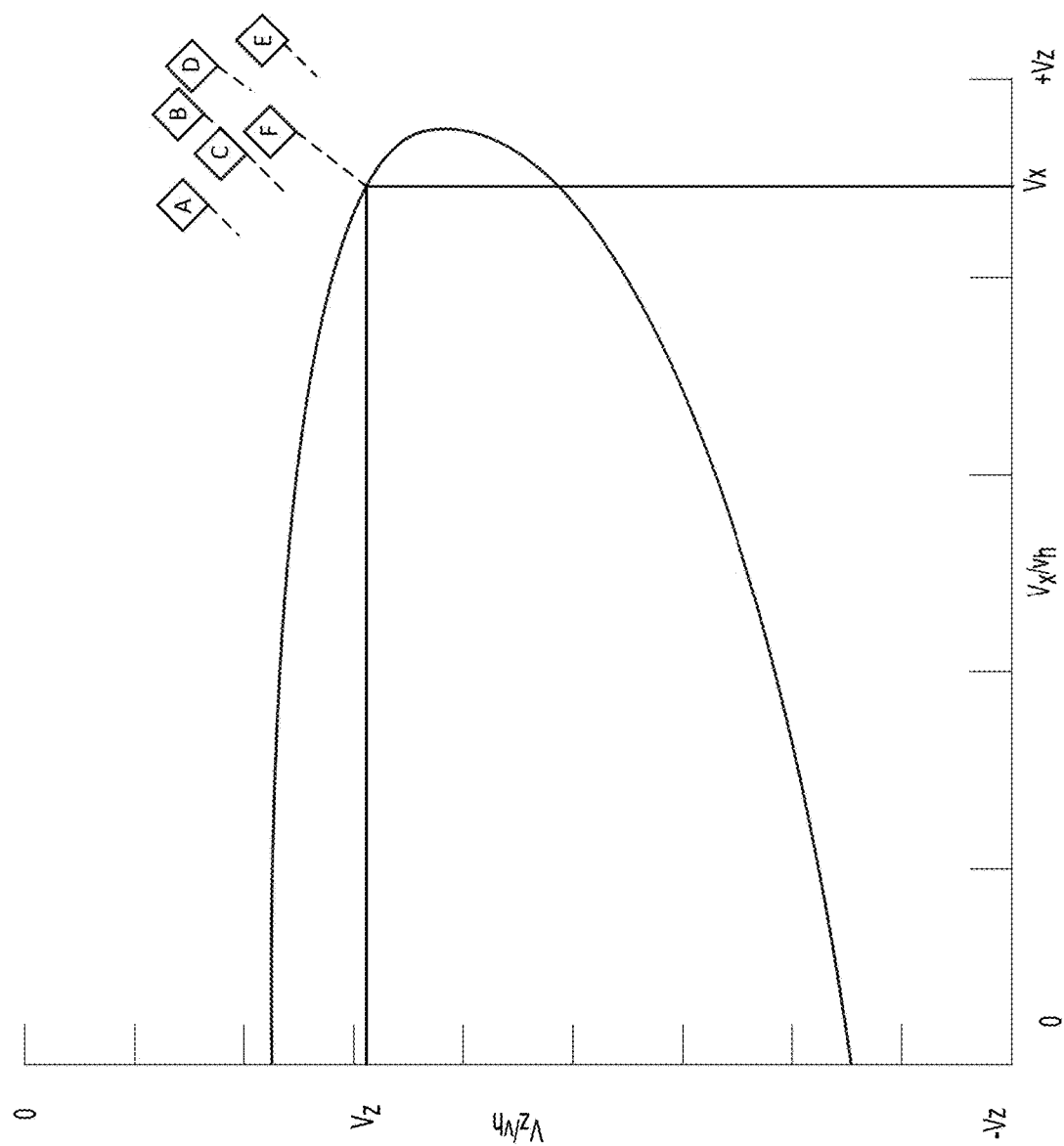

FIG. 14C illustrates the states of aircraft propellers relative to the VRS boundary when the horizontal and vertical airspeed at each propeller is changing at a constant trajectory. The distance between the propeller state and the VRS boundary along the trajectory will be the relevant distance. Propeller F is the closest to the VRS boundary therefore the limit(s) of the aircraft movements may be based on intersection values $(V_z/V_h)$ and $(V_x/V_h)$.

Figure 14D:
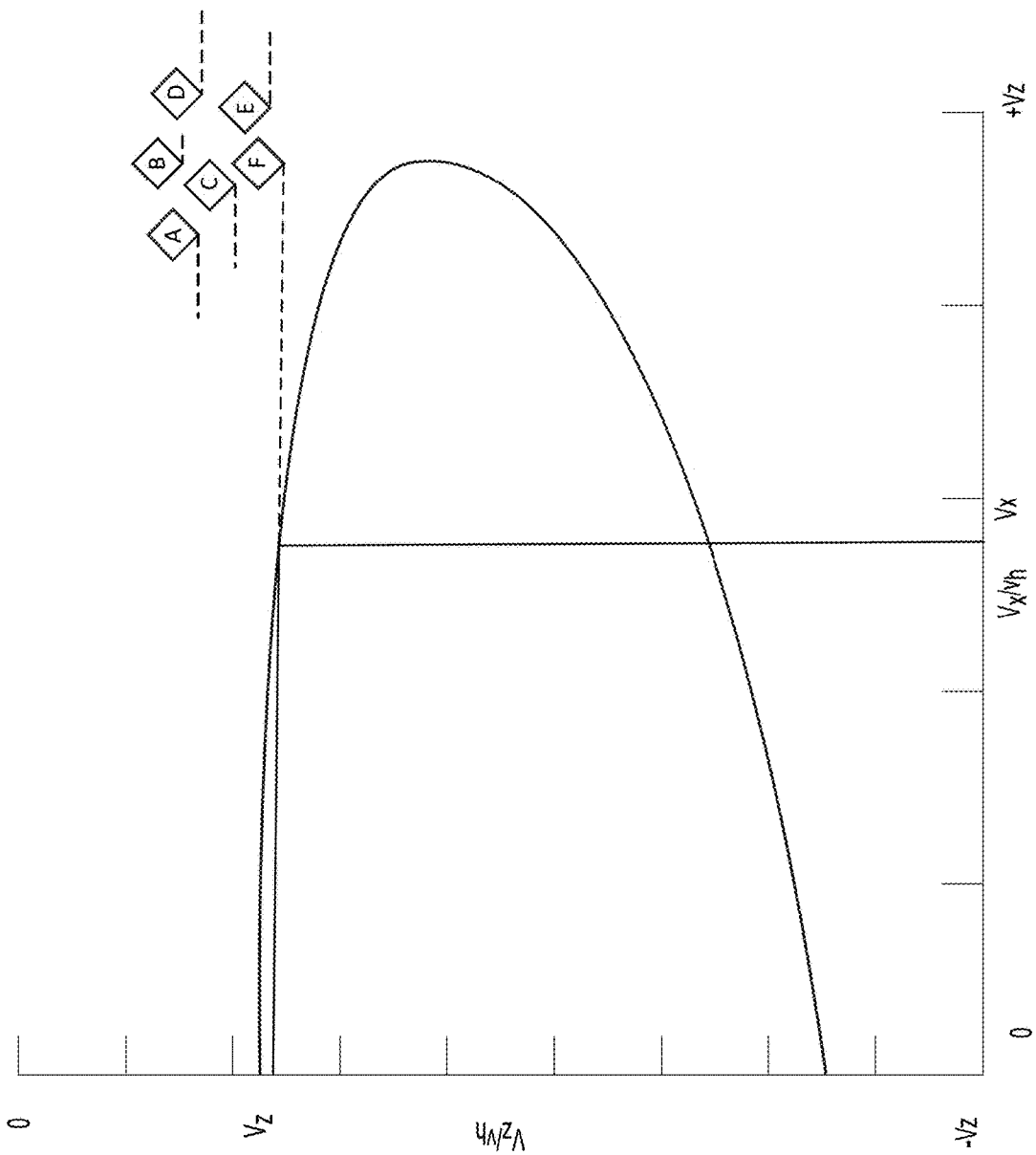

FIG. 14D illustrates the states of aircraft propellers relative to the VRS boundary when the aircraft is turning at a constant vertical airspeed $V_z$. The distance between the propeller state and the VRS boundary along the horizontal trajectory will be the relevant distance. Propeller F is the closest to the VRS boundary and therefore the limit(s) of the aircraft movements may be based on intersection values $(V_z/V_h)$ and $(V_x/V_h)$.

Figure 14E:
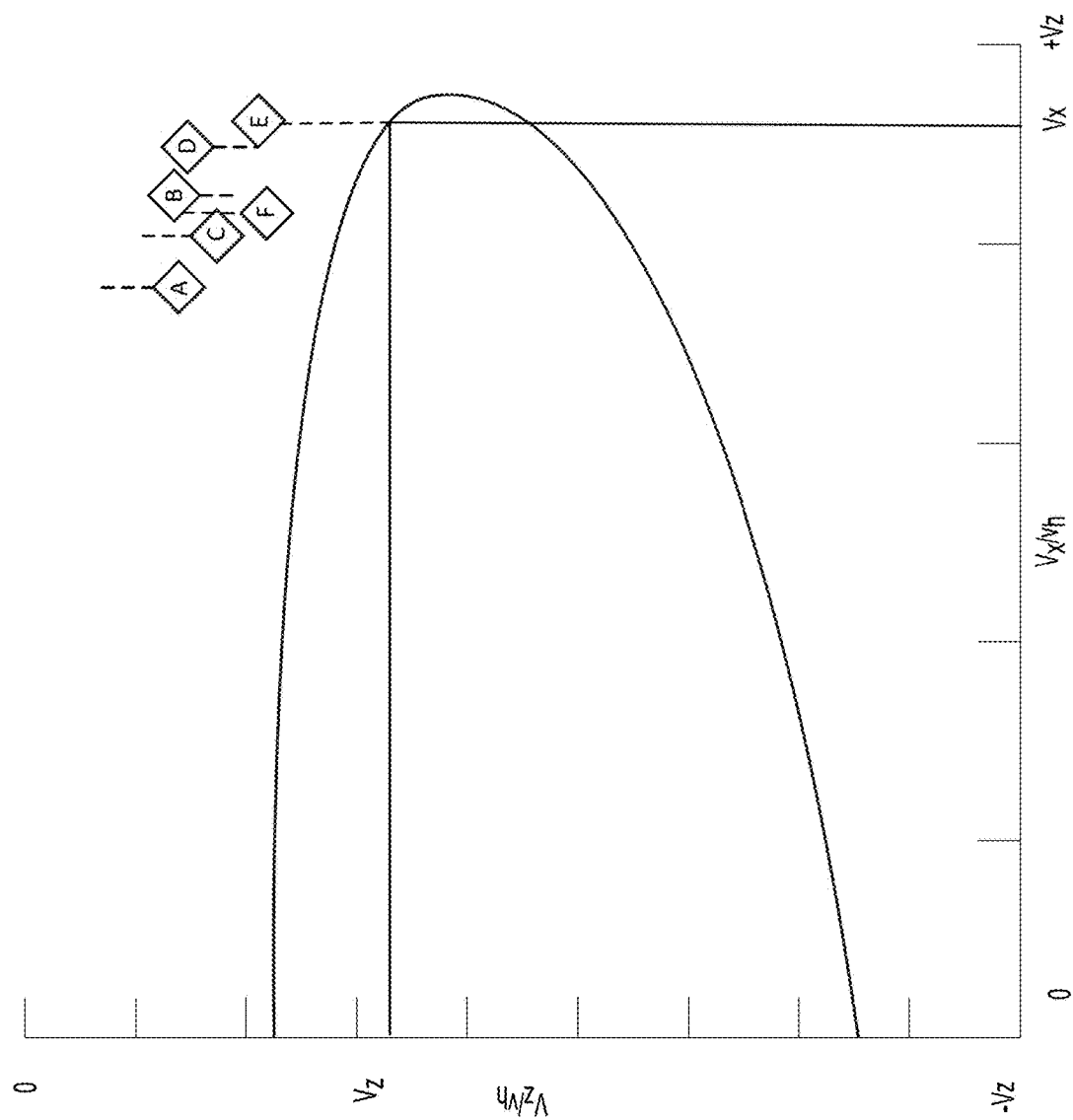

FIG. 14E illustrates the states of aircraft propellers relative to the VRS boundary when the aircraft is rolling at a constant vertical airspeed $V_z$. The distance between the propeller state and the VRS boundary along the vertical trajectory will be the relevant distance. Propeller E is the closest to the VRS boundary and therefore the limit(s) of the aircraft movements may be based on intersection values $(V_z/V_h)$ and $(V_x/V_h)$.

Figure 14F:
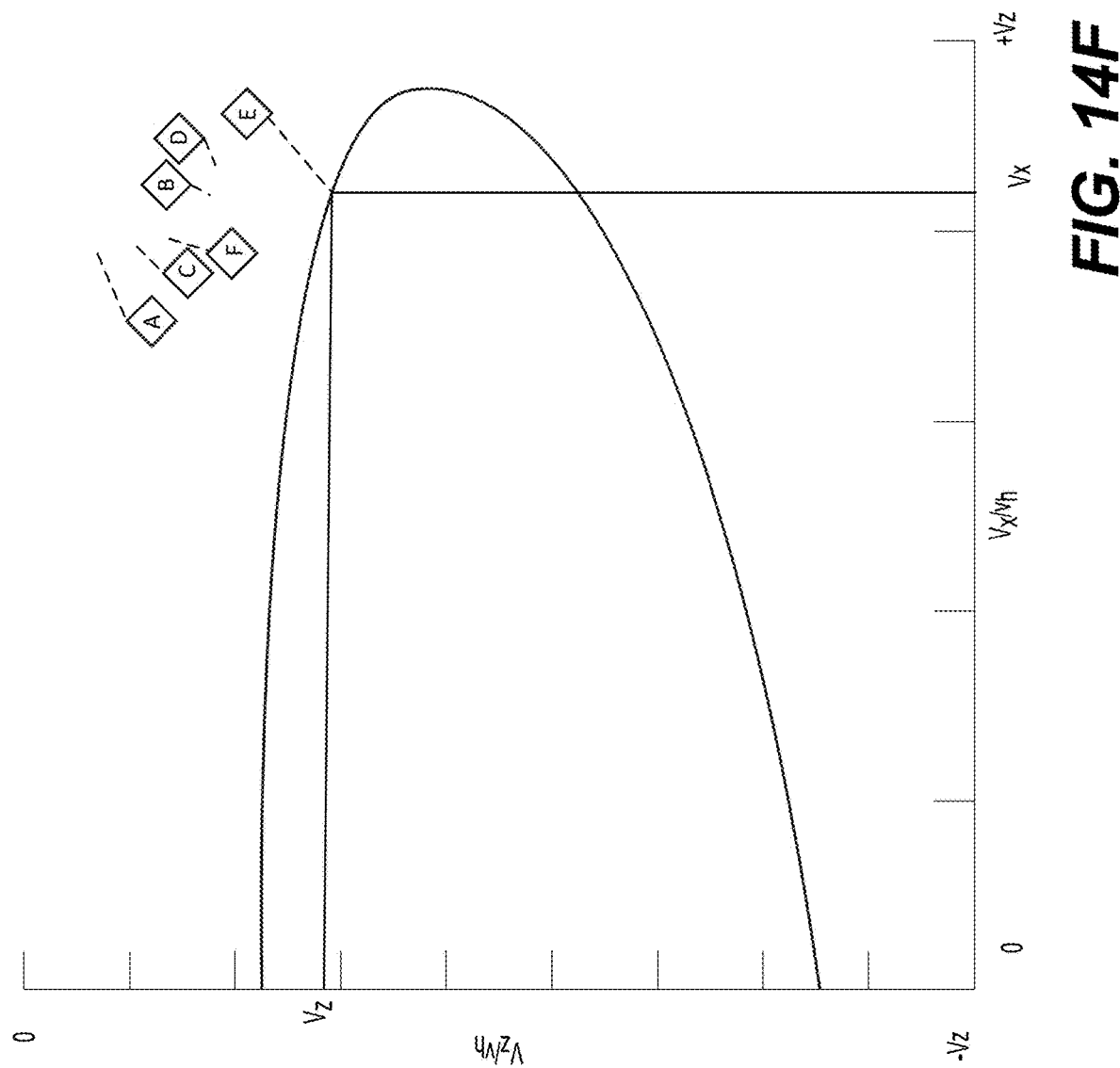

FIG. 14F illustrates the states of aircraft propellers relative to the VRS boundary when the aircraft is rolling and turning. As shown, each trajectory of each propeller state may be different based on the side of the aircraft the propeller is located and the positioning of the propeller along the wing. The distance between the propeller state and the VRS boundary along the respective trajectory of the propeller will be the distance for that propeller. Propeller E is the closest to the VRS boundary and therefore the limit(s) of the aircraft movements may be based on intersection values $(V_z/V_h)$ and $(V_x/V_h)$.

Figure 14G:
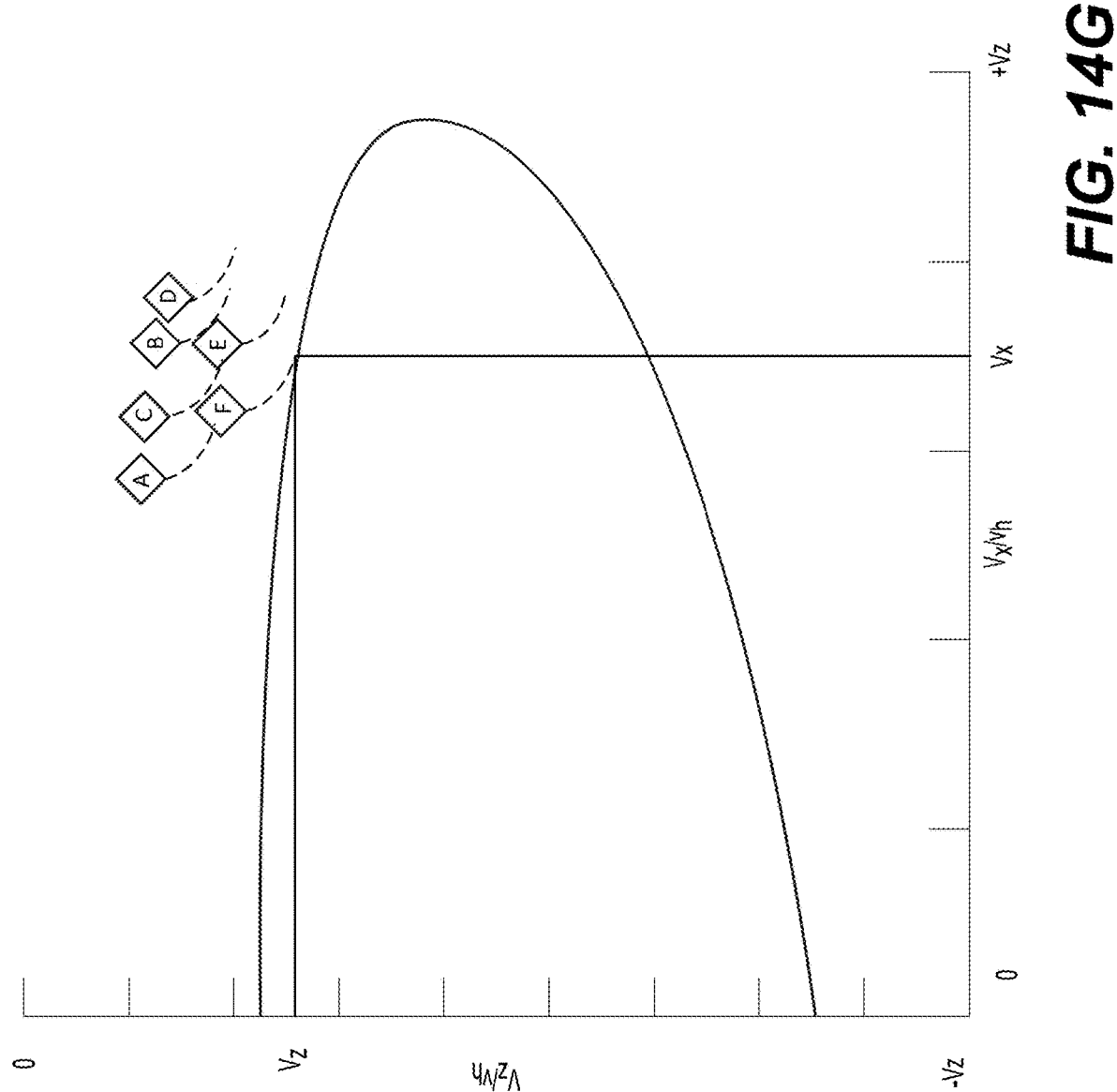

FIG. 14G illustrates the states of the aft aircraft propellers relative to the VRS boundary when the aircraft is pitching upwards. The distance between the propeller states and the VRS boundary along the arch of the trajectory will be the relevant distance. Propeller F is the closest to the VRS boundary and therefore the limit(s) of the aircraft movement may be based on the intersection values $(V_z/V_h)$ and $(V_x/V_h)$.

In some embodiments, based on the determined propeller state trajectory (e.g., FIGS. 14A-14G) and the intersection point of the closest propeller to the vortex ring state boundary, $(V_z/V_h)$ and/or $(V_x/V_h)$, aircraft movement may be controlled to avoid the propeller entering vortex ring state. In some embodiments, the intersection point of the second, third, and/or fourth closest propeller to the vortex ring state boundary will be determined and the control limit will be based on this determined intersection point.

In some embodiments, VRS Avoidance 1033 may set a limit for a propeller vertical airspeed component, $V_{z\_max}$ where $V_{z\_max}=(V_z/V_h)*V_h$, and $V_z/V_h$ corresponds to the intersection point of the closest propeller. In some embodiments, VRS Avoidance 1033 may determine descent rate, roll rate, and/or pitch rate limit(s) based on $V_{z\_max}$. For example, descent rate, roll rate, and/or pitch rate may be limited to avoid exceeding $V_{z\_max}$.

In some embodiments, the descent rate limit may be set to $V_{z\_max}$. In some embodiments, the roll rate limit may be set to $\Phi_{roll\_max}=V_{z\_max}/r_w$, where $r_w$ is the distance from the center of the aircraft to the tip of the wings. In some embodiments, the pitch rate limit may be set to $\theta=V_{z\_max}/r_n$, where $r_n$ is the distance from the center of the aircraft to the nose of the aircraft.

In some embodiments, the flight control system (e.g., System 1000 in FIG. 10) may store one or more weighting functions to determine the associated limits of descent rate, roll rate, and/or pitch rate when more than one of these maneuvers is requested by the pilot.

In some embodiments, VRS Avoidance 1033 may set a limit for a propeller horizontal airspeed component, $V_{x\_max}$ where $V_{x\_max}=(V_x/V_h)*V_h$, and $V_x/V_h$ corresponds to the intersection point of the closest propeller. In some embodiments, VRS Avoidance 1033 may determine forward speed, turn rate, and/or yaw rate limit(s) based on $V_{x\_max}$. For example, forward speed, turn rate, and/or yaw rate may be limited to avoid exceeding $V_{x\_max}$.

In some embodiments, a forward speed limit may be set to $V_{x\_max}$. In some embodiments, a turn rate and/or yaw rate limit may be set to $r_{turn}=V_{x\_max}/r_w$, where $r_w$ is the distance from the center of the aircraft to the tip of the wings.

FIGS. 15A-15L illustrate exemplary simulation results for determination of closest propeller(s) to vortex ring state and corresponding control limit(s), in accordance with embodiments of the present disclosure.

Figure 15A:
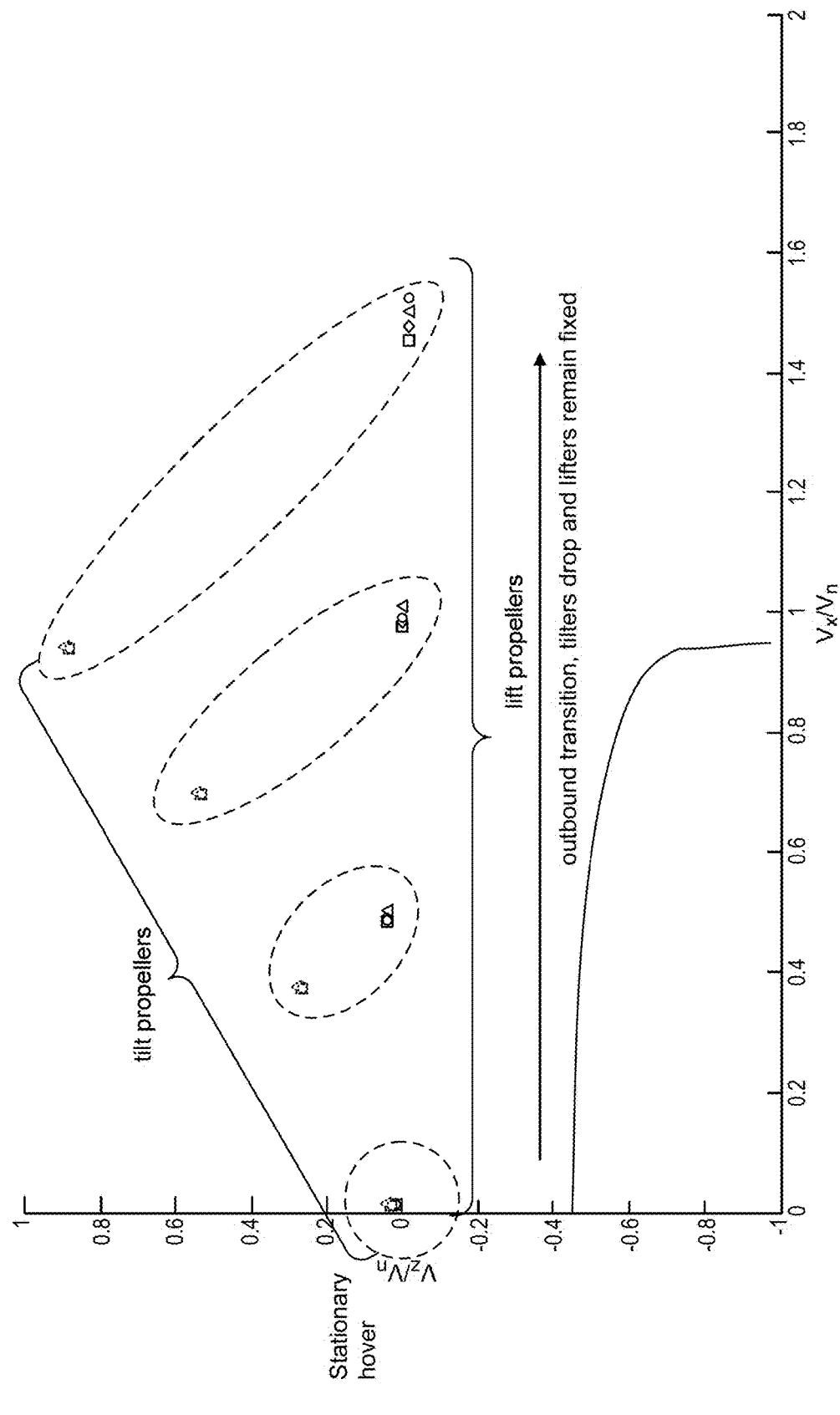

FIG. 15A illustrates exemplary states of aircraft propellers relative to the VRS boundary when an aircraft is in outbound transition. In the outbound transition shown, the aircraft ascends and laterally accelerates into forward flight. The propellers begin in a stationary hover where the Vx/Vh and Vz/Vh values are near zero. As the aircraft transitions into forward flight, the tilt propellers (e.g., FIG. 2, tilt propellers 214) transition between a lift configuration (e.g., as shown in FIG. 2) to the forward flight configuration (e.g., as shown in FIG. 1) and become less susceptible to experiencing a vortex ring state. The lift propellers (e.g., FIG. 2 lift propellers 212) remain fixed and become less susceptible to experiencing a vortex ring state as the aircraft laterally accelerates and Vx/Vh increases.

FIG. 15B illustrates exemplary states of aircraft propellers relative to the VRS boundary when an aircraft is rolling at different points of the outbound transition. As shown, the propellers on the descending side of the aircraft will approach the VRS boundary due to the decrease in Vz/Vh, whereas the propellers on the rising side of the aircraft will move away from the VRS boundary due to an increase in Vz/Vh.

Figure 15C:
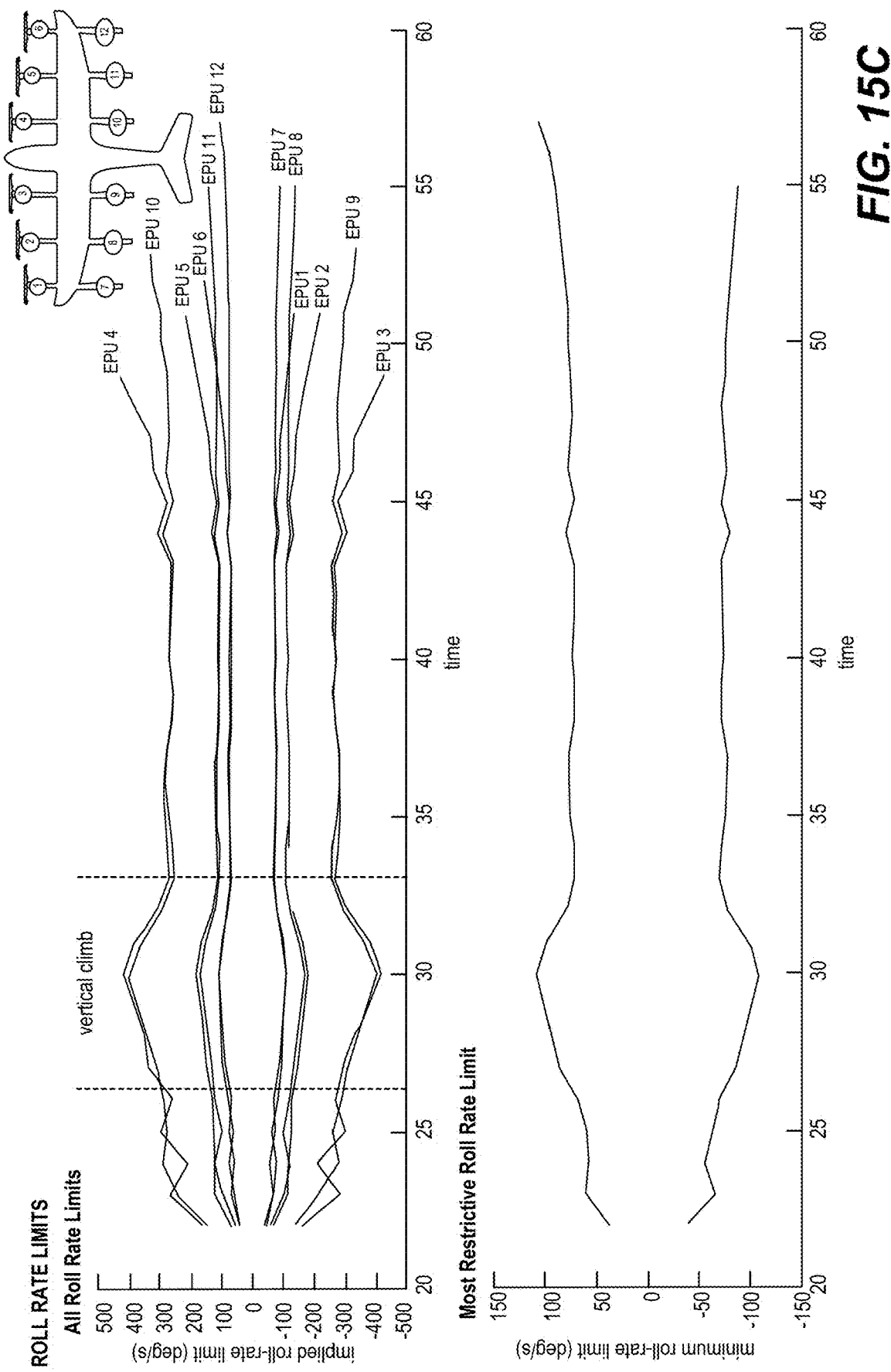

FIG. 15C illustrates and exemplary scenario demonstrating that the roll rate limits may vary and may be dictated by different propellers at different points of the outbound transition. In some points in the outbound transition, the most outboard propellers on the descending side may limit the roll rate because they experience the largest decrease in Vz/Vh. For example, towards the beginning of outbound transition, outboard EPUs 1 and 7 or 6 and 12 (depending on roll direction) provide the greatest restriction on the aircraft's roll rate. Further, in some embodiments, as the outbound transition progresses, the most outboard lift propellers may limit the roll rate. For example, as outbound transition progresses, EPUs 12 and 7 (depending on roll direction) provide the greatest restriction on the aircraft's roll rate. As shown, the limits may vary at different points of outbound transition. For example, when the aircraft transitions to climbing more vertically, the roll rate limits may become less restrictive as airflow is pushed downwards through the propellers. In some embodiments, as detailed above with respect to FIGS. 13A-13C, the most restrictive roll rate limit at different points in the outbound transition will act as a limit to aircraft control.

Figure 15D:
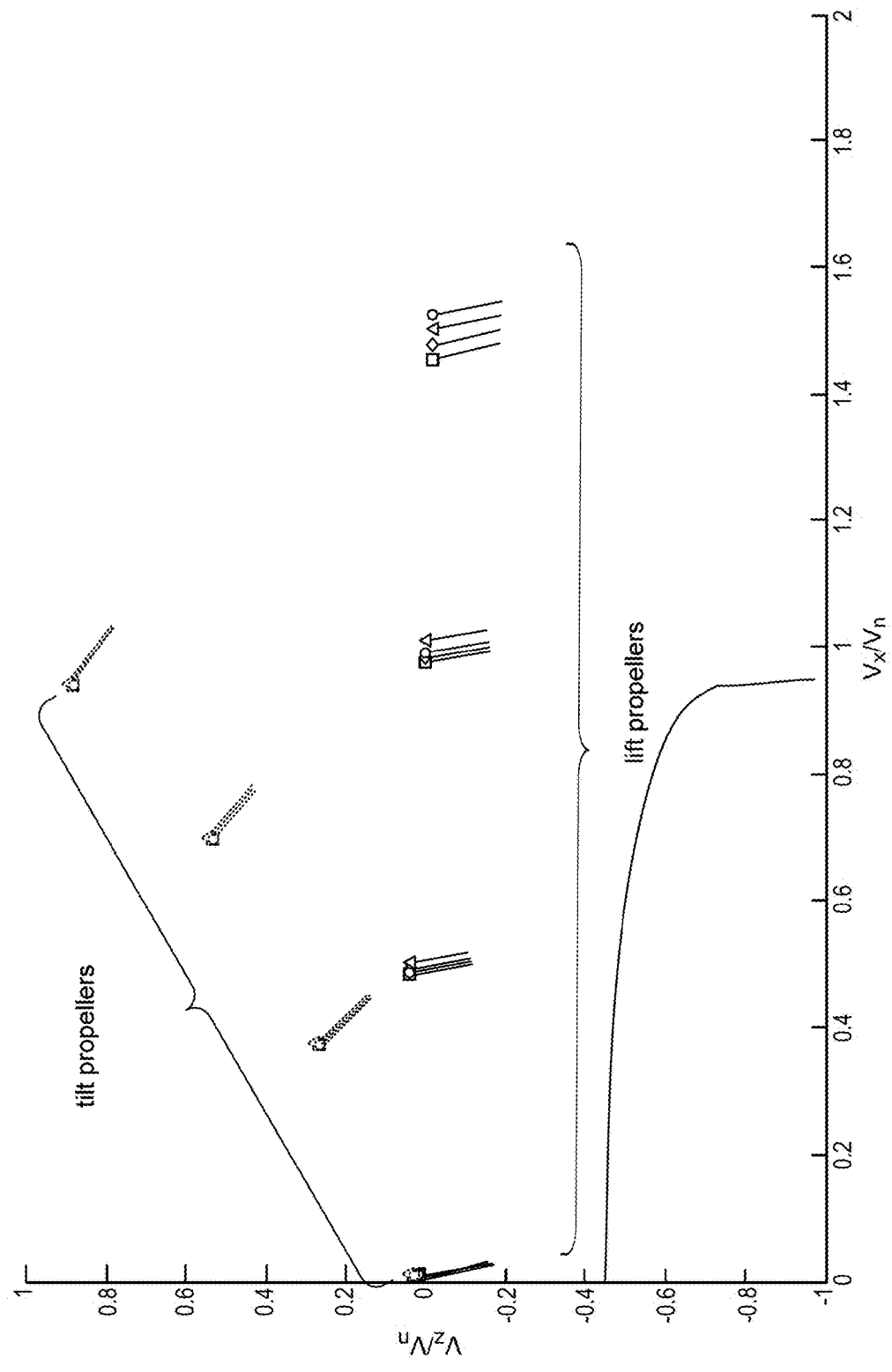
Figure 15E:
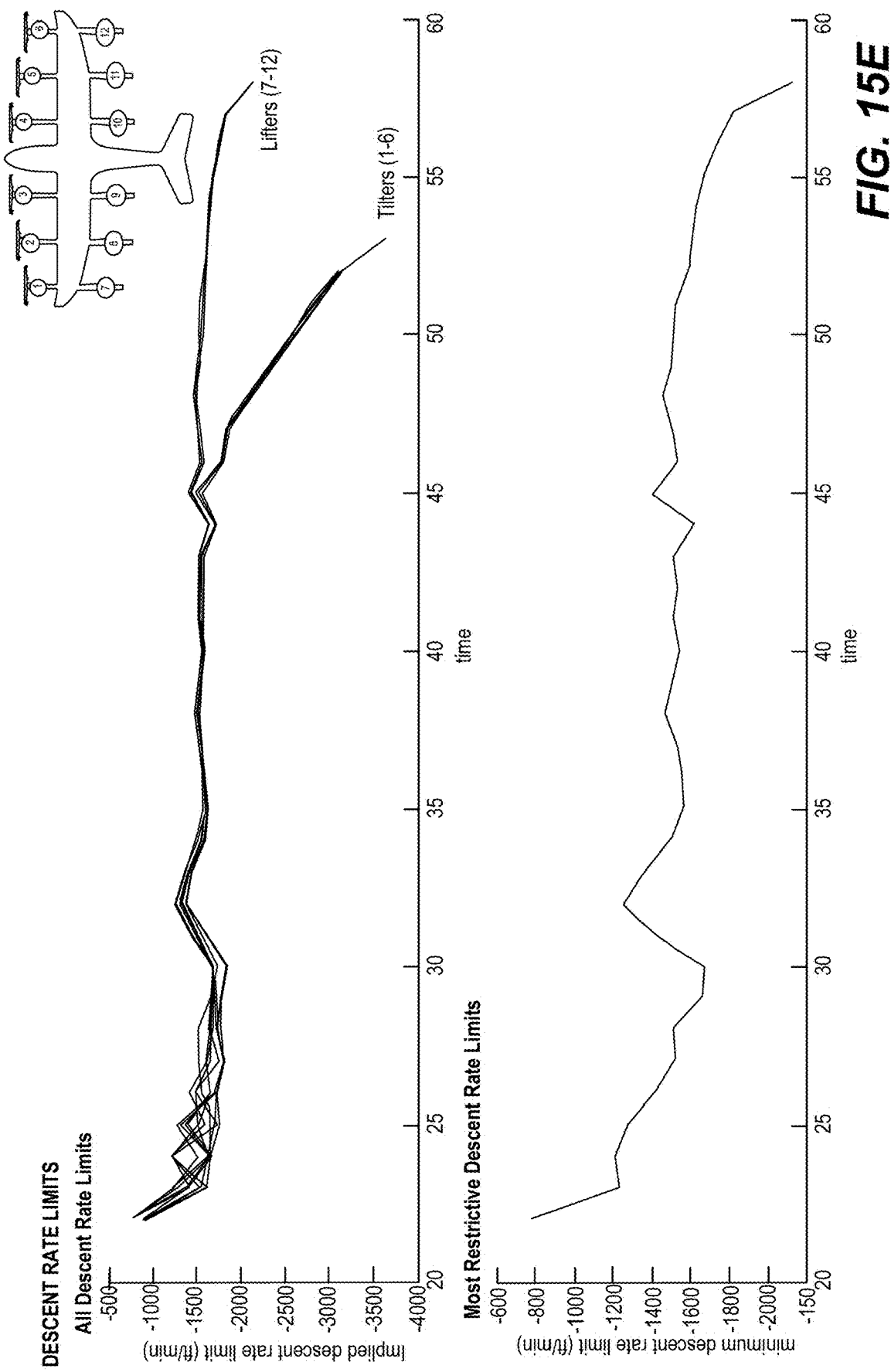

FIG. 15D illustrates exemplary states of aircraft propellers relative to the VRS boundary when the aircraft descends at different points of the outbound transition. As shown, all propellers approach the VRS boundary during descent because of the decrease in Vz/Vh. FIG. 15E demonstrates that the descent rate limits may vary and may be dictated by different propellers at different points of the outbound transition. As the aircraft transitions into forward flight, the tilt propellers may transition into a forward flight configuration (e.g., as shown in FIG. 1) and the lift propellers may limit the descent rate. Further, as described with respect to FIG. 15D, the descent rate limit may become less restrictive as the aircraft transitions to a more vertical climb.

Figure 15F:
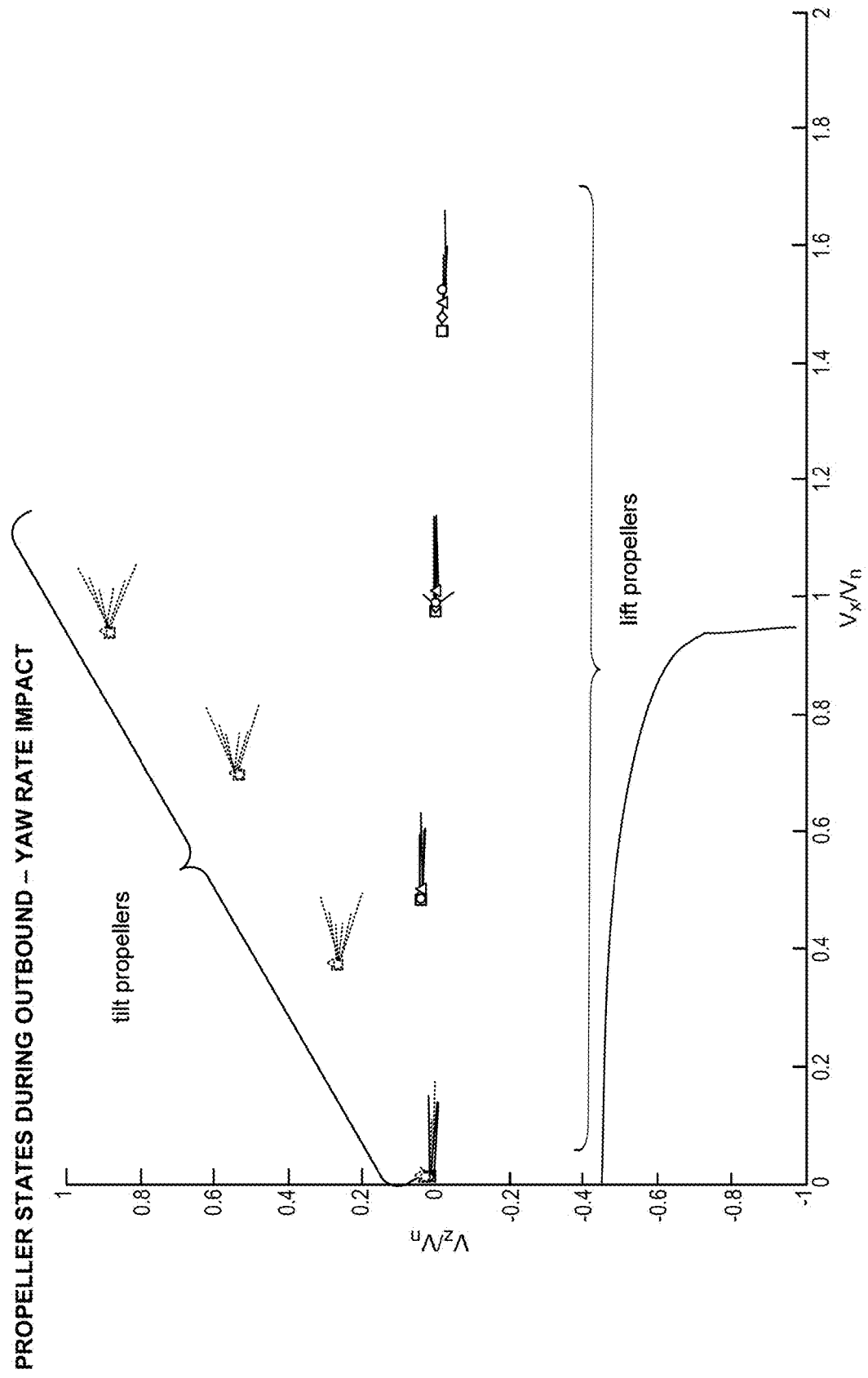

FIG. 15F illustrates exemplary states of the aircraft propellers relative to the VRS boundary when the aircraft performs a yaw maneuver at different points in outbound transition. In this example, the extrapolated propeller states would not intersect with the VRS boundary and no yaw rate limit is employed. However, in other conditions, such as when the aircraft turns in forward flight in a manner that reduces an absolute magnitude of Vx/Vh, a yaw rate limit may be employed to ensure propellers of the aircraft avoid vortex ring state.

FIG. 15G illustrates exemplary states of aircraft propellers relative to the VRS boundary when an aircraft is in inbound transition. In the inbound transition shown, the aircraft descends while decelerating. During deceleration, the nose of the aircraft is pitched up and the tilt propellers are aft of vertical. After decelerating, the aircraft enters a vertical descent.

Figure 15H:
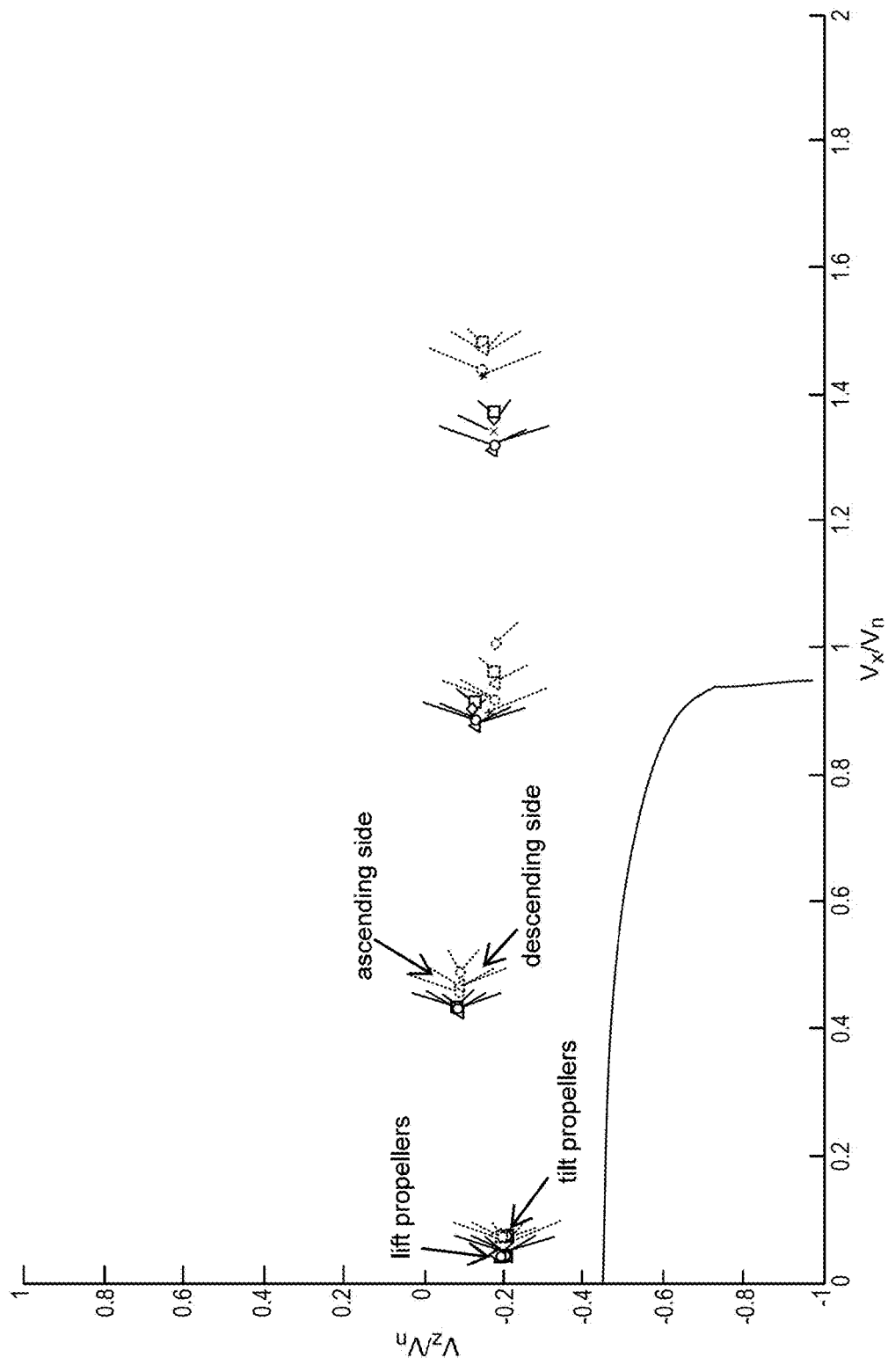

FIG. 15H illustrates exemplary states of aircraft propellers relative to the VRS boundary when an aircraft is rolling at different points of the inbound transition. As described above, the propellers on the descending side of the aircraft will approach the VRS boundary and will provide the roll rate limits for the aircraft.

Figure 15I:
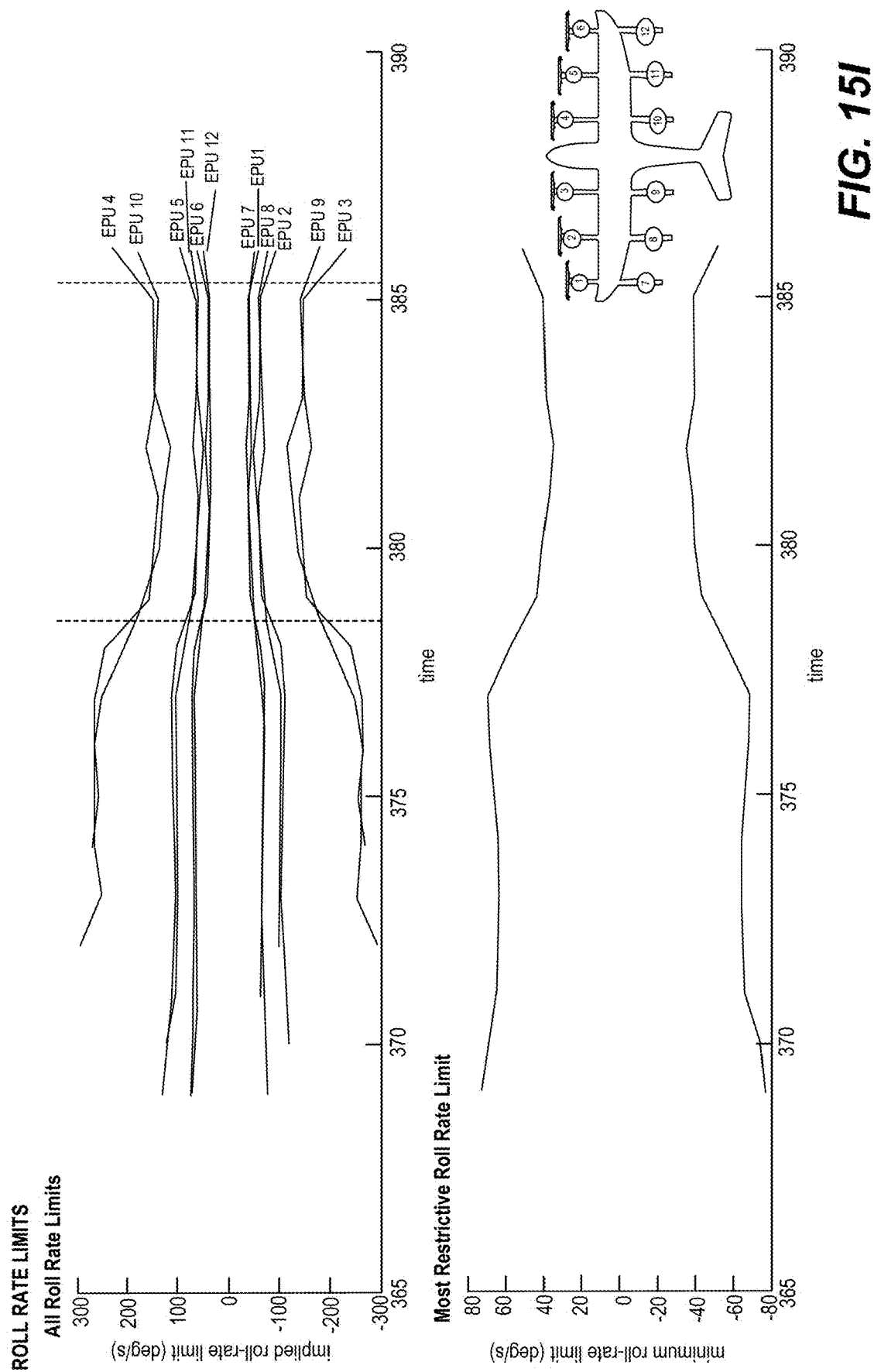

FIG. 15I illustrates and exemplary scenario demonstrating that the roll rate limits may vary and may be dictated by different propellers at different points of the inbound transition. The roll rate limits may be more restrictive during inbound flight than outbound flight because the propellers are operating at a lower torque and the aircraft is descending. As shown in FIG. 15C above, at some points in the inbound transition, the most outboard propellers on the descending side may limit the roll rate because they experience the largest decrease in Vz/Vh.

As shown, the limits may vary at different points of inbound transition. For example, when the aircraft transitions to descend more vertically, the roll rate limits may become more restrictive as airflow is pushed up through the propellers. In some embodiments, as detailed above with respect to FIGS. 13A-13C, the most restrictive roll rate limit at different points in the inbound transition will act as a limit to aircraft control.

Figure 15J:
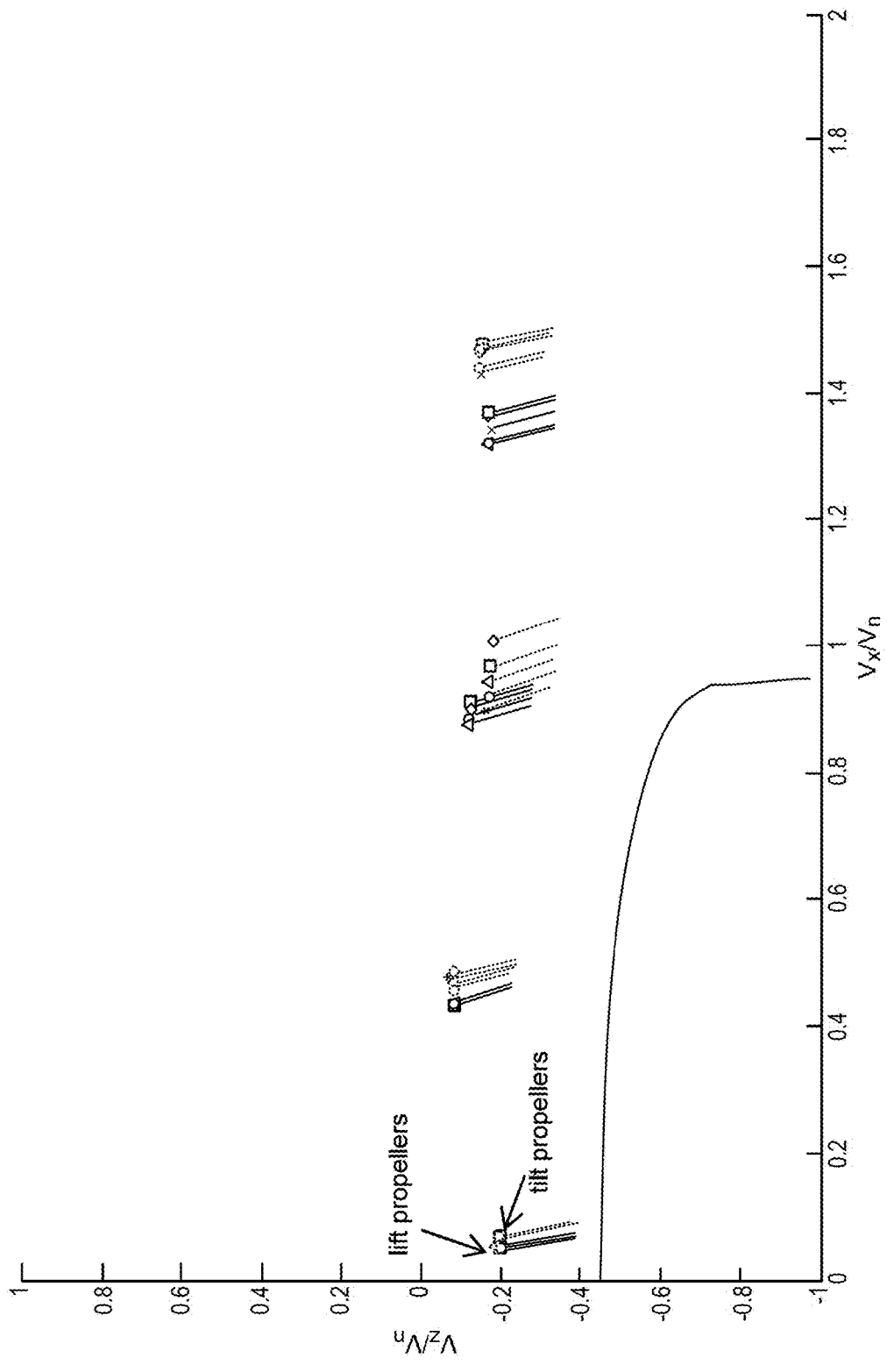
Figure 15K:
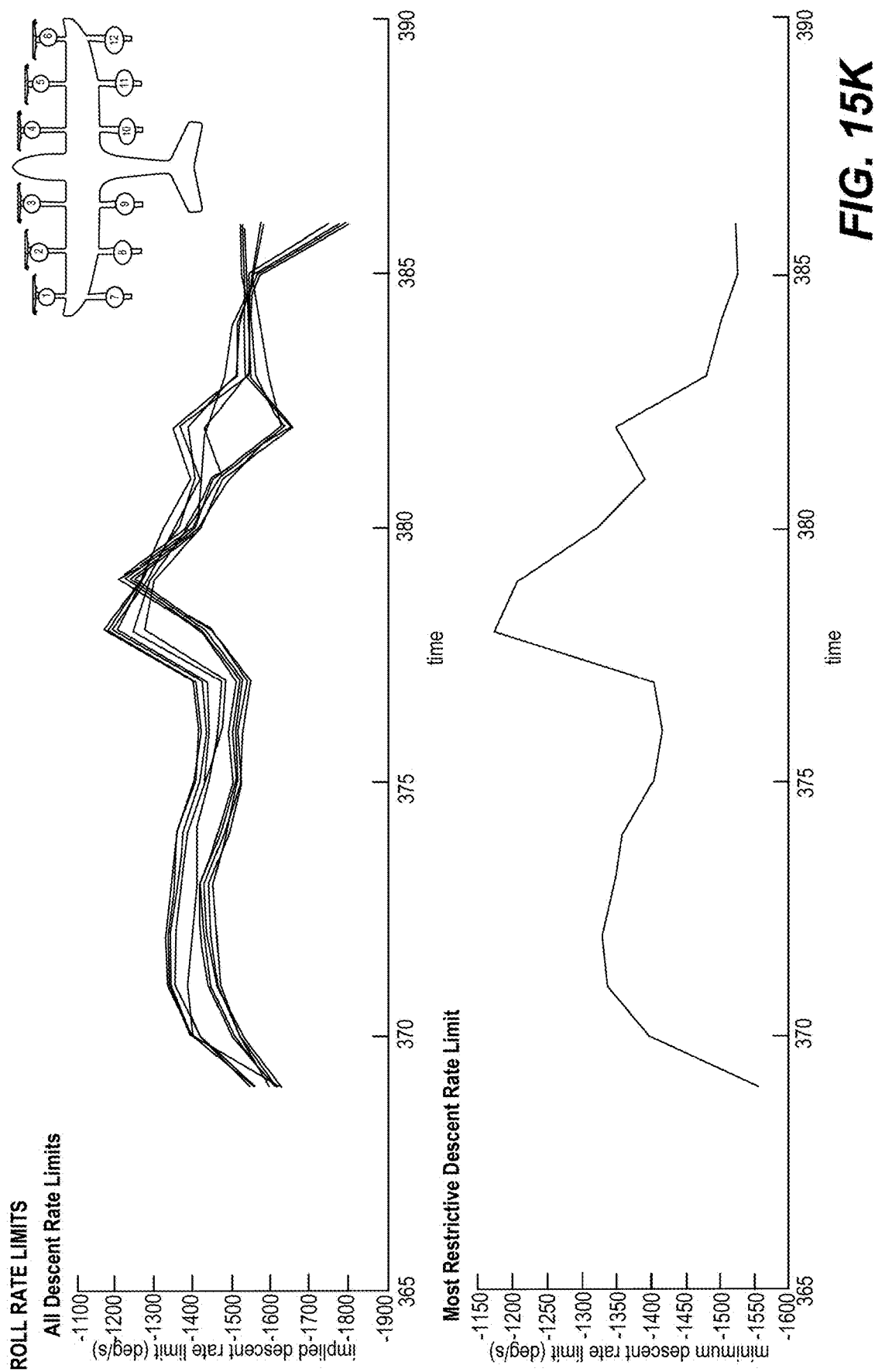

FIG. 15J illustrates exemplary states of aircraft propellers relative to the VRS boundary when the aircraft descends at different points of the inbound transition. As described above with respect to FIG. 15D, all propellers approach the VRS boundary due to the decrease in Vz/Vh. FIG. 15K illustrates that the limits may vary and may be dictated by different propellers at different points of inbound transition. Further, as described with respect to FIG. 15I, the descent rate limit may become more restrictive as the aircraft transitions to a more vertical descent.

Figure 15L:
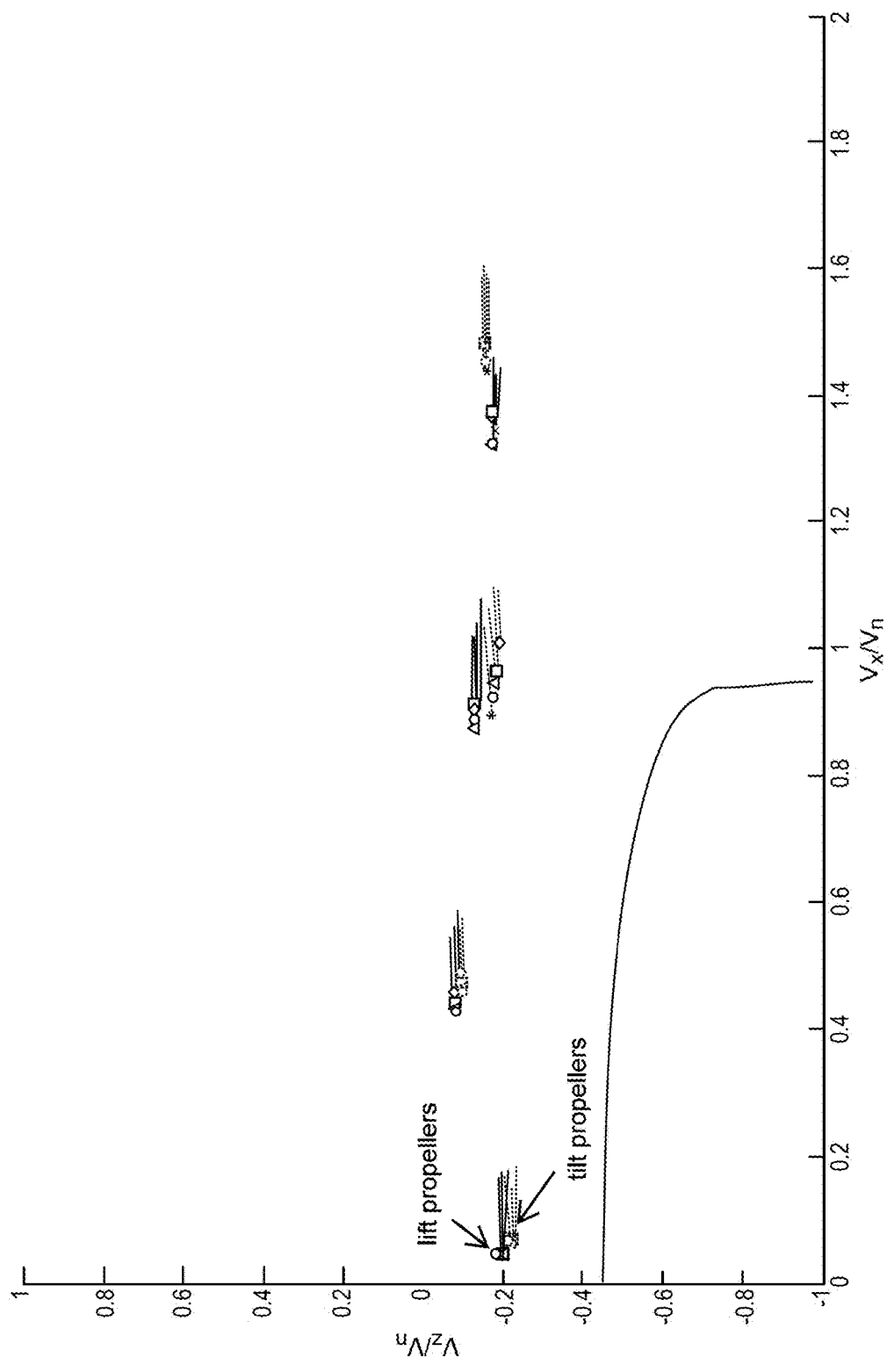

FIG. 15L illustrates exemplary states of the aircraft propellers relative to the VRS boundary when the aircraft performs a yaw maneuver at different points of inbound transition. In this example, the extrapolated propeller states would not intersect with the VRS boundary and no yaw rate limit is employed. However, in other conditions, such as when the aircraft turns in forward flight in a manner that reduces an absolute magnitude of Vx/Vh, a yaw rate limit may be employed to ensure propellers of the aircraft avoid vortex ring state.

Figure 16:
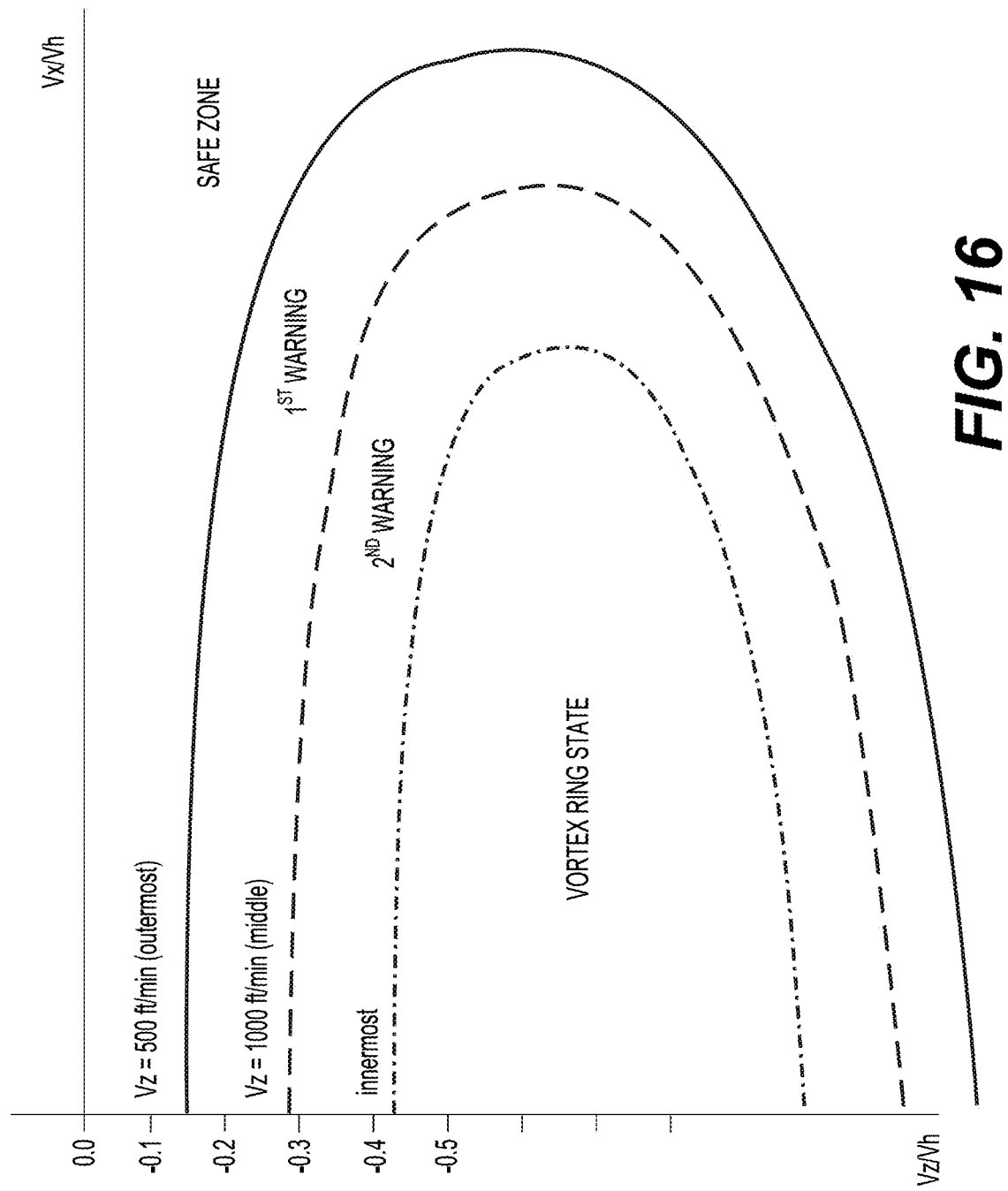
FIG. 16 illustrates an exemplary diagram for different actions that may be taken based on proximity to vortex ring state, in accordance with embodiments of the present disclosure.

FIG. 16 illustrates diagram for different actions that may be taken based on proximity to vortex ring state, in accordance with embodiments of the present disclosure. In some embodiments, VRS Avoidance 1033 may determine a proximity of propeller state(s) to one or more different warning boundaries surrounding the vortex ring state boundary, using the methods described above with reference to FIG. 14A-14G. In some embodiments, VRS Avoidance 1033 may determine whether the propeller state exists within one or more warning zone ranges. In some embodiments, the warning boundaries (e.g., $1^{st}$ warning and/or $2^{nd}$ warning boundaries) may dynamically change based on different aircraft operating conditions. In some embodiments, a propeller state outside a first warning boundary may represent a safe zone for VRS avoidance (e.g., near 0% probability of entering VRS, probability of entering VRS is below a certain threshold). In some embodiments, a propeller state inside a first warning boundary and before a second warning boundary may include, for example, around a 0-50% probability of entering vortex ring state. In some embodiments, a propeller state inside a second warning boundary and before the VRS boundary may include, for example, a 50%-100% probability of entering VRS. In some embodiments, limits set in FIG. 14A-14G may instead be based on a proximity of a propeller state to one or more warning boundaries (e.g., first warning boundary and/or second warning boundary). In some embodiments, a propeller state inside the innermost line may represent the vortex ring state, wherein any propellers within the innermost boundary line are likely in vortex ring state.

In some embodiments, in response to detecting that one or more propellers are in at least one of the first warning zone or the second warning zone, the flight control system may perform one or more preventative actions. Preventative actions may include generating a warning for the pilot on an output device. For example, an output device may include any suitable device that is configured to provide output to a pilot, such as a display, one or more lights, a touch screen, a haptics device, a virtual/augmented reality display, or one or more speakers. In some embodiments, the warnings provided through the output device may change based on a proximity to VRS. For example, the output device may be a display that shows a propeller state proximity to VRS boundary and/or warning boundaries. The output device may be controlled to provide a warning (e.g., associated with a propeller state proximity to VRS boundary and/or warning boundaries), such as by changing colors, increasing emitted light, and/or increasing text size based on one or more propeller state getting closer to the VRS boundary and/or entering one or more warning zones. Additionally or alternatively, the output device may be controlled to increase a volume and/or intensity of a haptic feedback based on one or more propeller state getting closer to the VRS boundary and/or entering one or more warning zones.

Preventative actions may further include controlling the aircraft by modifying pilot commands and/or limiting pilot commands to prevent propeller(s) from entering VRS. As described above, controlling the aircraft based on one or more limits may include limiting a propeller torque, propeller speed, descent rate, turn-rate, forward speed, yaw rate, roll rate, and/or pitch rate. In some embodiments, a warning is provided based on one or more aircraft propeller(s) entering the first warning zone. In some embodiments, flight control is modified (e.g., by limiting pilot commands) based on one or more aircraft propeller(s) entering the second warning zone closer to the vortex ring state. In some embodiments, as described above, flight control is modified to implement escape procedures (e.g., vary nacelle tilt) based on one or more aircraft propeller(s) entering the vortex ring state.

Additional aspects of the present disclosure may be further described via the following clauses:

1. A computer-implemented method for an aircraft, comprising:
   receiving a descent rate command from a pilot input device;
   determining a proximity of each propeller of at least two propellers to a vortex ring state; and
   controlling the aircraft's descent rate to be less than the commanded descent rate when at least one of the at least two propellers is within a first threshold proximity to the vortex ring state.

2. The method of clause 1,
   wherein the proximity of each propeller of the at least two propellers to the vortex ring state is determined based on an airspeed of the aircraft and at least one of: a pitch angle of the aircraft or a tilt angle of the propeller.

3. The method of clause 2,
   wherein the proximity of each propeller of the at least two propellers to the vortex ring state is determined based on at least one of: a thrust of the propeller, a torque of the propeller, a propeller speed, or a vibration of the propeller.

4. The method of clause 1, wherein the proximity of each propeller of the at least two propellers to the vortex ring state is determined based on an airspeed of the aircraft, a pitch angle of the aircraft, and a blade pitch of the propeller.

5. The method of any of clauses 1-4, wherein the proximity of each propeller of the at least two propellers to the vortex ring state is determined based on a thrust value.

6. The method of clause 5, wherein the thrust value is a thrust provided by the corresponding propeller while the aircraft is in a hover phase.

7. The method of clause 5 or 6, wherein the thrust value varies based on a type of the corresponding propeller.

8. The method of any of clauses 5-7, wherein:
   the at least two propellers include a lift propeller and a tilt propeller; and
   the thrust value of the lift propeller is different from the thrust value of the tilt propeller.

9. The method of any of clauses 1-8, wherein determining a proximity of each propeller of the at least two propellers to the vortex ring state comprises determining a proximity of a state of the propeller to a multi-dimensional vortex ring state boundary.

10. The method of any of clauses 1-9, wherein controlling the descent rate comprises:
    determining a maximum allowable descent rate;
    inputting the maximum allowable descent rate and the pilot's descent rate command into a model which generates a descent rate command; and
    controlling one or more of flight elements of the aircraft based on the generated descent rate command.

11. The method of any of clauses 1-10, wherein controlling the descent rate comprises determining a maximum allowable descent rate based on at least one of: roll of the aircraft, pitch of the aircraft, or forward speed of the aircraft.

12. The method of any of clauses 1-11, further comprising:
    providing a warning to the pilot based on at least one of the at least two propellers being within a second threshold proximity to the vortex ring state;
    wherein the second threshold proximity is different from the first threshold proximity; and
    wherein the warning includes at least one of: a displaying of text, a turning on of a light, a changing of a light color, an audible notification, or a haptic notification.

13. The method of any of clauses 1-12, wherein the second threshold proximity is further from the vortex ring state than the first threshold proximity.

14. The method of any of clauses 1-13, further comprising controlling at least one of: propeller tilt angle, aircraft roll angle, aircraft pitch angle, or propeller speed based on at least one of the at least two propellers being within the threshold proximity to the vortex ring state.

15. The method of any of clauses 1-14, further comprising detecting an airspeed of the aircraft, wherein the determining the proximity of each propeller of the at least two propellers to the vortex ring state is performed upon determining the airspeed is below a threshold speed.

16. The method of any of clauses 1-15, further comprising detecting an airspeed of the aircraft, wherein the controlling the aircraft's descent rate to be less than the commanded descent is performed upon determining the detected airspeed is less than a threshold.

17. The method of any of clauses 1-16, further comprising detecting whether the aircraft is receiving powered lift support, wherein the determining the proximity of each propeller of the at least two propellers to the vortex ring state is performed upon detecting the aircraft is receiving powered lift support.

18. The method of any of clauses 1-17, wherein controlling the descent rate comprises controlling the aircraft based on a determined maximum allowable descent rate.

19. The method of clause 18, further comprising detecting a vibration of at least one of the at least two propellers, wherein the maximum allowable descent rate is reduced based on the detected vibration exceeding a threshold vibration.

20. The method of any of clauses 1-19, wherein the pilot input device is at least one inceptor device.

21. The method of any of clauses 1-20, further comprising:
    determining at least one of the at least two propellers has entered a vortex ring state; and
    controlling the tilt angle of at least one of the at least two propellers based on the determination.

22. The method of any of clauses 1-21, further comprising:
    receiving an aircraft maneuver rate command from the pilot input device;
    determining a proximity of each propeller of at least two propellers to a vortex ring state; and
    controlling the aircraft's maneuver rate to be less than the commanded maneuver rate based on at least one of the at least two propellers being within a threshold proximity to the vortex ring state; and wherein the maneuver rate is at least one of: yaw rate, roll rate, or pitch rate.

23. The method of any of clauses 1-22, wherein the at least two propellers comprise at least one propeller positioned on the opposite side of a fuselage of the aircraft from another propeller.

24. The method of any of clauses 1-23, wherein the at least two propellers comprise a lift propeller and a tilt propeller.

25. The method of any of clauses 1-24, wherein the at least two propellers comprise at least four propellers.

26. A control system comprising at least one processor configured to execute instructions to cause the system to perform the method any of clauses 1-25.

27. A computer-readable storage medium storing instructions which, when executed by at least one processor, cause the at least one processor to perform the method of any of clauses 1-25.

28. An aircraft comprising at least one processor configured to perform the method of any of clauses 1-25.

29. The aircraft of clause 28, further comprising: the pilot input device and the at least two propellers.

30. The aircraft of clause 29, wherein the at least two propellers comprise at least one propeller positioned on the opposite side of a fuselage of the aircraft from another propeller.

31. The aircraft of clause 29 or 30, wherein the at least two propellers comprise a lift propeller and a tilt propeller.

32. The aircraft of any of clauses 29-31, wherein the at least two propellers comprise at least four propellers.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein. The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. As used herein, unless specifically stated otherwise, being "based on" may include being dependent on, being interdependent with, being associated with, being defined at least in part by, being derived from, being influenced by, or being responsive to. As used herein, "related to" may include being inclusive of, being expressed by, being indicated by, or being based on. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent to those skilled in the art from consideration of the specification and practice of the implementations disclosed herein. It is intended that the architectures and circuit arrangements shown in figures are only for illustrative purposes and are not intended to be limited to the specific arrangements and circuit arrangements as described and shown in the figures. It is also intended that the specification and examples be considered as exemplary only, with the true scope and spirit of the invention being indicated by the following claims. The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein. It is also intended that the sequence of steps shown in figures is only for illustrative purposes and is not intended to be limited to any particular sequence of steps. As such, those skilled in the art can appreciate that these steps can be performed in a different order while implementing the same method.

The invention claimed is:

1. A computer-implemented method for an aircraft, comprising:
   receiving, using at least one hardware processor, a descent rate command from a pilot input device;
   determining, using the at least one hardware processor, a proximity of each propeller of at least two propellers to a vortex ring state; and
   controlling, using the at least one hardware processor, an aircraft descent rate to be less than the commanded descent rate when at least one of the at least two propellers is within a first threshold proximity to the vortex ring state.

2. The method of claim 1,
   wherein the proximity of each propeller of the at least two propellers to the vortex ring state is determined, using the at least one hardware processor, based on an airspeed of the aircraft and at least one of: a pitch angle of the aircraft or a tilt angle of the propeller.

3. The method of claim 2,
   wherein the proximity of each propeller of the at least two propellers to the vortex ring state is determined, using the at least one hardware processor, based on at least one of: a thrust of the propeller, a torque of the propeller, a propeller speed, or a vibration of the propeller.

4. The method of claim 1, wherein the proximity of each propeller of the at least two propellers to the vortex ring state is determined, using the at least one hardware processor, based on an airspeed of the aircraft, a pitch angle of the aircraft, and a blade pitch of the propeller.

5. The method of any of claim 1, wherein the proximity of each propeller of the at least two propellers to the vortex ring state is determined, using the at least one hardware processor, based on a thrust value.

6. The method of claim 5, wherein the thrust value is a thrust provided by the corresponding propeller while the aircraft is in a hover phase.

7. The method of claim 5, wherein the thrust value varies based on a type of the corresponding propeller.

8. The method of claim 5, wherein:
   the at least two propellers include a lift propeller and a tilt propeller; and
   the thrust value of the lift propeller is different from the thrust value of the tilt propeller.

9. The method of claim 1, wherein determining a proximity of each propeller of the at least two propellers to the vortex ring state comprises determining, using the at least one hardware processor, a proximity of a state of the propeller to a multi-dimensional vortex ring state boundary.

10. The method of claim 1, wherein controlling the descent rate comprises:
   determining, using at least one hardware processor, a maximum allowable descent rate;

inputting, using the at least one hardware processor, the maximum allowable descent rate and the descent rate command into a model which generates a descent rate command; and controlling, using the at least one hardware processor, one or more of flight elements of the aircraft based on the generated descent rate command.

11. The method of claim 1, wherein controlling the descent rate comprises determining, using the at least one hardware processor, a maximum allowable descent rate based on at least one of: roll of the aircraft, pitch of the aircraft, or forward speed of the aircraft.

12. The method of claim 1, further comprising:
providing, using the at least one hardware processor, a warning to the pilot based on at least one of the at least two propellers being within a second threshold proximity to the vortex ring state;
wherein the second threshold proximity is different from the first threshold proximity; and
wherein the warning includes at least one of: a displaying of text, a turning on of a light, a changing of a light color, an audible notification, or a haptic notification.

13. The method of claim 12, wherein the second threshold proximity is further from the vortex ring state than the first threshold proximity.

14. The method of claim 1, further comprising controlling at least one of: propeller tilt angle, aircraft roll angle, aircraft pitch angle, or propeller speed based on at least one of the at least two propellers being within the threshold proximity to the vortex ring state.

15. The method of claim 1, further comprising detecting, using the at least one hardware processor, an airspeed of the aircraft, wherein the determining the proximity of each propeller of the at least two propellers to the vortex ring state is performed upon determining, using the at least one hardware processor, the airspeed is below a threshold speed.

16. The method of claim 1, further comprising detecting, using the at least one hardware processor, an airspeed of the aircraft, wherein the controlling the aircraft's descent rate to be less than the commanded descent rate is performed upon determining, using the at least one hardware processor, the detected airspeed is less than a threshold.

17. The method of claim 1, further comprising detecting, using the at least one hardware processor, whether the aircraft is receiving powered lift support, wherein the determining the proximity of each propeller of the at least two propellers to the vortex ring state is performed, using the at least one hardware processor, upon detecting the aircraft is receiving powered lift support.

18. The method of claim 1, wherein controlling the descent rate comprises controlling, using the at least one hardware processor, the aircraft based on a determined maximum allowable descent rate.

19. The method of claim 18, further comprising detecting, using the at least one hardware processor, a vibration of at least one of the at least two propellers, wherein the maximum allowable descent rate is reduced based on the detected vibration exceeding a threshold vibration.

20. The method of claim 1, wherein the pilot input device is at least one inceptor device.

21. The method of claim 1, further comprising:
determining, using the at least one hardware processor, at least one of the at least two propellers has entered a vortex ring state; and
controlling, using the at least one hardware processor, tilt angle of at least one of the at least two propellers based on the determination.

22. The method of claim 1, further comprising:
receiving, using the at least one hardware processor, an aircraft maneuver rate command from the pilot input device;
determining, using the at least one hardware processor, a proximity of each propeller of at least two propellers to a vortex ring state; and
controlling, using the at least one hardware processor, an aircraft maneuver rate to be less than the commanded maneuver rate based on at least one of the at least two propellers being within a threshold proximity to the vortex ring state; and
wherein the maneuver rate is at least one of: yaw rate, roll rate, or pitch rate.

23. The method of claim 1, further comprising determining, using the at least one hardware processor, a respective proximity of each propeller of the at least two propellers to the vortex ring state.

24. The method of claim 1, further comprising determining, using the at least one hardware processor, a first proximity of a first propeller to the vortex ring state and a second proximity of a second propeller to the vortex ring state.

25. The method of claim 1, further comprising determining, using the at least one hardware processor, a proximity of a propeller blade of each propeller of at least two propellers to the vortex ring state.

26. A control system comprising at least one processor configured to execute instructions to cause the system to perform operations comprising:
receiving a descent rate command from a pilot input device;
determining a proximity of each propeller of at least two propellers to a vortex ring state; and
controlling an aircraft descent rate to be less than the commanded descent rate when at least one of the at least two propellers is within a first threshold proximity to the vortex ring state.

27. A non-transitory computer-readable storage medium storing instructions which, when executed by at least one processor, cause the at least one processor to perform operations comprising:
receiving a descent rate command from a pilot input device;
determining a proximity of each propeller of at least two propellers to a vortex ring state; and
controlling an aircraft descent rate to be less than the commanded descent rate when at least one of the at least two propellers is within a first threshold proximity to the vortex ring state.

28. An aircraft comprising at least one processor configured to execute instructions to perform operations comprising:
receiving a descent rate command from a pilot input device;
determining a proximity of each propeller of at least two propellers to a vortex ring state; and
controlling an aircraft descent rate to be less than the commanded descent rate when at least one of the at least two propellers is within a first threshold proximity to the vortex ring state.

29. The aircraft of claim 28, wherein the at least two propellers comprise at least one propeller positioned on the opposite side of a fuselage of the aircraft from another propeller.

30. The aircraft of claim 28, wherein the at least two propellers comprise at least four propellers.

* * * * *